(12) United States Patent
Singh et al.

(10) Patent No.: US 11,504,814 B2
(45) Date of Patent: Nov. 22, 2022

(54) AIR COOLED CONDENSER AND RELATED METHODS

(71) Applicant: HOLTEC INTERNATIONAL, Camden, NJ (US)

(72) Inventors: Krishna P. Singh, Jupiter, FL (US); Joseph Gerald Leo Rajkumar, Cherry Hill, NJ (US)

(73) Assignee: HOLTEC INTERNATIONAL

( * ) Notice: Subject to any disclaimer, the term of this patent is extended or adjusted under 35 U.S.C. 154(b) by 124 days.

(21) Appl. No.: 17/073,859

(22) Filed: Oct. 19, 2020

(65) Prior Publication Data
US 2021/0031315 A1 Feb. 4, 2021

Related U.S. Application Data

(60) Continuation-in-part of application No. 16/432,505, filed on Jun. 5, 2019, which is a continuation of
(Continued)

(51) Int. Cl.
*F24F 7/00* (2021.01)
*B23P 15/26* (2006.01)
(Continued)

(52) U.S. Cl.
CPC .............. *B23P 15/26* (2013.01); *B21C 23/00* (2013.01); *F28B 1/06* (2013.01); *F28B 9/10* (2013.01);
(Continued)

(58) Field of Classification Search
CPC .. B23P 15/26; B21C 23/00; F28B 1/06; F28B 9/10; F28D 1/024; F28D 7/10;
(Continued)

(56) References Cited

U.S. PATENT DOCUMENTS 1,935,412 A 11/1933 Price
2,185,928 A 1/1940 Crowley, Jr.
(Continued)

FOREIGN PATENT DOCUMENTS

CN 101284337 10/2008
CN 101365558 2/2009
(Continued)

OTHER PUBLICATIONS

"An Introduction to Brazing," Sulzer Metco, Issue 3, Aug. 2011.
(Continued)

*Primary Examiner* — Davis D Hwu
(74) *Attorney, Agent, or Firm* — The Belles Group, P.C.

(57) ABSTRACT

A vertical bundle air-cooled heat exchanger, a finned tube assembly for an air cooled condenser and method for forming the same, and a system for removing thermal energy generated by radioactive materials. In one aspect, an air cooled condenser sized for industrial and commercial application includes an inlet steam distribution header for conveying steam, a condensate outlet header for conveying condensate, an array of tube bundles each having a plurality of finned tube assemblies having a bare steel tube with an exposed outer surface and a set of aluminum fins brazed directly onto the tube by a brazing filler metal. The steel tubes may be spaced apart by the aluminum fins and have an inlet end fluidly coupled to the inlet steam distribution header and an outlet end fluidly coupled to the outlet header. A forced draft fan may be arranged to blow air through the tube bundles.

20 Claims, 22 Drawing Sheets

Related U.S. Application Data application No. 15/715,897, filed on Sep. 26, 2017, now Pat. No. 10,343,240, which is a continuation of application No. 14/123,678, filed as application No. PCT/US2012/040806 on Jun. 4, 2012, now Pat. No. 9,770,794, said application No. 17/073,859 is a continuation-in-part of application No. 14/373,122, filed as application No. PCT/US2013/022269 on Jan. 18, 2013, now abandoned, said application No. 17/073,859 is a continuation-in-part of application No. 15/722,120, filed on Oct. 2, 2017, now Pat. No. 10,854,344, which is a division of application No. 14/113,990, filed as application No. PCT/US2012/035051 on Apr. 25, 2012, now Pat. No. 9,786,395, said application No. 17/073,859 is a continuation-in-part of application No. 16/725,253, filed on Dec. 23, 2019, which is a continuation of application No. 14/649,241, filed as application No. PCT/US2013/072863 on Dec. 3, 2013, now Pat. No. 10,512,990, which is a continuation-in-part of application No. PCT/US2013/022269, filed on Jan. 18, 2013.

(60) Provisional application No. 61/493,208, filed on Jun. 3, 2011, provisional application No. 61/588,086, filed on Jan. 18, 2012, provisional application No. 61/732,751, filed on Dec. 3, 2012, provisional application No. 61/478,788, filed on Apr. 25, 2011.

(51) Int. Cl.
| | |
|---|---|
| *F28D 7/10* | (2006.01) |
| *F28B 1/06* | (2006.01) |
| *F28B 9/10* | (2006.01) |
| *F28F 1/16* | (2006.01) |
| *F28F 1/20* | (2006.01) |
| *F28F 1/00* | (2006.01) |
| *B21C 23/00* | (2006.01) |
| *F28D 1/02* | (2006.01) |

(52) U.S. Cl.
CPC ............ *F28D 1/024* (2013.01); *F28D 7/10* (2013.01); *F28F 1/003* (2013.01); *F28F 1/16* (2013.01); *F28F 1/20* (2013.01); *F28F 2215/04* (2013.01); *F28F 2275/125* (2013.01); *Y10T 29/4938* (2015.01); *Y10T 29/49393* (2015.01)

(58) Field of Classification Search
CPC ...... F28F 1/003; F28F 1/16; F28F 1/20; F28F 2215/04; F28F 2275/125; Y01T 29/4938; Y01T 29/49393
USPC .......................................................... 165/59
See application file for complete search history.

(56) References Cited

U.S. PATENT DOCUMENTS

| | | |
|---|---|---|
| 2,185,930 A | 1/1940 | Crowley, Jr. |
| 2,618,234 A | 11/1952 | Armacost |
| 2,650,420 A | 9/1953 | Tme |
| 3,183,967 A | 5/1965 | Dindial |
| 3,247,069 A | 4/1966 | Powell et al. |
| 3,341,424 A | 9/1967 | Schlicht et al. |
| 3,776,302 A | 12/1973 | Waszink et al. |
| 3,855,682 A | 12/1974 | Chartei |
| 3,887,004 A | 6/1975 | Beck |
| 3,951,328 A | 4/1976 | Wallace et al. |
| 3,971,501 A | 7/1976 | Cooke |
| 3,984,282 A | 10/1976 | Kleimola |
| 4,098,957 A | 7/1978 | Vernam et al. |
| 4,129,627 A | 12/1978 | Furr |
| 4,207,944 A | 6/1980 | Holtz |
| 4,231,815 A | 11/1980 | Snyder |
| 4,257,480 A | 3/1981 | Winkleblack |
| 4,293,385 A | 10/1981 | Brachet |
| 4,324,617 A | 4/1982 | Sowers et al. |
| 4,362,694 A | 12/1982 | Kayser |
| 4,419,802 A | 12/1983 | Riese |
| 4,473,528 A | 9/1984 | Kleimola |
| 4,478,784 A | 10/1984 | Burelbach |
| 4,576,783 A | 3/1986 | Koutz |
| 4,600,554 A | 7/1986 | Brachet |
| 4,645,633 A | 2/1987 | Hattori |
| 4,668,467 A | 5/1987 | Miler et al. |
| 4,678,626 A | 7/1987 | Germer |
| 4,687,626 A | 8/1987 | Tong |
| 4,753,771 A | 6/1988 | Conway et al. |
| 4,765,946 A | 8/1988 | Dagard et al. |
| 4,818,475 A | 4/1989 | Gluntz et al. |
| 4,895,606 A | 1/1990 | Jafri |
| 4,949,543 A | 8/1990 | Cottone et al. |
| 4,998,509 A | 3/1991 | Gou et al. |
| 5,069,169 A | 12/1991 | Maruko |
| 5,076,999 A | 12/1991 | Forsberg |
| 5,173,126 A | 12/1992 | Ogura et al. |
| 5,226,974 A | 7/1993 | Conn |
| 5,272,737 A | 12/1993 | Fujii et al. |
| 5,450,666 A | 9/1995 | Conn et al. |
| 5,482,113 A | 1/1996 | Agonafer et al. |
| 5,488,642 A | 1/1996 | Malik et al. |
| 5,499,277 A | 3/1996 | Hunsbedt |
| 5,606,792 A | 3/1997 | Schafer |
| 5,612,982 A | 3/1997 | Woodcock et al. |
| 5,640,434 A | 6/1997 | Rottenberg |
| 5,644,608 A | 7/1997 | Malik et al. |
| 5,661,770 A | 8/1997 | Spinks |
| 5,694,442 A | 12/1997 | Cinotti et al. |
| 5,761,262 A | 6/1998 | No et al. |
| 5,832,991 A | 11/1998 | Cesaroni |
| 5,887,043 A | 3/1999 | Spinks |
| 6,069,930 A | 5/2000 | Gamble et al. |
| 6,089,312 A | 7/2000 | Biar |
| 6,139,810 A | 10/2000 | Gottzmann |
| 6,155,339 A | 12/2000 | Grapengater |
| 6,196,442 B1 | 3/2001 | Kalem et al. |
| 6,203,628 B1 | 3/2001 | Katoh et al. |
| 6,243,432 B1 | 6/2001 | Cheung et al. |
| 6,247,231 B1 | 6/2001 | Findlan |
| 6,332,494 B1 | 12/2001 | Bodas et al. |
| 6,344,237 B1 | 2/2002 | Kilmer |
| 6,582,667 B1 | 6/2003 | Ogata |
| 6,618,461 B2 | 9/2003 | Cheung et al. |
| 6,733,598 B2 | 5/2004 | Swidersky |
| 6,795,518 B1 | 9/2004 | Conway et al. |
| 6,839,396 B2 | 1/2005 | Willschuetz |
| 6,865,244 B2 | 3/2005 | Meseth |
| 7,000,823 B2 | 2/2006 | Dockus et al. |
| 7,245,688 B2 | 7/2007 | Nicholls et al. |
| 7,293,602 B2 | 11/2007 | Nadig et al. |
| 7,850,789 B2 | 12/2010 | Katoh et al. |
| 8,069,678 B1* | 12/2011 | Bernert .............. F17C 7/04 62/50.2 |
| 8,081,729 B2 | 12/2011 | Cros |
| 8,283,049 B2 | 10/2012 | Saisho et al. |
| 8,283,050 B2 | 10/2012 | Tsuruno et al. |
| 8,978,962 B2 | 3/2015 | Garcia-Juan |
| 2002/0005230 A1 | 1/2002 | Watsuji et al. |
| 2002/0101951 A1 | 8/2002 | Nakamaru et al. |
| 2003/0001000 A1 | 1/2003 | Shabtay |
| 2003/0066631 A1 | 4/2003 | Jayaweera et al. |
| 2004/0196948 A1 | 10/2004 | Conway et al. |
| 2005/0120715 A1 | 6/2005 | Labrador |
| 2005/0135544 A1 | 6/2005 | Eoh et al. |
| 2005/0194120 A1 | 9/2005 | Lomax, Jr. |
| 2006/0054314 A1 | 3/2006 | Mauvezin |
| 2007/0092053 A1 | 4/2007 | Sato |
| 2007/0164088 A1 | 7/2007 | Dianatkhah |
| 2007/0204623 A1 | 9/2007 | Rollins, III |
| 2007/0253520 A1 | 11/2007 | Sim et al. |

(56) References Cited

U.S. PATENT DOCUMENTS

| | | |
|---|---|---|
| 2008/0028769 A1 | 2/2008 | Goenka |
| 2008/0038165 A1 | 2/2008 | Burlingame |
| 2008/0219397 A1 | 9/2008 | Sim et al. |
| 2008/0260088 A1 | 10/2008 | Singh et al. |
| 2008/0310576 A1 | 12/2008 | Brisson et al. |
| 2008/0314570 A1 | 12/2008 | Singh |
| 2009/0017328 A1 | 1/2009 | Katoh et al. |
| 2009/0049846 A1 | 2/2009 | Jensen |
| 2009/0067565 A1 | 3/2009 | Eckardt et al. |
| 2009/0077971 A1 | 3/2009 | Schu |
| 2009/0095447 A1 | 4/2009 | Podhorsky et al. |
| 2009/0107660 A1 | 4/2009 | Eriksson |
| 2009/0120091 A1 | 5/2009 | DuBois |
| 2009/0129530 A1 | 5/2009 | Reyes, Jr. et al. |
| 2009/0159247 A1 | 6/2009 | Kendall et al. |
| 2009/0165893 A1 | 7/2009 | Akazawa et al. |
| 2009/0175404 A1 | 7/2009 | Singh et al. |
| 2009/0180939 A1 | 7/2009 | Hagen et al. |
| 2009/0233118 A1 | 9/2009 | Katoh et al. |
| 2009/0245453 A1 | 10/2009 | Jeong et al. |
| 2009/0252277 A1 | 10/2009 | Kim |
| 2009/0297882 A1 | 12/2009 | Ikeda et al. |
| 2009/0323884 A1 | 12/2009 | Sato et al. |
| 2010/0122797 A1 | 5/2010 | Seo |
| 2010/0177860 A1 | 7/2010 | Eoh et al. |
| 2010/0193167 A1 | 8/2010 | Song |
| 2010/0200203 A1 | 8/2010 | Postma |
| 2010/0236766 A1 | 9/2010 | Ulics, Jr. et al. |
| 2010/0243208 A1 | 9/2010 | Kar |
| 2011/0158371 A1 | 6/2011 | Sato et al. |
| 2011/0220617 A1 | 9/2011 | Becker et al. |
| 2011/0259574 A1 | 10/2011 | Angel |
| 2011/0277967 A1* | 11/2011 | Fried .................. F28D 15/0266 165/104.26 |
| 2013/0037172 A1 | 2/2013 | Garcia-Juan |
| 2013/0037957 A1 | 2/2013 | Takahashi et al. |
| 2013/0199792 A1* | 8/2013 | Backes ................ E21B 41/005 166/335 |

FOREIGN PATENT DOCUMENTS

| | | |
|---|---|---|
| CN | 101462208 | 6/2009 |
| CN | 201740440 | 2/2011 |
| CN | 102764939 | 11/2012 |
| DE | 2913520 | 10/1980 |
| EP | 476563 | 3/1992 |
| EP | 0795732 | 9/1997 |
| EP | 1004386 | 5/2000 |
| EP | 1535690 | 6/2005 |
| EP | 2002923 | 12/2008 |
| EP | 1758701 | 8/2012 |
| EP | 2574453 | 4/2013 |
| GB | 527194 | 10/1940 |
| GB | 1171230 | 11/1969 |
| GB | 2017761 | 10/1979 |
| JP | 1223392 | 9/1989 |
| JP | 1133709 | 2/1999 |
| JP | 200637135 | 2/2006 |
| JP | 2007275984 | 10/2007 |
| KR | 10-0581129 | 5/2006 |
| KR | 10-0847131 | 7/2008 |
| KR | 20090021722 | 3/2009 |
| KR | 20090102079 | 9/2009 |
| UA | 81419 | 1/2008 |
| WO | WO2011/110532 | 9/2001 |
| WO | WO 2013/109968 | 7/2013 |

OTHER PUBLICATIONS

"Brazing Aluminum to Steel—General Topics," Retrieved from http://www.aluminium-brazing.com/2010/11/brazing-aluminum-to-steel-general-topics, Nov. 1, 2010.
"Exhaust Heat Recovery Finned Tubing," Cain Industries, 2000, 4 pages.
International Search Report and Written Opinion for PCT/US2013/072863 dated Apr. 18, 2014.
International Search Report for International Application No. PCT/US13/22269 dated Apr. 5, 2013.
International Search Report for International Application No. PCT/US12/35051 dated Aug. 16, 2012.
International Search Report for International Application No. PCT/US12/40806 dated Aug. 28, 2012.

* cited by examiner

AIR COOLED CONDENSER AND RELATED METHODS

CROSS-REFERENCE TO RELATED PATENT APPLICATIONS

The present application is a continuation-in-part of U.S. patent application Ser. No. 16/432,505, filed on Jun. 5, 2019, which is a continuation of U.S. patent application Ser. No. 15/715,897 filed Sep. 26, 2017, now U.S. Pat. No. 10,343, 240, which is a continuation of U.S. patent application Ser. No. 14/123,678, filed Jun. 17, 2014, now U.S. Pat. No. 9,770,794, which is a PCT national phase application in the U.S. for International Patent Application No. PCT/US2012/040806 filed Jun. 4, 2012, which claims the benefit of U.S. Provisional Patent Application Ser. No. 61/493,208 filed Jun. 3, 2011.

The present application is also a continuation-in-part of U.S. patent application Ser. No. 14/373,122, filed Jul. 18, 2014, which is a PCT national phase application in the U.S. for International Patent Application No. PCT/US2013/022269, filed Jan. 18, 2013, which claims the benefit of U.S. Provisional Patent Application Ser. No. 61/588,086, filed Jan. 18, 2012 and U.S. Provisional Patent Application Ser. No. 61/732,751, filed Dec. 3, 2012.

The present application is also a continuation-in-part of U.S. patent application Ser. No. 15/722,120, filed Oct. 2, 2017, which is a divisional of U.S. patent application Ser. No. 14/113,990, filed Jan. 6, 2014, now U.S. Pat. No. 9,786,395, which is a PCT national phase application in the U.S. for International Patent Application No. PCT/US2012/035051, filed Apr. 25, 2012, which claims the benefit of U.S. Provisional Patent Application Ser. No. 61/478,788, filed Apr. 25, 2011.

The present application is also a continuation-in-part of U.S. patent application Ser. No. 16/725,253, filed Dec. 23, 2019, which is a continuation application of U.S. patent application Ser. No. 14/649,241, filed Jun. 3, 2015, now U.S. Pat. No. 10,512,990, which is a National Stage application under 35 U.S.C. § 371 of International Application No. PCT/US2013/072863, filed Dec. 3, 2013, which: (1) is a continuation in part of International Application No. PCT/US2013/022269, filed Jan. 18, 2013; and (2) claims priority to U.S. Provisional Patent Application Ser. No. 61/732,751, filed Dec. 3, 2012.

The foregoing priority applications are incorporated herein by reference in their entireties.

BACKGROUND

Cooling fluid streams by air instead of water is an inherently more environmentally friendly option. Indeed, restriction on water consumption for industrial use, especially to condense waste steam in power plants, has emerged as a growing worldwide problem. Driven by increasing scarcity of water, power plant designers have been turning to air-cooled condensers, such as that which is shown in FIG. 1 in lieu of the conventional water-cooled condensers. Existing air-cooled condensers consist of inclined tube bundles organized in "cells" wherein the turbine exhaust steam flows inside the tubes and is condensed by the flow of cooling air in a cross flow mode delivered by axial fans located underneath. Prior art air-cooled condenser configurations have several disadvantages that have limited its wide application, such as: (1) high capital cost; (2) large land area requirement; (3) significant site construction effort; and (4) contamination of condensate (deleterious iron carry over) by corrosion of the carbon steel tubing and associated reduction in the service life of the system. Thus, a need for an improved air-cooled heat exchanger, and improved finned tubes for use with the same, exists Rejection of waste heat in a Rankine cycle used in thermal electric power generation plants via Dry Cooling techniques instead of Wet Cooling is an inherently more environmentally friendly option. Indeed, governmental restriction on water consumption for industrial use, especially to condense waste steam in power plants, has emerged as a growing worldwide trend. Driven by the increasing scarcity of water, power plant designers have been turning to heat exchangers in the form of air cooled condensers in lieu of the conventional "water cooled" condensers. The air cooled condensers (ACCs) consist of inclined tube bundles arranged in an array of "cells" wherein the power generation plant turbine exhaust steam flows inside the tubes and is condensed by the flow of cooling air in a cross flow arrangement delivered by axial fans located generally underneath. The steam therefore undergoes a phase change from gas to liquid between the tube inlet and outlet. To minimize the "parasitic power" (energy needed to run the fans), the dry cooling industry has steadily evolved from using multi-row finned tube bundles to a single tube row over the past 70 years. Finned tubes have been proposed for ACCs. These finned tubes are generally comprised of aluminum cladded carbon steel tubes with brazed aluminum fins, aluminized carbon steel tubes with brazed aluminum fins, and stainless steel tubes with laser welded stainless steel fins. The above mentioned tube configurations have several disadvantages that are limiting the widespread application of ACCs, such as: (1) carbon steel tubes are subject to flow accelerated corrosion issues that are being exacerbated by the high cycles and fast starts of the latest generation of power plants; (2) contamination of condensate (deleterious iron carry over) by corrosion of the carbon steel tubing and associated additional water treatment required to address the more stringent water chemistry requirements of modern power plants; and (3) the high capital cost associated with stainless steel tubes with laser welded stainless steel fins. An improved tube construction and fabrication process is desired.

The reactor vessel and the spent fuel pool in nuclear power plants are principal locations of heat generation during the plant's operation or subsequent to a scram. In lightwater reactor installations, the heat produced in a reactor even after shutdown can be as much as 8% of the reactor's thermal power at the beginning of the scram decaying exponentially to less than 1% of the operating thermal power in a day's time. The heat energy produced by the irradiated nuclear fuel is deposited in the body of water surrounding the fuel in both the reactor and the fuel pool. Nuclear power plants are equipped with multiple systems to transfer the energy from the heated water mass (which is typically contaminated by traces of radionuclides) to a clean water loop (sometimes referred to as the component cooling water) using a shell-and-tube heat exchanger. The heat collected by the "component cooling water" is in turn rejected to the plant's natural heat sink such as a lake, a river, or an ocean through another tubular heat exchanger. The use of a closed loop component cooling water system to deliver the non-beneficial heat generated inside the nuclear plant (i.e., heat that cannot be harnessed as productive energy) to the aqueous environment has been the universal means of removing heat from the (potentially contaminated) fuel-exposed water in a nuclear plant. However, the recent devastating tsunami in the wake of the massive earthquake in the Pacific Ocean that struck Fukushima Daiichi plants in Japan showed the vulnerability in the state-of-the-art nuclear plant design practice. The Fukushima catastrophe suggests that the means for removing the plant's decay heat should be diversified to include direct rejection to air to further harden nuclear plants against beyond-the-design basis extreme environmental phenomena.

Heat exchangers often have a distributor tube whose external surface is provided with cooling fins. The distributor tube is typically a steel tube coated with a metal having good heat conduction, such as aluminum. The cooling fins themselves also generally comprise aluminum because of its good heat conductivity and low weight.

The bond between the distributor tube and the cooling fins is generally created through a brazing process. Traditionally, the distributor tube was cladded with aluminum or an aluminum-silicon alloy. However, when producing an aluminum cladded tube, intermetallic layers form between the cladding and the base steel material. After forming the cladded tube, the tube must be cleaned for brazing. This cleaning typically involves water based cleaners which need to be dried before the brazing process. The cleaned and cladded tube is then subjected to a secondary heating such that the tube is bonded to the aluminum fins at a brazing temperature of approximately 600° C. Secondary heating increases the thickness of the brittle intermetallic layer which is subject to cracking. Also, during this secondary heating process, the aluminum layer can be thinned from capillary action during brazing to the point where it does not provide sufficient long term corrosion protection for the base steel material.

Accordingly, there is a need for brazing compositions which: (1) eliminate the need for aluminum cladding prior to the brazing process; (2) eliminate the need for a drying step in the brazing process; (3) eliminate the need for secondary heating in the brazing process; (4) reduce or eliminate the intermetallic layer between the cooling fin and the distributor tube; and (5) provide long term corrosion protection.

Embodiments of the present invention are designed to meet these ends.

SUMMARY

In one embodiment, the invention can be a method of forming a finned tube for an air-cooled condenser, the method comprising: extruding, from a first material, a first finned tube section comprising: a first tube having an inner surface forming a first cavity along a first longitudinal axis and an outer surface; and a first plurality of fins protruding radially outward from the outer surface of the first tube, the first plurality of fins integral with the first tube and extending substantially parallel to the first longitudinal axis.

In another embodiment, the invention can be a method of forming a finned tube for an air-cooled condenser, the method comprising: providing a finned tube section comprising: an outer tube having an inner surface forming a cavity along a longitudinal axis and an outer surface; and a plurality of fins protruding radially outward from the outer surface of the outer tube, the outer tube formed of a first material; inserting an inner tube having an outer surface through the cavity of the outer tube, the inner tube having an inner surface forming a cavity; and expanding the inner tube so that the outer surface of the inner tube is in contact with the inner surface of the outer tube, the inner tube formed of a second material that is different than the first material.

In yet another embodiment, the invention can be a method of forming a finned tube for an air-cooled condenser, the method comprising: forming a plurality of finned tube sections, each of the finned tube sections comprising: a tube having an inner surface forming a cavity along a longitudinal axis and an outer surface; and a plurality of fins protruding radially outward from the outer surface of the tube; aligning the plurality of finned tube sections so that the longitudinal axes are in axial alignment and the plurality of fins of adjacent finned tube sections are angularly offset from one another; and coupling the plurality of finned sections together.

In still another embodiment, the invention can be a method of forming a tube bundle assembly for an air-cooled condenser comprising: forming a plurality of finned tubes in accordance with one of the methods described in the three paragraphs immediately preceding above; arranging the plurality of finned tubes in a substantially vertical and side-by-side orientation; coupling a top end of the outer tube of each of the plurality of finned tubes to a top header pipe and coupling a bottom end of the outer tube of each of the plurality of finned tubes to a bottom header pipe; wherein a hermetic fluid path is formed through the cavity of the inner tube of each of the plurality of finned tubes from an inlet header cavity of the top header pipe to an outlet header of the bottom header pipe.

In even another embodiment, the invention can be a method of condensing steam in a power generation plant comprising: introducing steam into the inlet header cavity of the tube bundle assembly formed by the method described in the immediately preceding paragraph, the steam flowing downward through the hermetic fluid paths of the plurality of finned tubes; flowing air upward along the plurality of finned tubes of the tube bundle assembly, thermal energy being transferred from the steam to the air through the plurality of finned tubes, thereby condensing the steam; and condensate gathering in the outlet header cavity of the bottom header pipe.

In a further embodiment, the invention can be a finned tube for an air-cooled condenser comprising: an extruded first finned tube section comprising: a first tube having an inner surface forming a first cavity along a first longitudinal axis and an outer surface; and a first plurality of fins protruding radially outward from the outer surface of the first tube, the first plurality of fins integral with the first tube and extending substantially parallel to the first longitudinal axis; and wherein the extruded finned section is formed of a first material.

In a yet further embodiment, the invention can be a finned tube for an air-cooled condenser comprising: an outer tube having an inner surface forming a cavity along a longitudinal axis and an outer surface; a plurality of fins protruding radially outward from the outer surface of the outer tube, the outer tube formed of a first material; an inner tube extending through the cavity of the outer tube, the inner tube having an inner surface forming a cavity and an outer surface, the outer surface of the inner tube being in contact with the inner surface of the outer tube, the inner tube formed of a second material that is different than the first material.

In a still further embodiment, the invention can be a finned tube for an air-cooled condenser comprising: a plurality of finned tube sections, each finned tube section comprising: an outer tube having an inner surface forming a cavity along a longitudinal axis and an outer surface, the outer tube formed of a first material; and a plurality of fins protruding radially outward from the outer surface of the outer tube; and an inner tube extending through the cavities of the outer tubes to couple the plurality of finned tube sections together, the inner tube having an inner surface forming a cavity and an outer surface, the outer surface of the inner tube being in contact with the inner surfaces of the outer tubes, the inner tube formed of a second material that is different than the first material.

In an even further embodiment, the invention can be a finned tube for an air-cooled condenser comprising: a plurality of finned tube sections, each finned tube section comprising: an outer tube having an inner surface forming a cavity along a longitudinal axis and an outer surface, the outer tube formed of a first material; and a plurality of fins protruding radially outward from the outer surface of the outer tube; and the plurality of finned tube sections coupled together in a manner so that the longitudinal axes are in axial alignment and the plurality of fins of adjacent finned tube sections are angularly offset from one another.

In other embodiments, the invention can be a tube bundle assembly for an air-cooled condenser comprising: a plurality of finned tubes in accordance with any one of the immediately preceding four paragraphs, the plurality of finned tubes arranged in a substantially vertical and side-by-side orientation; a top end of each of the plurality of finned tubes coupled to a top header pipe and a bottom end of each of the plurality of finned tubes coupled to a bottom header pipe; and wherein a hermetic fluid path is formed through each of the plurality of finned tubes from an inlet header cavity of the top header pipe to an outlet header of the bottom header pipe.

In yet another embodiment, the invention can be a power generation plant comprising: at least one tube bundle assembly according to the immediately preceding paragraph, the top header pipe operably coupled to a source of steam generated during a power generation cycle; and a blower for flowing air upward along the plurality of finned tubes of the tube bundle assembly In a still further embodiment, the invention can be an air-cooled condenser comprising: at least one tube bundle assembly comprising: a tube bundle comprising a plurality of finned tubes arranged in a substantially vertical and side-by-side orientation, each of the plurality of finned tubes comprising a cavity; a top header pipe comprising an inlet header cavity operably coupled to a source of steam; a bottom header pipe comprising an outlet header cavity for collecting condensate; wherein top ends of the plurality of finned tubes are coupled to the top header pipe and the bottom ends of the plurality of finned tubes are coupled to the bottom header pipe; and the top header pipe having a transverse cross-section having a minor axis and a major axis, the minor axis of the transverse cross-section of the top header pipe extending substantially horizontal.

In another embodiment, the invention can be a vertical bundle air-cooled condenser comprising: at least one tube bundle assembly comprising: a tube bundle comprising a plurality of finned tubes arranged in a substantially vertical and side-by-side orientation, each of the plurality of finned tubes comprising a cavity; a top header pipe comprising an inlet header cavity operably coupled to a source of steam; a bottom header pipe comprising an outlet header cavity for collecting condensate; top ends of the plurality of finned tubes coupled to the top header pipe and the bottom ends of the plurality of finned tubes coupled to the bottom header pipe; and a shell having an open top end and open bottom end, the at least one tube bundle assembly positioned within the shell.

In even another embodiment, the invention can be a power generation plant comprising: the vertical bundle air-cooled condenser according to any one of the two immediately paragraphs; and wherein the vertical bundle air-cooled condenser forms part of a Rankine cycle fluid circuit for producing power.

In a further embodiment, the invention can be an air-cooled condenser comprising: at least one tube bundle assembly comprising: a tube bundle comprising a plurality of finned tubes arranged in a substantially vertical and side-by-side orientation, each of the plurality of finned tubes comprising a cavity; a top network of pipes operably coupled to a source of steam; a bottom network of pipes for collecting condensate; wherein top ends of the plurality of finned tubes are coupled to the top network of pipes and the bottom ends of the plurality of finned tubes are coupled to the bottom network of pipes; and the top network of pipes and the bottom network of pipes having one or more pipes having a transverse cross-section having a minor axis and a major axis, the minor axis of the transverse cross-section of the top header pipe extending substantially horizontal.

The present disclosure provides an improved finned tube assembly and a method for bonding an aluminum fin to an uncoated bare steel tube. In one embodiment, the method employs a flux mixture comprising powdered flux and an oil based carrier. In a preferred embodiment, water is not used in the flux mixture. Advantageously, the method advantageously eliminates the need to first provide an aluminum clad layer (or otherwise aluminized surface) on the outer surface of the tube for bonding the tube to the fin before beginning the brazing process, eliminates drying of fluxed tubes, and reduces the deleterious intermetallic layer (e.g. FeAl3) between the dissimilar metals which is formed during brazing. The latter is beneficial because FeAl3 is relatively brittle so that it is desirable to minimize the thickness of this layer to avoid joint fracture. The method according to the present disclosure provides long term corrosion protection of the external tube surface after brazing. The method is applicable to tubes constructed from carbon steels, ferritic stainless steels, austenitic stainless steels, and other steel alloys.

In one preferred embodiment, the steel core tube is stainless steel. The stainless steel core tube provides a unique solution to the flow accelerated corrosion and iron transport issues that currently plague the power plant air cooled condenser industry. This invention particularly addresses the more stringent water chemistry requirements and cyclic power plant loading scenarios that exist today.

The present disclosure further provides a heat exchanger of the air cooled condenser (ACC) type having high efficiency, lower manufacturing costs, and longer life than heretofore known air cooled condensers. Both the method and heat exchanger according to the present disclosure allow for maintaining cost effective manufacturing.

According to one embodiment of the present invention, a tube assembly for a heat exchanger includes a bare steel tube and at least one set of aluminum fins bonded directly to an exposed outer surface of the bare steel tube by a brazing filler metal comprised of aluminum. In one embodiment, the steel tube is made of stainless steel. In another embodiment, the steel tube is made of low carbon steel. The set of aluminum fins has a serpentine configuration comprising peaks and valleys. In a certain embodiment, the steel tube has an oblong cross-sectional shape.

According to another embodiment of the present invention, a finned tube brazing preassembly for heat processing in a brazing furnace is provided. The preassembly includes a bare steel tube having an exposed outer surface, a set of aluminum fins, a fluoride based flux and oil based carrier mixture disposed between the bare steel tube and the set of aluminum fins, and a brazing filler metal comprising aluminum. The brazing filler is disposed proximate to the set of aluminum fins and the flux and oil based carrier mixture for bonding the fins to the tube. The brazing filler metal forms a brazed bond between the bare steel tube and set of aluminum fins when heat processed in the brazing furnace. In one embodiment, the oil based carrier is vanishing oil. In one embodiment, the flux and oil based carrier mixture is applied to the exposed outer surface 124 of tube 102 at a rate of about 25 g/m2 flux and about 35 g/m2 oil based carrier which may be vanishing oil. In various embodiments, the bare steel tube is preferably stainless steel or low carbon steel.

According to another embodiment of the present invention, an air cooled condenser sized for industrial and commercial application is provided. The air cooled condenser includes an inlet steam distribution header for conveying steam, a condensate outlet header for conveying condensate, and an array of tube bundles. The tube bundles each comprise a plurality of finned tube assemblies having a bare steel tube with an exposed outer surface and a set of aluminum fins brazed directly onto the tube by a brazing filler metal. The steel tubes are spaced apart by the aluminum fins. The steel tubes further have an inlet end fluidly coupled to the inlet steam distribution header and an outlet end fluidly coupled to the outlet header. A forced draft fan is provided and arranged to blow air through the tube bundles. In various embodiments, the bare steel tube is preferably stainless steel or low carbon steel.

A method for forming a tube assembly for an air cooled condenser is provided. The method includes the steps of: providing a bare steel tube having an exposed exterior surface of steel; providing an aluminum fin; applying a flux and oil based carrier mixture onto the exposed exterior surface of the steel tube; providing a brazing filler metal; bringing into mutual contact the bare steel tube, aluminum fin, flux and oil based carrier mixture, and brazing filler metal, wherein the bare steel tube, aluminum fin, flux and oil based carrier mixture, and brazing filler metal collectively define a finned tube brazing preassembly; loading the finned tube brazing preassembly into a brazing furnace; and heating the finned tube brazing preassembly to a temperature sufficient to melt the brazing filler metal and bond the aluminum fin directly onto the bare steel tube. In various embodiments, the bare steel tube is preferably stainless steel or low carbon steel.

A method for condensing steam using an air cooled condenser according to the present disclosure is also provided. The method includes: providing an air cooled condenser comprising an array of tube bundles, an inlet steam distribution header conveying steam, a condensate outlet header conveying condensate, and a forced draft fan blowing air through the tube bundles; the tube bundles each comprising a plurality of finned tube assemblies having a bare steel tube with an exposed outer surface and a set of aluminum fins brazed directly onto the tube with a brazing filler metal, the tubes having an inlet end fluidly coupled to the inlet steam distribution header and an outlet end fluidly coupled to the outlet header; flowing steam through the inlet steam distribution header; receiving steam through the inlet end of each tube; condensing the steam in each tube between the inlet and outlet ends; passing liquefied water condensate through the outlet end of each tube; and collecting the condensate in the condensate outlet header. In various embodiments, the bare steel tube is preferably stainless steel or low carbon steel.

A flux mixture suitable for brazing aluminum fins onto a bare steel tube is provided. In one embodiment, the flux mixture includes a flux powder and an oil based carrier. In one embodiment, the oil based carrier is preferably an aliphatic hydrocarbon, and more preferably a vanishing oil. The flux powder and oil based carrier form a flux gel or paste suitable for application to an air cooled condenser tube or other structure These, and other drawbacks, are remedied by the present invention, which provides an independent system for rejecting waste heat generated by radioactive materials within a nuclear power plant to the ambient air.

In one embodiment, the invention can be a system for removing thermal energy generated by radioactive materials comprising: an air-cooled heat exchanger; a heat rejection closed-loop fluid circuit comprising a tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and the air-cooled heat exchanger comprising a shell-side fluid path having a first air inlet, a second air inlet and an air outlet, the first air inlet located at a first elevation, the second air inlet located at a second elevation, and the air outlet located at a third elevation, the second elevation greater than the first elevation and the third elevation greater than the second elevation, the air-cooled heat exchanger transferring thermal energy from the coolant fluid flowing through the tube-side fluid path to air flowing through the shell-side fluid path.

In another embodiment, the invention can be a system for removing thermal energy generated by radioactive materials comprising: an air-cooled shell-and-tube heat exchanger comprising a shell and plurality of heat exchange tubes arranged in a substantially vertical orientation within the shell, the plurality of heat exchange tubes comprising interior cavities that collectively form a tube-side fluid path, the shell forming a shell-side fluid path that extends from an air inlet of the shell to an air outlet of the shell, the first air inlet located at a lower elevation than the air outlet; a heat rejection closed-loop fluid circuit comprising the tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and the air-cooled shell-and-tube heat exchanger transferring thermal energy from the coolant fluid flowing through the tube-side fluid path to air flowing through the shell-side fluid path.

In yet another embodiment, the invention can be a tube-and-shell air-cooled heat exchanger apparatus comprising: a shell having a shell cavity, a primary air inlet at a first elevation, a secondary air inlet at a second elevation, and an air outlet at a third elevation, wherein the second elevation is greater than the first elevation and the third elevation is greater than the second elevation, each of the primary air inlet, the secondary air inlet, and the air outlet forming a passageway through the shell to a shell-side fluid path; and a plurality of heat exchange tubes that collectively form a tube bundle having a substantially vertical longitudinal axis, the tube bundle located within the shell cavity, a tube-side fluid path comprising interior cavities of the plurality of heat exchange tubes.

In some embodiments, the present invention provides a brazing composition comprising: a metal halide; and from about 40 wt. % to about 65 wt. % of a hydrophobic carrier.

In further embodiments, the present invention provides a multi-component brazing composition comprising: a first component comprising a metal halide; and a hydrophobic carrier; and a second component comprising a filler metal.

Other embodiments provide methods of preparing and using the compositions described herein.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE DRAWINGS

Figure 1:
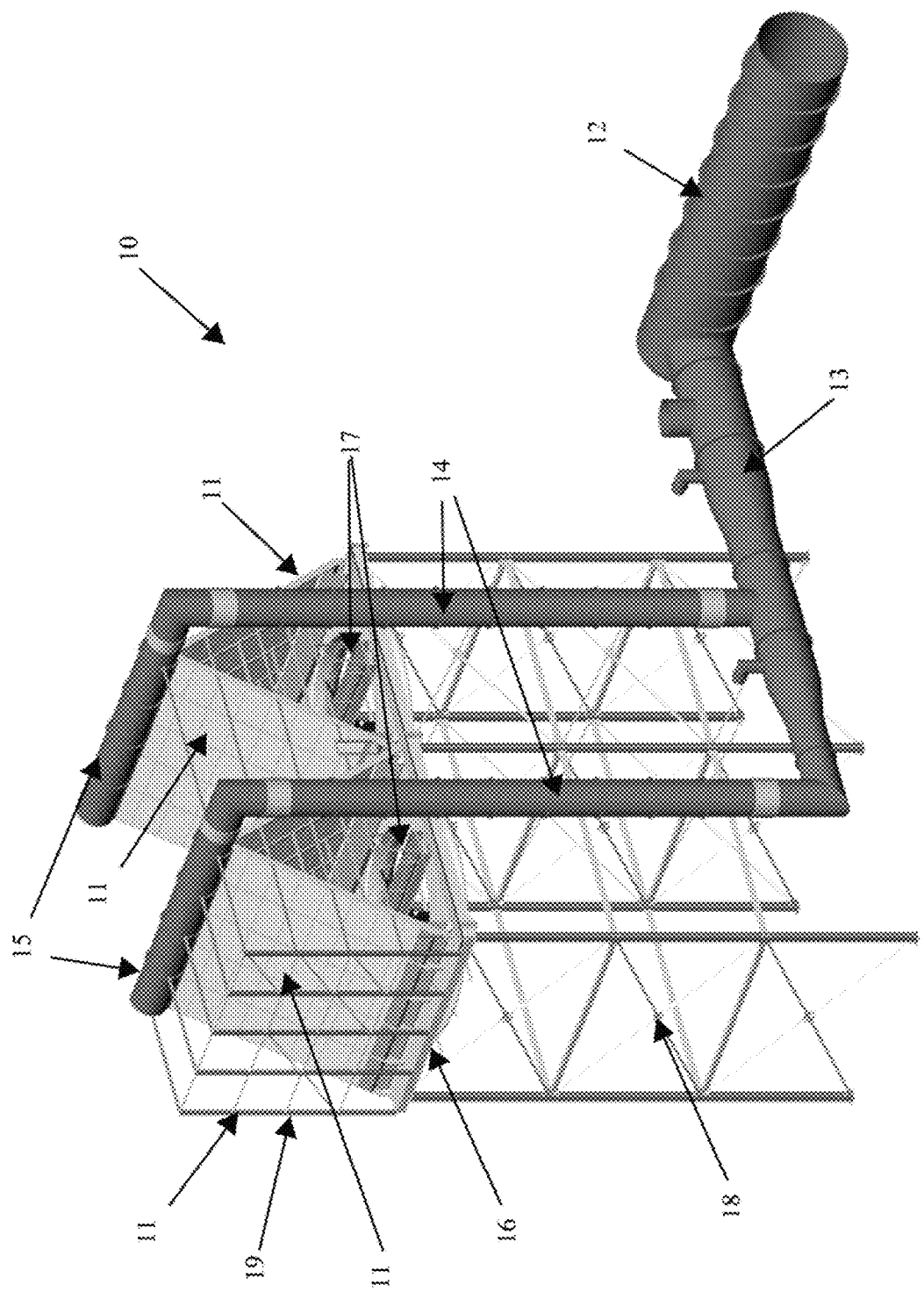
FIG. 1 is a schematic of a prior art air-cooled condenser unit.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Multiple inventive concepts are described herein and are distinguished from one another using headers in the description that follows. Specifically, FIGS. 1-10 are relevant to a first inventive concept, FIGS. 11-17 are relevant to a second inventive concept, and FIGS. 18-21 are relevant to a third inventive concept. Inventive concept four has no drawings associated therewith. The first through fourth inventive concepts should be considered in isolation from one another. It is possible that there may be conflicting language or terms used in the description of the first through fourth inventive concepts. For example, it is possible that in the description of the first inventive concept a particular term may be used to have one meaning or definition and that in the description of the second inventive concept the same term may be used to have a different meaning or definition. In the event of such conflicting language, reference should be made to the disclosure of the relevant inventive concept being discussed. Similarly, the section of the description describing a particular inventive concept being claimed should be used to interpret claim language when necessary.

I. Inventive Concept 1

With reference to FIGS. 1-10, a first inventive concept will be described.

A typical air-cooled condenser unit 10 is shown in FIG. 1 and comprises a plurality of inclined tube bundles 11 arranged in an A-frame structure. A main stem duct 12 delivers steam from a turbine into a distribution manifold 13. The steam passes through the distribution manifold 13 and into the risers 14, where it then flows into the distribution headers 15. The distribution headers 15 deliver the steam into the inclined tube bundles 11 where thermal energy from the steam is transferred to air flowing on the outside of the inclined tube bundles 11. The tube bundles 11 are positioned atop a fan deck platform 16 that comprises a plurality of fans 17 for forcing cooling air to flow adjacent and through the inclined tube bundles 11. The fan deck platform may be situated atop a frame 18 so that cooling air can be drawn upward. A windwall structure 19 may also be provided.

Figure 2:
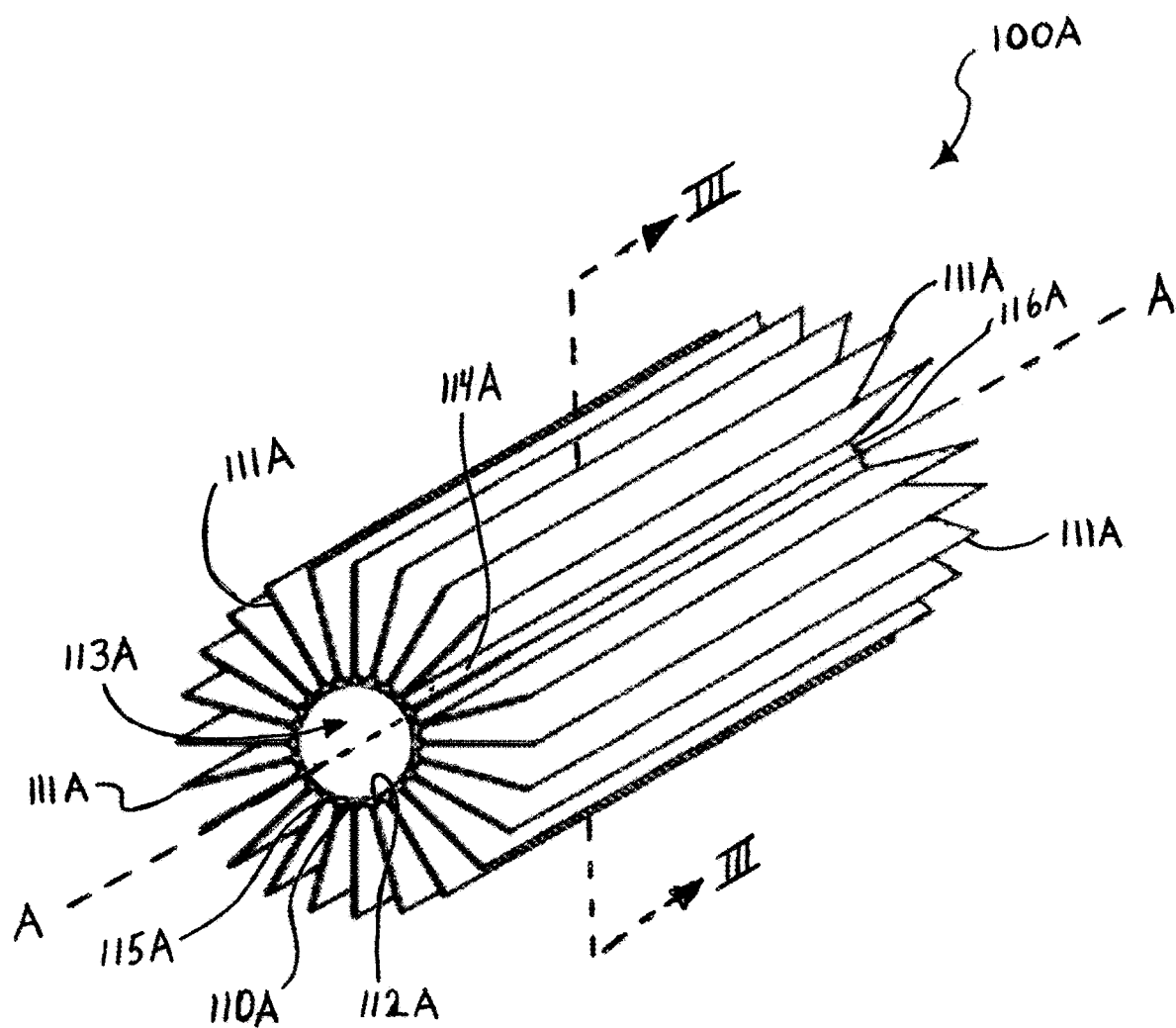
FIG. 2 is a perspective view of an extruded find tube section according to an embodiment of the present invention.
Figure 3:
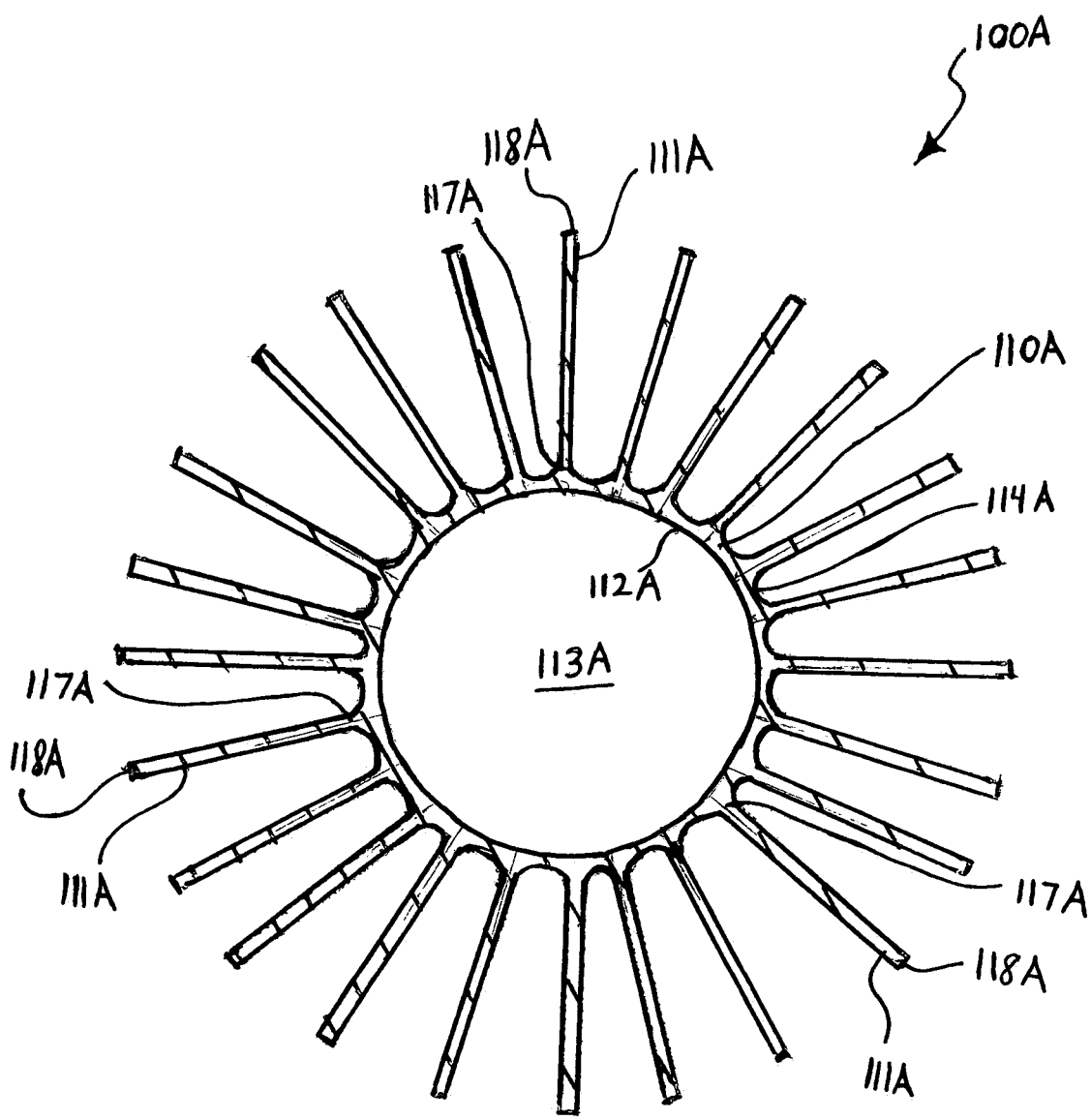
FIG. 3 is a transverse cross-section of the extruded find tube section of FIG. 2 taken along view III-III.

Referring first to FIGS. 2 and 3 concurrently, a finned tube section 100A according to an embodiment of the present invention is exemplified. The finned tube section 110A extends from a first end 115A to a second end 116A along a longitudinal axis A-A. In the exemplified embodiment, the finned tube section 100A is an elongated tubular structure that is substantially linear and particularly suitable for creating a vertical tube bundle for an air-cooled condenser of a power generation plant. As discussed below, in certain embodiments, a plurality of the finned tube sections 100A can be formed and coupled together in axial alignment to form a single finned tube. In one such embodiment, the finned tube sections 100A have a length between 4 to 8 feet and are installed vertically in such sections. The invention, however, is not so limited and, in certain embodiment, the finned tube section 100A can be formed of a sufficient length such that a single finned tube section 100A forms a single finned tube. In such an embodiment, the first end 115A of the finned tube section 100A will be the top end of the finned tube while the second end 116A of the finned tube section 100A will be the bottom end of the finned tube (or vice versa). As discussed below, the finned tube section 100A is a heat exchange tube in that it effectively transfers thermal energy from a tube-side fluid, such as steam, that is flowing inside of the finned tube section 100A to a shell-side fluid, such as air, that is flowing adjacent the finned tube section 100A on the exterior thereof.

The finned tube section 100A generally comprises a tube 110A and a plurality of fins 111A extending radially outward from the tube 110A. The tube 110A comprises an inner surface 112A that forms a cavity 113A and an outer surface 114A from which the plurality of fins 111A protrude/extend. The cavity 113A extends along a longitudinal axis A-A. In certain embodiments (i.e., embodiment in which an inner tube is not needed), the cavity 113A acts as a tube-side fluid path in which the inner surface 112A is exposed to the tube-side fluid. In embodiments in which an inner tube is used (described later with respect to FIGS. 8-11), the tube 110A can be considered an outer tube, the inner surface 112A of which is not exposed to the tube-side fluid (such as steam generated in a Rankine power cycle). In the exemplified embodiment, the tube 110A has a substantially circular transverse cross-section.

The tube 110A also comprises an outer surface 114A. The plurality of fins 111A protrude radially outward from the outer surface 114A of the tube 110A. In one embodiment, the finned tube section 100A is formed by an extrusion process. As a result, the plurality of fins 111A are integral with the tube 110A. More specifically, in one such embodiment, both the tube 110A and the plurality of fins 11A are simultaneously formed in a single extrusion process using a first material, such as an extrudable metal or metal alloy. In one specific embodiment, the finned tube section 100A (including both the plurality of fins 111A and the tube 110A) are formed of a material having a coefficient of thermal conductivity. Suitable materials include, for example, aluminum or aluminum alloy. The utilization of an extruded finned tube section 100A allows for the compaction and simplification of the overall heat exchanger, as compared with the state of the art cross flow designs.

While forming the entirety of the finned tube section 100A by a single extrusion step is preferred in certain embodiments, the invention is not so limited in other embodiments. In certain other embodiments, the tube 110A may be extruded in one step and the fins 11A may be extruded subsequently or prior thereto during a separate step, and then subsequently coupled (directly or indirectly) to the tube 110A through brazing, welding, thermal fusion, mechanical coupling, or other processes. In still other embodiments, the tube 110A and the fins 111A can be formed separately by techniques other than extrusion, such as machining, bending, pressing, die-cutting, stamping, and/or combinations thereof.

In the exemplified embodiment, each of the plurality of fins 111A extends substantially parallel with the longitudinal axis A-A and covers the entire length of the tube 110A, wherein the length is measured from the first end 115A to the second end 116A. Moreover, each of the plurality of fins 111A extends radially outward from the outer surface 114A of the tube 110A in a linear fashion from a base portion 117A to a distal end 118A. The base portions 117A can be thicker than the remaining portions of the fins 11A, thereby promoting stability and conductive heat transfer into the fins 111A. In the illustrated embodiment, the fins 111A are linear in their longitudinal extension. However, in alternate embodiments, the fins 111A may be extruded or otherwise formed with an undulating (wave) geometry to promote heat transfer.

As can best be seen in FIG. 3, the plurality of fins 111A are arranged about the circumference of the outer surface 114A of the tube 110A at uniform angular intervals. In the illustrated embodiment, the twenty four (24) fins 111A are provided on the tube 110A so that an angular interval of approximately 15° exists between adjacent fins 111A. Of course, the exact number of fins 111A, along with the angular spacing between them can vary as needed. For example, depending on the diameter of the tube 110A and the heat duty demand, the number and height of the radial fins 111A can be selected. The tube 110A can have as many radial fins 111A as the state of the art extrusion technology will allow. In one exemplary embodiment, providing 24 fins 111A on a 1.5 inch nominal ID tube 110A, wherein each fin 111A is 1.5 inch high has been determined to be feasible. A larger number of fins may be achieved if a larger size tube is selected.

Figure 4:
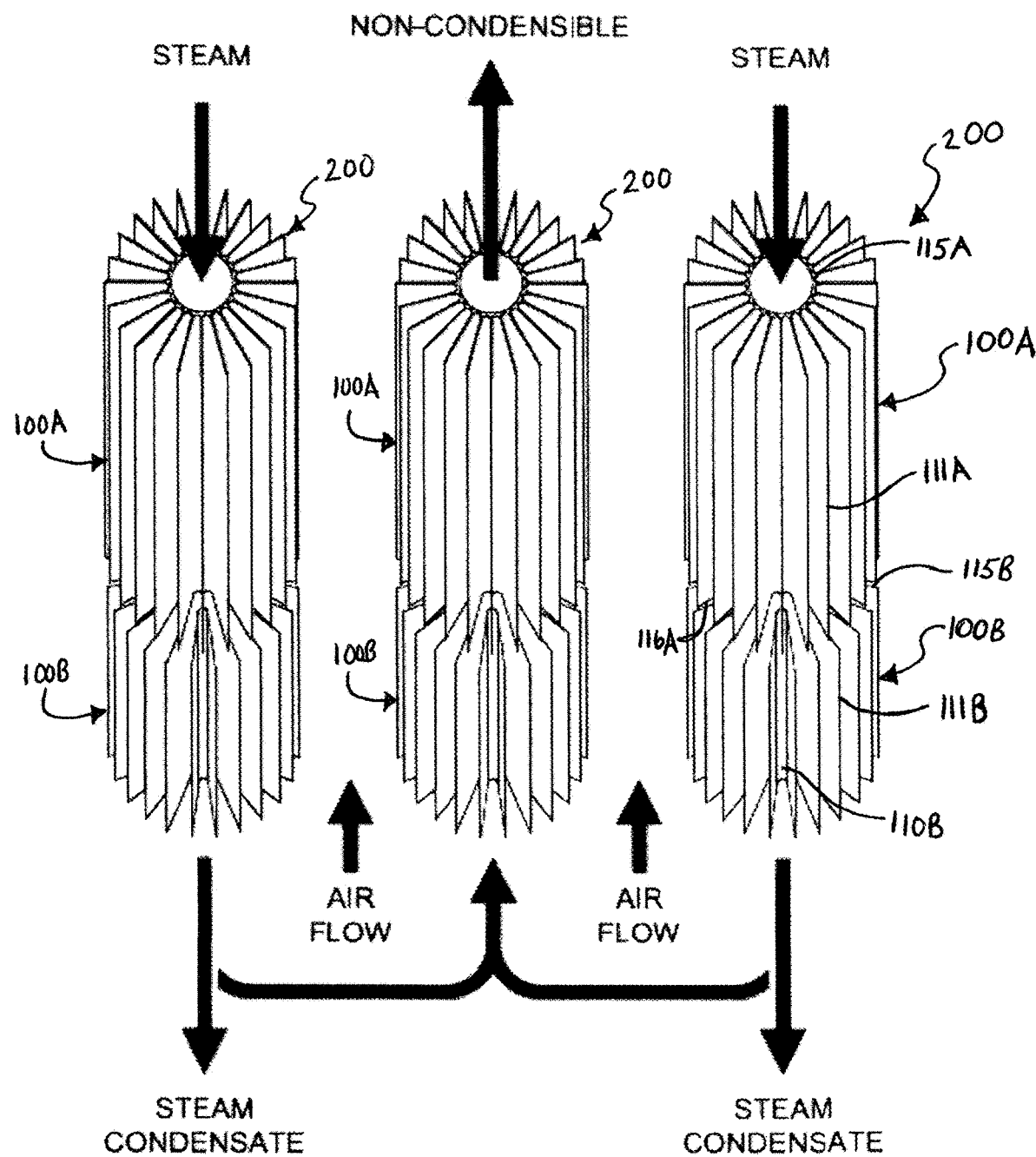
FIG. 4 is a perspective view of three finned tubes, each of the finned tubes formed by a plurality of the finned tube sections of FIG. 2 according to an embodiment of the present invention.

Referring now to FIG. 4, the formation of a finned tube 200 using a plurality of the finned tube sections 100A-B according to an embodiment of the present invention will be described. FIG. 4 illustrates three of these finned tubes 200, which are identical for the formation and structural purposes described herein, despite their different functionality when incorporated into a tube bundle. The arrows indicating steam flow in the finned tubes 200 results from the arrangement shown in FIGS. 5-6, which will be described later in this document. For purposes of simplicity, only one of the finned tubes 200 will be described with the understanding that the discussion is applicable to all of the finned tubes 200 in FIG. 4 and/or used to form a tube bundle according to the present invention.

As exemplified, the finned tube 200 comprises two finned tube sections 100A, 100B. Finned tube section 100A is described above with reference to FIGS. 2-3, and is referred to herein as a first finned tube section 100A. Finned tube section 100B (only a portion of which is shown in FIG. 4) is identical to finned tube section 100A in all aspects but is either subsequently or previously formed using one of methods discussed above. The finned tube section 100B is referred to herein as the second finned tube section 100B. Like numbers are used to like parts of the first and second finned tube sections 100A, 100B with the exception that the suffix "B" is used to denote the parts of the second finned tube section 100B rather than the suffix "A," which is used in FIGS. 2-3 to describe the first finned tube section 100A.

As mentioned above, the finned tube 200 comprises a first finned tube section 100A and a second finned tube section 100B arranged in axial alignment. The first finned tube section 100A and the second finned tube section 100B are aligned adjacent one another so that the longitudinal axes A-A of the first and second finned tube sections 100A, 100B are substantially aligned and coaxial. When so aligned, the first end 115B of the second tube 110B of the second finned tube section 100B abuts the second end 116A of the first tube 110A of the first finned tube section 100A.

While the first and second finned tube sections 100A, 100B are aligned so that their longitudinal axes A-A are aligned, the first and second finned tube sections 100A, 100B (which are adjacent finned tube sections in the finned tube 200) are rotated relative to one another so that corresponding ones of their fins, 111A, 111B are angularly offset from one another. This can improve heat transfer from the tube-side fluid (e.g., steam) to the shell-side fluid (e.g., air). The angular offset, in one embodiment is 1° to 20°. In another embodiment, the angular offset is 5° to 10°.

This concept will be described below with respect to an example to ensure understanding. Assume that the first finned tube section 100A was placed in proper alignment and position in an angular/rotational position in which one of its fins 111A were angularly located at each of the cardinal points (N, S, E, & W). The second finned tube section 100B would then be position in axial alignment with the first finned section 100A in an angular/rotational position in which none of its fins 111B were located at the cardinal points. Rather, the second finned section 100B would be in an angular/rotational position in which one of its fins 111B is offset from each of the cardinal points by the angular offsets described above, such as for example 5° to 10°. In alternate embodiments, however, the fins 111A, 111B of the first and second finned sections 100A, 100B may be angularly aligned if desired.

Once the first finned tube section 100A and second finned tube section 100B are aligned and rotationally oriented as described above, the first and second finned tube sections 100A, 100B are coupled together, thereby forming the finned tube 200. The exact technique used to couple, either directly or indirectly, the first finned tube section 100A and second finned tube section 100B together will depend on the material(s) of which the first finned tube section 100A and second finned tube section 100B are constructed. Suitable connection techniques include mechanical fastening in which gaskets or other materials can be used achieve a hermetic interface, welding, brazing, thermal fusing, threaded connection, use of a coupler sleeve, a tight-fit connection, and/or combinations thereof. As described below with respect to FIGS. 8-10, coupling of the first and second finned tube sections 100A, 100B can also be accomplished using an inner tube.

While the finned tube 200 is exemplified as having only two finned tube sections 100A, 100B, the finned tube 200 can be formed of more or less finned tube sections 100A as desired. In embodiments of the finned tube 200 in which more than two finned tube sections 100A, 100B are used, the aforementioned rotational offset can be implemented between each pair of adjacent finned tube sections.

Figure 5:
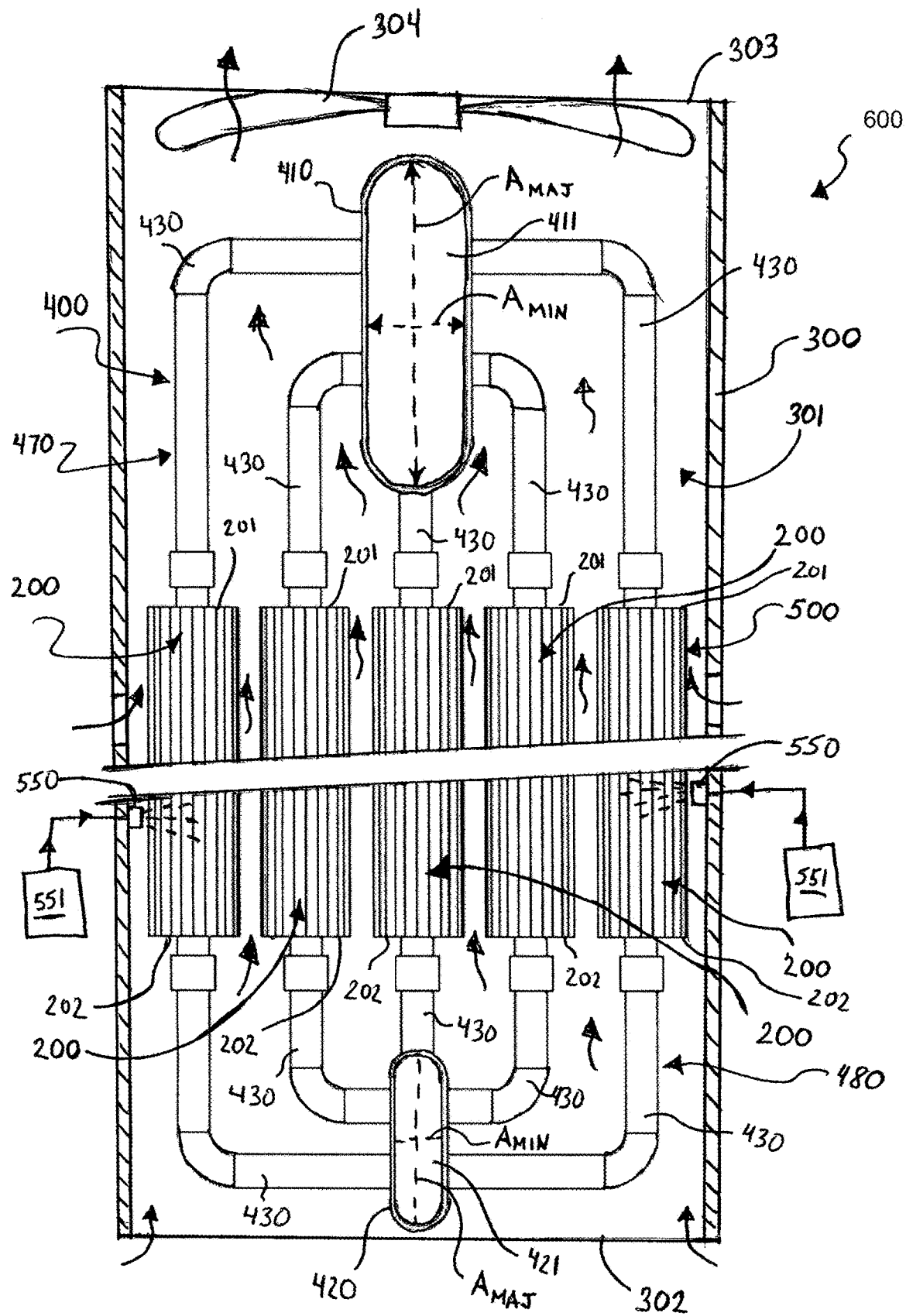
FIG. 5 is a schematic of an air-cooled condenser comprising a tube bundle assembly according to an embodiment of the present invention positioned within a shell and coupled to a source of steam generated in a Rankine cycle of a power generation plant.

Referring now to FIG. 5, an air-cooled condenser 600 according to an embodiment of the present invention is illustrated. The air-cooled condenser 600 is a true counter-current/parallel flow air-cooled condenser that, in one embodiment, is constructed with the finned tubes 200 formed of extruded aluminum or aluminum alloy finned tube section 100A, 100B in a vertical array (or matrix) configuration.

The air-cooled condenser 600 generally comprises a shell 300 and a tube bundle assembly 400. The tube bundle assembly 400 is positioned within an internal cavity 301 of the shell 300. The shell 300 has an open top end 302 and an open bottom end 303 As a result, cool air can flow into the open bottom end 302, flow through the internal cavity 301 where it flows adjacent the finned tubes 200 and becomes warmed, and exists the shell 300 as warmed air. A blower 304, in the form of a fan or other mechanism capable of inducing air flow, can be provided either above and/or below the tube bundle assembly 400. While a single blower 304 is illustrated, more blowers can be implemented as desired to meet functional demands. In other embodiments, the blower may be omitted.

The tube bundle assembly 400 generally comprises a tube bundle 500 formed by a plurality of the finned tubes 200, a top header pipe 410, a bottom header pipe 420, and a plurality of feeder pipes 430. Each of the plurality of the finned tubes 200 of the tube bundle 500 are oriented in a substantially vertical orientation so that the longitudinal axes A-A (FIG. 2) thereof extend substantially vertical. The finned tubes 200 of the tube bundle 500 may be arrayed in a triangular, rotated triangular, rectangular or another suitable layout that provides for a uniformly distributed flow area across the tube bundle. In the exemplified embodiment, the finned tubes 200 of the tube bundles 500 are arrayed in 3×5 rectangular arrays (see FIG. 6). A desired feature of the tube bundle layout geometry is the ability to make a closely packed bundle of the finned tubes 200 such that the air flowing axially along the finned tubes 200 is in close proximity to the finned tubes' 200 outer surfaces. Factory assembled modules can be delivered and connected into the steam distribution network of a Rankine cycle fluid circuit of a power generation planet, thereby providing an economical heat rejection alternative for small and large scale applications.

Each of the finned tubes 200 of the tube bundle 500 is coupled to and fed steam from the top header pipe 410, which is in turn operably coupled to a source of steam, such as turbine in a Rankine cycle power generation circuit. Similarly, each of the finned tubes 200 of the tube bundle 500 is coupled to the bottom header pipe 420 so that condensate can gather and be fed back into the Rankine cycle fluid circuit of the power generation plant. In the exemplified embodiment, a top end 201 of each of the finned tubes 200 of the tube bundle 500 is fluidly coupled to the top header pipe 410 by a separate upper feeder pipe 430. Similarly, a bottom end 202 of each of the finned tubes 200 of the tube bundle 500 is fluidly coupled to the bottom header pipe 420 by a separate lower feeder pipe 430. As a result, a hermetic fluid path is formed through the cavity 113A (FIG. 2) of each of the finned tubes 200 from the inlet header cavity 411 of the top header pipe 410 to the outlet header cavity 421 of the bottom header pipe 420. The top header pipe 410 is located at an elevation that is greater than the elevation at which the bottom header pipe 420 is located. The top header pipe 410 and the upper feeder pipes 430 can be collectively considered a top network of pipes 470 while the bottom header pipe 420 and lower feeder pipes 430 can be collectively considered a bottom network of pipes 480.

The top header pipe 410 extends along a longitudinal axis B-B (FIG. 5) that is substantially horizontal. Similarly, the bottom header pipe 420 also extends along a longitudinal axis that is substantially horizontal. In other embodiments, the top and bottom header pipes 410, 420 may be inclined.

The top header pipe 410 is located above the tube bundle 500 while the bottom header pipe 420 is located below the tube bundle 500. The top and bottom header pipes 410, 420, however, are specifically designed so as to create minimal impedance and/or obstruction to the vertical flow of air entering and exiting the tube bundle 500. In order to accomplish this, each of the top and bottom header pipes 410, 420 is designed to have a transverse cross-section having a major axis $A_{MAJ}$ and a minor axis $A_{MIN}$. Moreover, each of the top and bottom header pipes 410, 420 is oriented so that the minor axis $A_{MIN}$ extends substantially perpendicular to the direction of the air flow through the tube bundle 500. Thus, in the exemplified embodiment, the minor axis $A_{MIN}$ extends substantially horizontal while the major axis $A_{MAJ}$ extend substantially vertical. The major axis $A_{MAJ}$ has a length that is larger than the length of the minor axis $A_{MIN}$ for both the top and bottom header pipes 410, 420. In one such embodiment, the major axis $A_{MAJ}$ has a length that is at least twice the length of the minor axis $A_{MIN}$ for both the top and bottom header pipes. By designing and orienting the transverse cross-sections of the top and bottom header pipes 410, 420 to have the aforementioned major axis $A_{MAJ}$ and minor axis $A_{MIN}$, the top and bottom header pipes 410, 420 achieve two criteria: (1) adequate flow area for the tube side fluid; and (2) maximum opening between the adjacent headers to minimize friction loss to the entering (bottom header) and exiting (top header) air (see FIG. 6 also). While not visible from the drawings, each of the horizontal sections of the feeder pipes 430 may also be designed to have a transverse cross-section comprising a major axis $A_{MAJ}$ and a minor axis $A_{MIN}$, and be oriented, as discussed above and below with respect to the top and bottom headers 410, 420.

In one embodiment, the top and bottom header pipes 210, 220 (along with the horizontal sections of the feeder pipes 430) each have an obround transverse cross-section. The obround shape allows for a large internal flow area for steam while affording ample space for the air to enter and exit the tube bundle 500 via spaces between the header pipes 410, 420 (and horizontal sections of the feed pipes 430). The obround transverse cross section with the flat (long) sides vertical is a preferred arrangement when the tube side fluid is low pressure steam or vapor. As mentioned above, the top header pipe 510 serves as the inlet for the vapor (exhaust steam) (see FIG. 3 for a typical inlet header profile).

Figure 6:
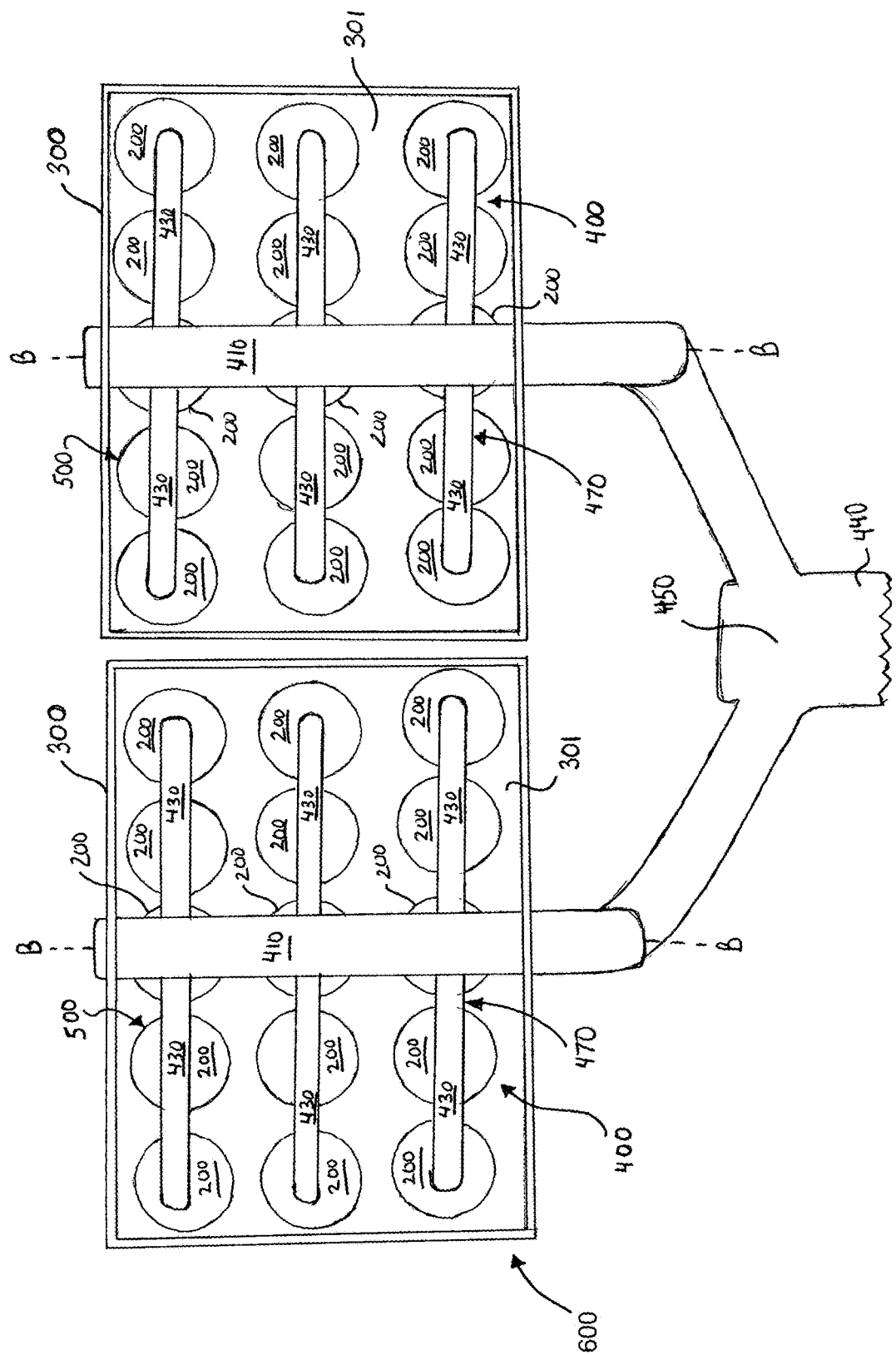
FIG. 6 is a top view of the air-cooled condenser of FIG. 5 wherein multiple tube bundle assemblies are shown coupled to an inlet manifold at a single point or juncture.

As can be seen in FIG. 6, the air-cooled condenser can comprises a plurality of tube bundles 500 housed in separate shells 300. In other embodiments, more than one tube bundle 500 can be housed in a single shell 300. All of the inlet header pipes 410 are preferably manifolded from a single point 450 of a main steam supply line 440. Furthermore, each of the tube bundles 500, along with the shell 300 may be positioned atop a fan deck, which is in turn positioned atop a frame structure (as shown in FIG. 1).

Referring back to FIG. 5, the up flowing cooling air may be sprayed with a mist of coolant generated by spray nozzles 550 located within the shell 300 at a height between the top header pipe 410 and the bottom header pipe 420. The spray nozzles 550 are operably and fluidly coupled to coolant reservoirs 551 and further configured to atomize the liquid coolant into a fine mist that is introduced into the air flowing through the tube bundles 500. Spaying the mist into the air flow at intermediate height(s) increases the LMTD and promotes heat rejection from the tube side fluid (i.e. the steam). This form of cooling augmentation is unique to this heat exchanger design and results in substantial performance gains of 25 to 30% depending on the ambient conditions. These performance gains can be realized in improved warm weather performance or capital cost reduction and smaller plot area constraints.

Figure 7:
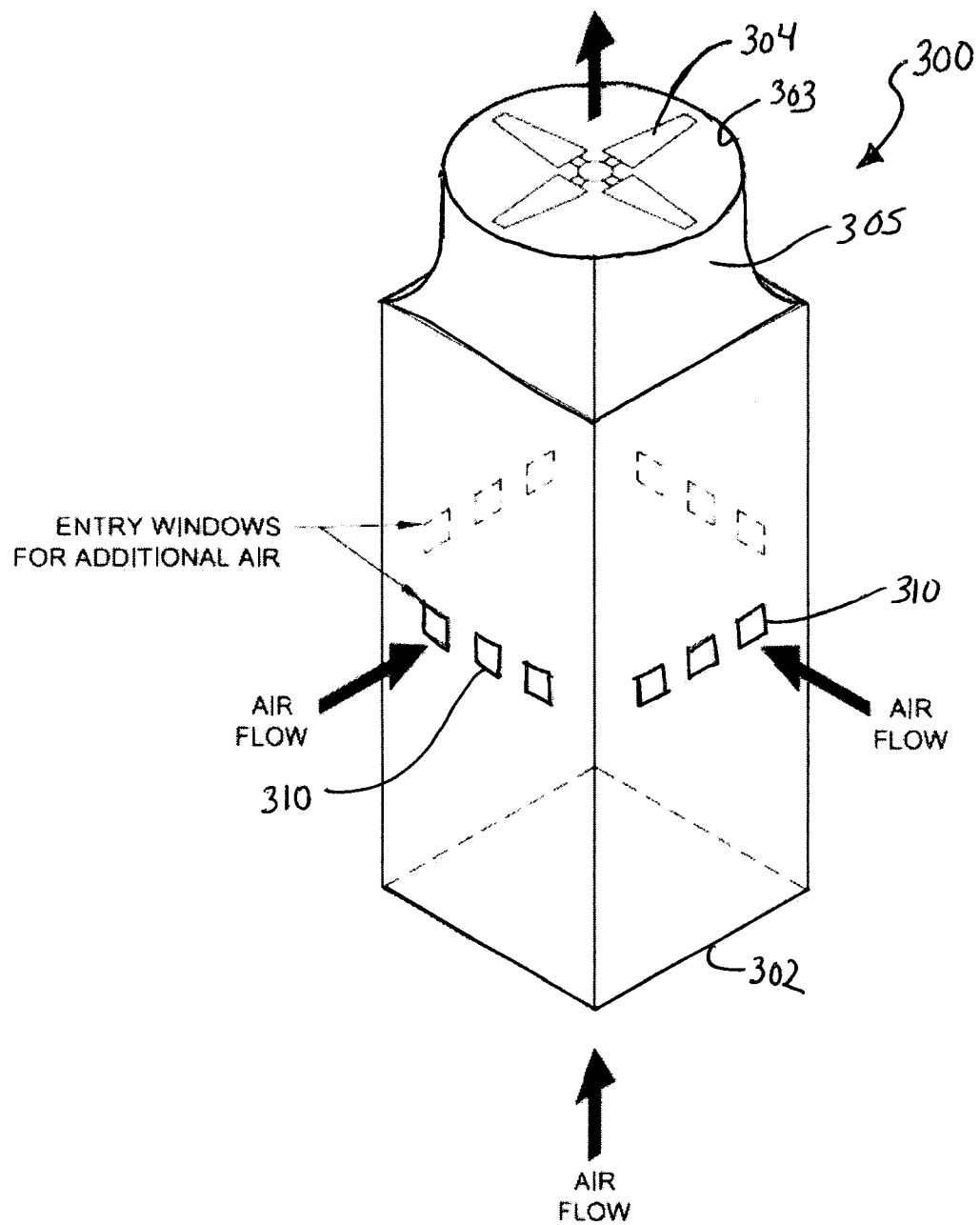
FIG. 7 is a perspective view of a shell according to an embodiment of the present invention.

Referring now to FIG. 7, a housing 300 suitable for use in the air-cooled condenser 600 of FIGS. 5 and 6 is illustrated. Depending on the available height, a "chimney" space 305 above the bundle can be incorporated in the unit to increase the natural draft height. This will reduce the amount of electrical energy required to pump the cooling air through the bundle. In designs where the blower 304 is located above the tube bundle 500, it is possible to provide for additional entry windows 310 for air to enter the tube bundle 500, which will promote increased heat transfer from the tube-side fluid.

Figure 8:
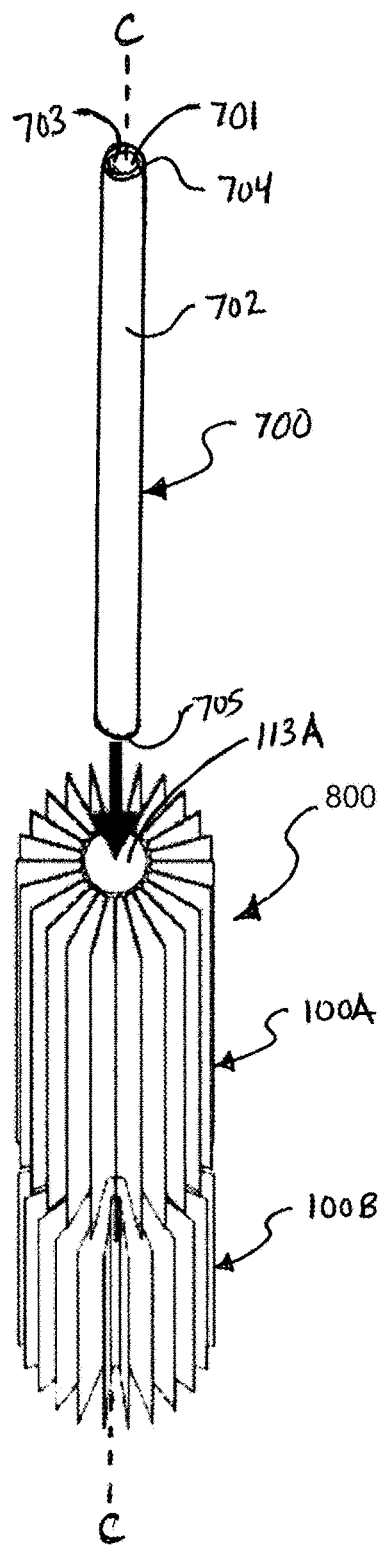
FIG. 8 is a perspective view of an inner tube being slid into two finned tube sections during an initial step of a finned tube formation method according to another embodiment of the present invention.
Figure 9:
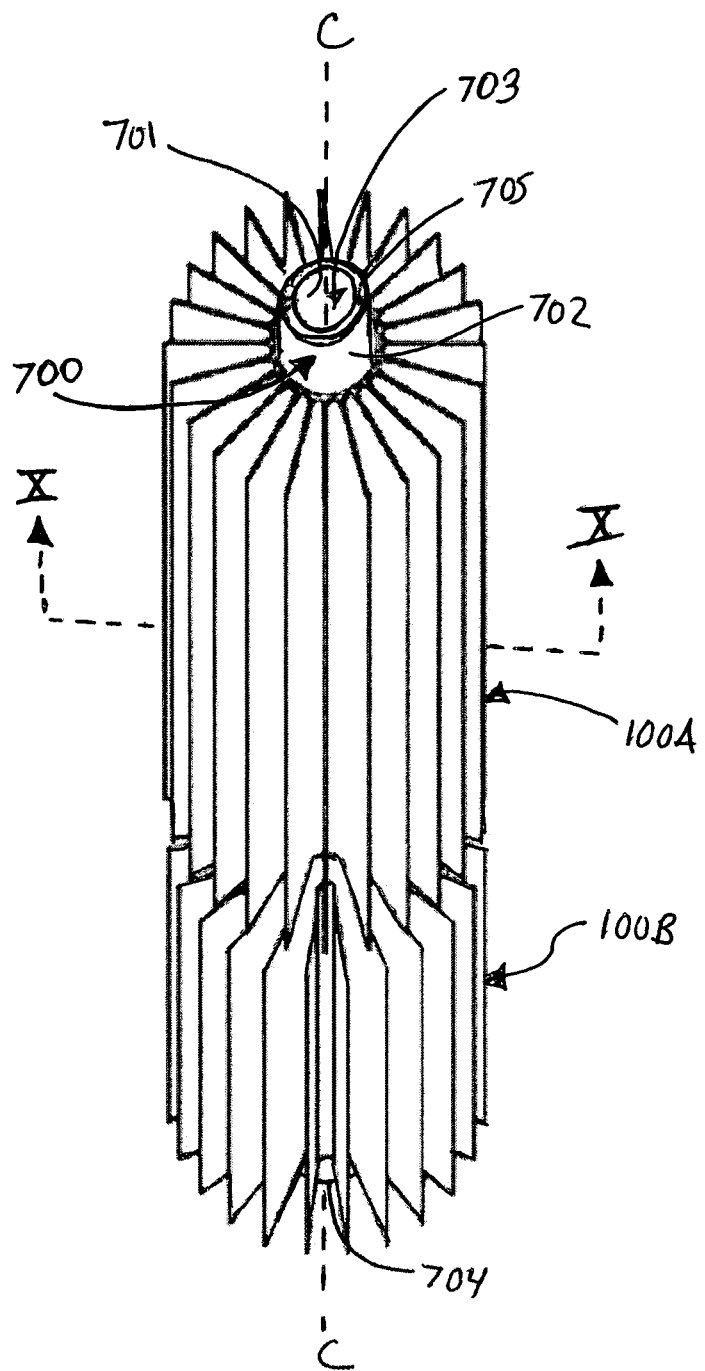
FIG. 9 is a perspective view of the inner tube extending through the two finned tube sections during a subsequent step of a finned tube formation method according to another embodiment of the present invention.
Figure 10:
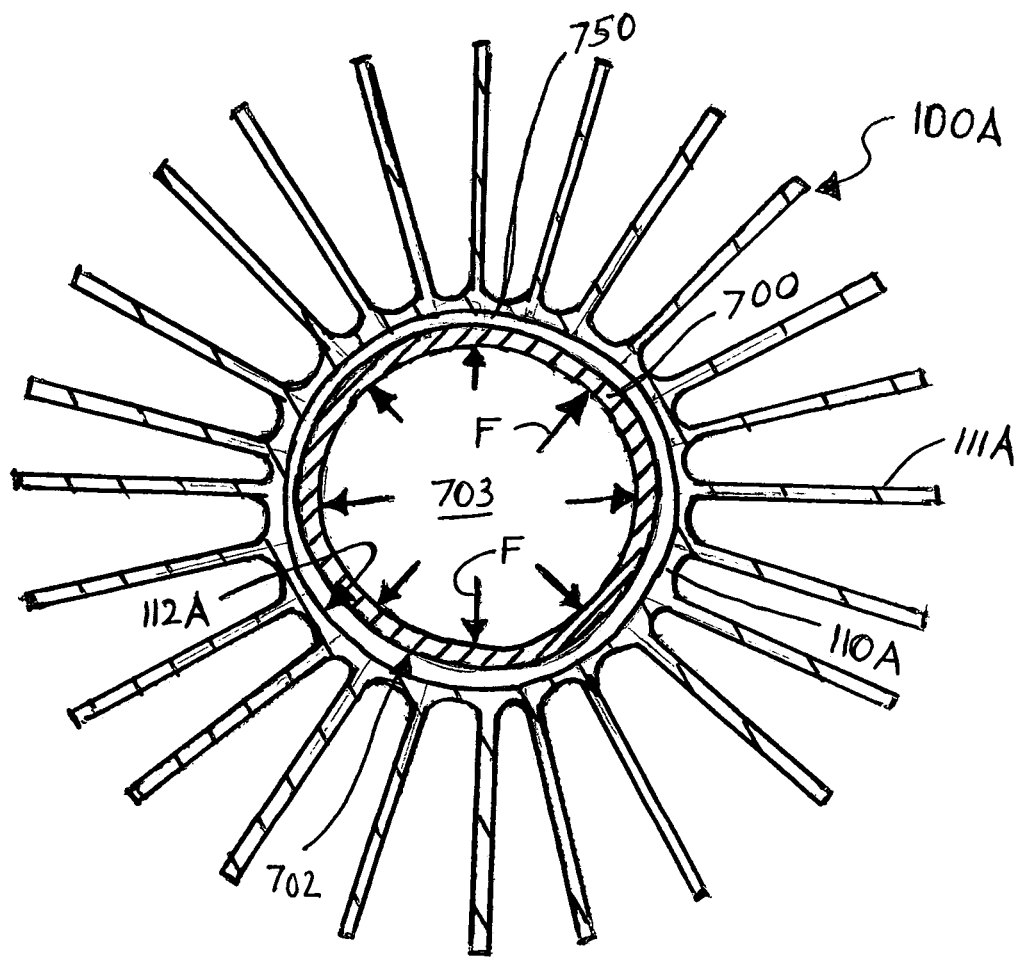
FIG. 10 is a transverse cross-section of the finned tube assembly of FIG. 9 taken along view X-X, wherein the inner tube has not yet been expanded.

Referring now to FIGS. 8-10, an alternative construction of the finned tube 800 is described in which the final finned tube 800 comprises the finned tube sections 100A, 100B and an inner tube 700. Such an arrangement is particularly useful in power plants where the condensing steam is not permitted to come in contact with aluminum or aluminum alloy of the finned tube sections 100A, 100B. The finned tube 800 can be sued in the air-cooled condenser 600 described above in lieu of or in addition to the finned tubes 200.

Referring first to FIG. 8, the first and second finned tube sections 100A, 100B are formed, aligned and oriented as described above with respect to FIGS. 2-4. Once this is done, an inner tube 700 is provided and axially aligned with the cavities 113A, 113B of the first and second finned tube sections 100A, 100B along a longitudinal axis C-C. The inner tube 700 is formed of a material that is different than the material of which the first and second finned tube sections 100A, 100B are formed. In one embodiment, the inner tube 700 is formed of a material having a high yield strength, is non-corrosive, and is weldable. A suitable material includes steels, with stainless steel being preferred.

The inner tube 700 extends along an axis has an outer surface 702 and inner surface 701, which forms cavity 703. The inner tube 700 extends from a bottom end 705 to a top end 704 along the longitudinal axis C-C.

Referring now to FIGS. 9 and 10 concurrently, the inner tube 700 is then slid through the cavities 113A, 113B of the finned tube sections 100A, 100B. In the exemplified embodiment, the top end 704 of the inner tube 700 protrudes slightly from the top end of the first finned tube section 100A while the bottom end 705 of the inner tube 700 protrudes slightly from the bottom end of the second finned tube section 100B (FIG. 9). At this stage, the outer diameter of the inner pipe 700 is smaller than the inner diameter of the tubes 110A, 110B. As a result, a interstitial space 750 exists between the outer surface 702 of the inner tube 700 and the inner surfaces 112A, 112B of the tubes 110A, 110B.

Once the inner tube 700 is so positioned, the inner tube 700 is diametrically expanded by applying a force F. Diametric expansion of the inner tube can be achieved by a variety of methods, including hydraulic pressure.

The diametric expansion of the inner tube 700 continues until the outer surface 702 of the inner tube 700 is in substantially conformal surface contact with the inner surfaces 112A, 112B of the finned tube sections 100A, 100B, thereby forming the finned tube 800. As a result the interstitial space 750 disappears and there are substantially no gaps and/or voids between the outer surface 702 of the inner tube 700 and the inner surfaces 112A, 112B of the finned tube sections 100A, 100B. In embodiments using the inner tube 700, the tubes 110A, 110B can be considered outer tubes.

The inner tube 700 couples the finned tube sections 100A, 100B together and thus can be used instead of or in conjunction with the other coupling techniques discussed above for FIG. 4. When the resulting finned tube 800 is incorporated into the air-cooled condenser 600, the inner tube 700 can be sued to make the welded joints between the top pipe network 470 and/or the bottom pipe network 460, as shown in FIG. 5. Additionally, when the inner tube 700 is used, the first and second inner tubes 100A, 100B do not have to be in abutment to effectuate coupling. Because the inner tube 700 (in contact with the condensing steam) is at a higher temperature than the finned tube sections 110A, 100B, the risk of the inter-tube interface becoming loose during service is ameliorated.

EXAMPLE

Comparison of a conventional (inclined bundle) air-cooled condenser (FIG. 1) and an air-cooled condenser according to the present invention is set forth below in the following table for the performance of the two design concepts:

|  | Conventional A-Frame ACC | HI-VACC | Percent Difference |
|---|---|---|---|
| Thermal Duty, mmBtu/hr | 860 | 860 | — |
| Condensing Pressure, "HgA | 2.0 | 2.0 | — |
| Ambient Air Temperature, ° F. | 60 | 60 | — |
| Number of Cells Required | 20 | 12 | −40% |
| ACC Plot Area (L × W), ft | 238 × 170 | 240 × 80 | −53% |
| ACC Height, ft | 104 | 79 | −24% |
| Total Extended Heat Transfer Surface, ft² | 8,919,200 | 7,977,250 | −10% |
| Total Fan Shaft Power, kW | 2700 | 2700 | — |

The design concepts disclosed herein can be used in a wide variety of coolers that seek to employ air as the cooling medium. Its application to design air cooled condensers to condense exhaust steam in power plants will lead to reduced cost and reduced land area requirement. Additional advantages of the present invention are: (1) modular installation; (2) reduced site construction effort compared to the A-frame design; (3) significantly reduced quantity of structural steel required to erect the system; and (4) ability to reduce fan power consumption by adding an exhaust stack (chimney) to the design.

2. Inventive Concept 2

With reference to FIGS. 11A-17, a second inventive concept will be described.

Figure 11A:
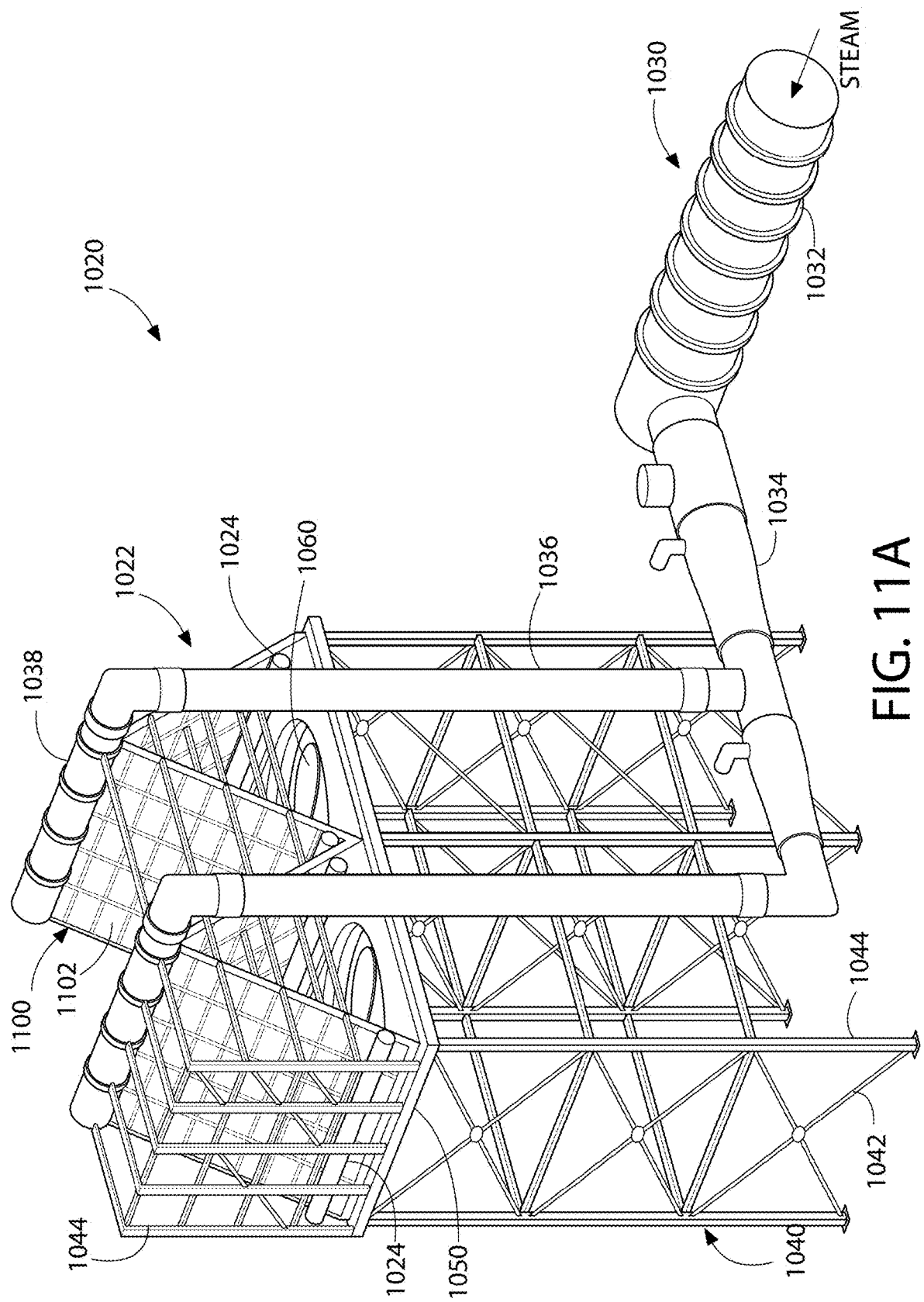
FIG. 11A is a perspective view of an air cooled condenser system according to one embodiment of the present disclosure.

FIG. 11A depicts a heat exchanger in the form of an air cooled condenser (ACC) system 1020 as used in a thermal electric power generation plant for converting low pressure steam into liquid ("condensate"). Air cooled condenser system 1020 includes an air cooled condenser 1022 and exhaust steam supply 1030 which in one embodiment is fluidly connected to the steam exhaust from the turbine of a turbine-generator set 1025 (see FIG. 11B) as will be known to those skilled in the art. In the present embodiment being described, the fluid is initially low pressure turbine exhaust steam (vapor phase of water) upstream of the air cooled condenser and liquid condensate (condensed water) downstream of the air cooled condenser.

In one embodiment, the steam supply 1030 includes a main steam duct 1032 which is fluidly coupled to a piping distribution manifold 1034 that branches into a plurality of risers 1036 and distribution headers 1038 for conveying inlet steam into the air cooled condenser 1022, as shown. Risers 1036 may be generally vertically oriented and distribution headers 1038 may be generally horizontally oriented. Each set of risers 1036 and distribution headers 1038 supply steam to an array of condenser tube bundles 1100 comprised of a plurality of individual finned tubes 1102. Tubes 1102 each have inlet ends 1126a fluidly coupled to one of the distribution headers 1038 to receive water in the steam phase and outlet ends 1126b fluidly coupled to a condensate outlet header 1024 which collects the condensed steam or condensate (liquid phase water) from the tubes.

Figure 11B:
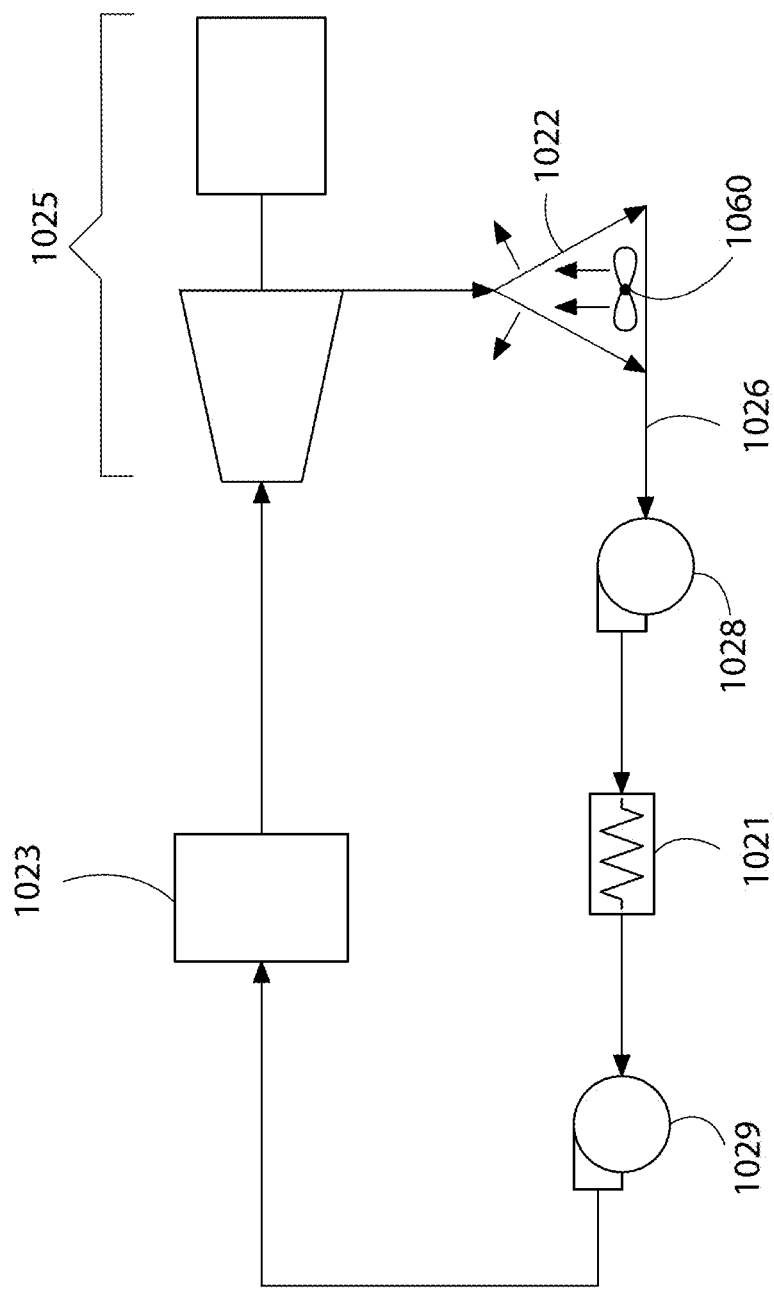
FIG. 11B is a schematic flow diagram of a Rankine cycle and components for a thermal power generating plant.

With additional reference to FIG. 11B showing a schematic diagram of a conventional Rankine cycle of a thermal electric power generation plant, the outlet headers 1024 are fluidly connected to condensate return piping 1026 to route the liquid condensate back to a condensate return pump 1028 which pumps the condensate to the steam generator ("boiler") feed system. The condensate ("feedwater" at this stage in cycle) is generally pumped through one or more feedwater heaters 1021 to pre-heat the feedwater. Feedwater pumps 1029 pump the feedwater to a steam generator 1023 (e.g. nuclear or fossil fuel fired) where the liquid feedwater is evaporated and converted back to steam. The steam flows through a turbine-generator set 1025 which produces electricity in a known manner. The pressure of the steam drops as it flows through the turbine converting thermal and kinetic energy into electric energy. The low pressure steam at the outlet of the turbine is collected and returned to the main steam duct 1032 to complete the flow path back to the air cooled condenser system 1020.

Referring back to FIG. 11A, the air cooled condenser 1022 further includes a support structure 1040 to elevate the tube bundles 1100 above the ground so that air may be blown vertically up through the tube bundles from below in one possible embodiment by an air moving system comprised of a plurality of forced draft fans 1060 (fan blade shown in FIG. 11A). The fans 1060 are each mounted on a fan deck platform 1050 supported by support structure 1040. In one preferred embodiment, the fan deck platform 1050 and tube bundles 1100 are elevated vertically above the ground by a distance that is at least as great as the height of the tube bundles (defined as being measured from the distribution header vertically to the outlet header 1024). The support structure 1040 may include columns 1044 and cross-bracing as required to support the weight of the tube bundles 1100, fans 1102, risers 1036, distribution headers 1038, and outlet headers 1024, as well as to laterally stiffen the structure to compensate for wind loads. In some embodiments, windwalls 1044 may be provided around the tube bundles 1102 to counter the effects of prevailing winds which may adversely affect normal upwards and outwards airflow through the tube bundles 1100 from the forced draft fan 1060.

The air cooled condenser 1022 may be configured such that a single steam distribution header 1038 feeds a pair of spaced apart tube bundles 1102. In one embodiment, the tube bundles 1100 in each pair may be arranged at an angle to each other as shown forming a generally tent-like triangular configuration with a fan 1060 disposed between and at the bottom or below the tube bundles. Each tube bundle 1100 has a separate outlet header 1024 disposed near and supported by the fan deck platform 1050. The outlet headers 1024 may be spaced apart on opposing sides of the fan 1060 in one non-limiting arrangement. The tube bundles 1100 may be disposed at any suitable angle to each other.

Figure 12A:
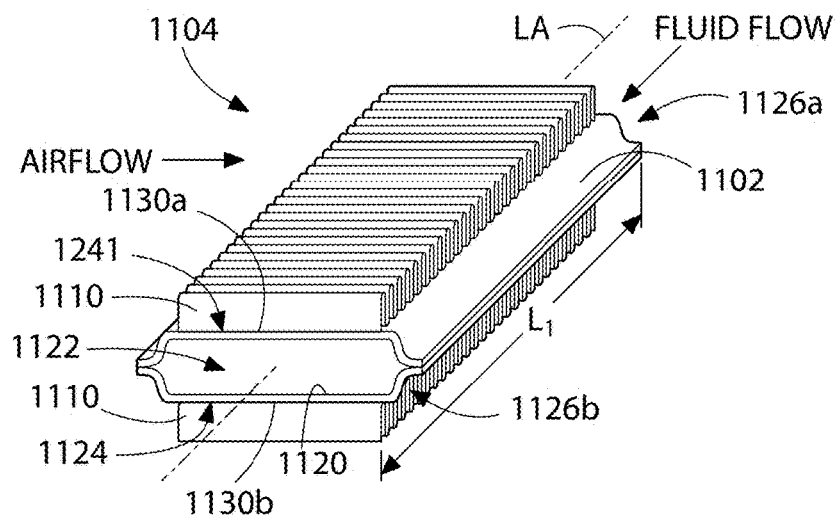
FIG. 12A is a perspective view of a finned tube assembly used in the air cooled condenser of FIG. 11A.
Figure 12B:
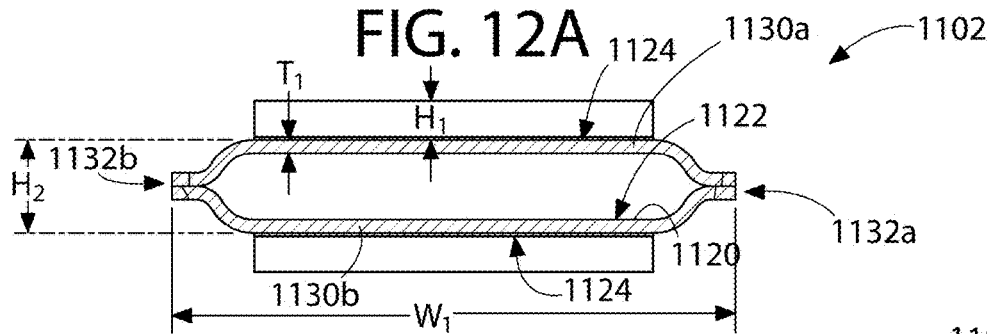
FIG. 12B is a transverse cross-sectional view of the tube assembly of FIG. 12A.
Figure 12C:
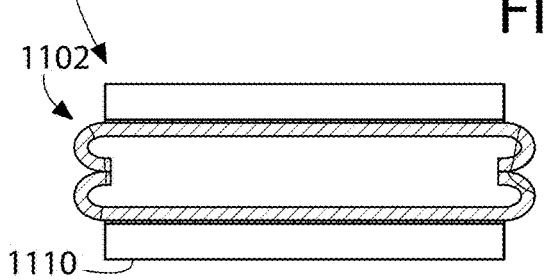
FIG. 12C is a transverse cross-sectional view of an alternative embodiment of a tube assembly usable in the air cooled condenser of FIG. 11A.
Figure 12D:
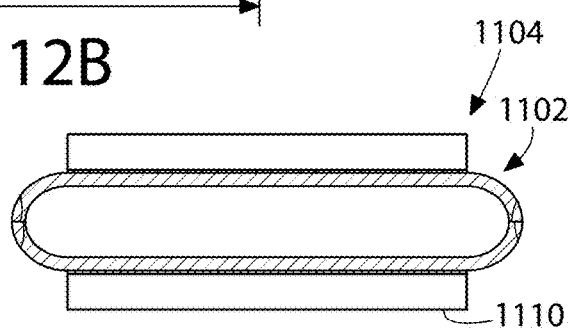
FIG. 12D is a transverse cross-sectional view of another alternative embodiment of a tube assembly usable in the air cooled condenser of FIG. 11A.
Figure 12E:
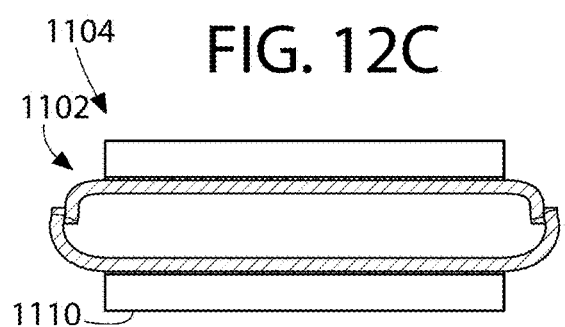
FIG. 12E is a transverse cross-sectional view of another alternative embodiment of a tube assembly usable in the air cooled condenser of FIG. 11A.
Figure 12F:
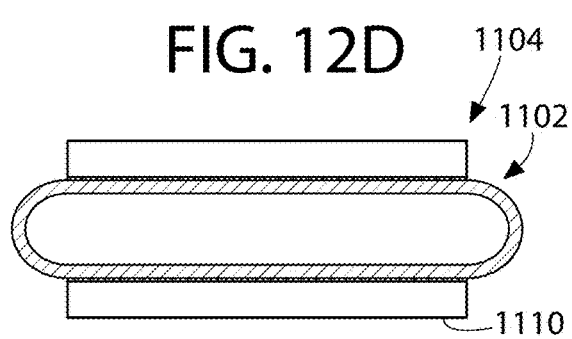
FIG. 12F is a transverse cross-sectional view of another alternative embodiment of a tube assembly usable in the air cooled condenser of FIG. 11A.
Figure 17:
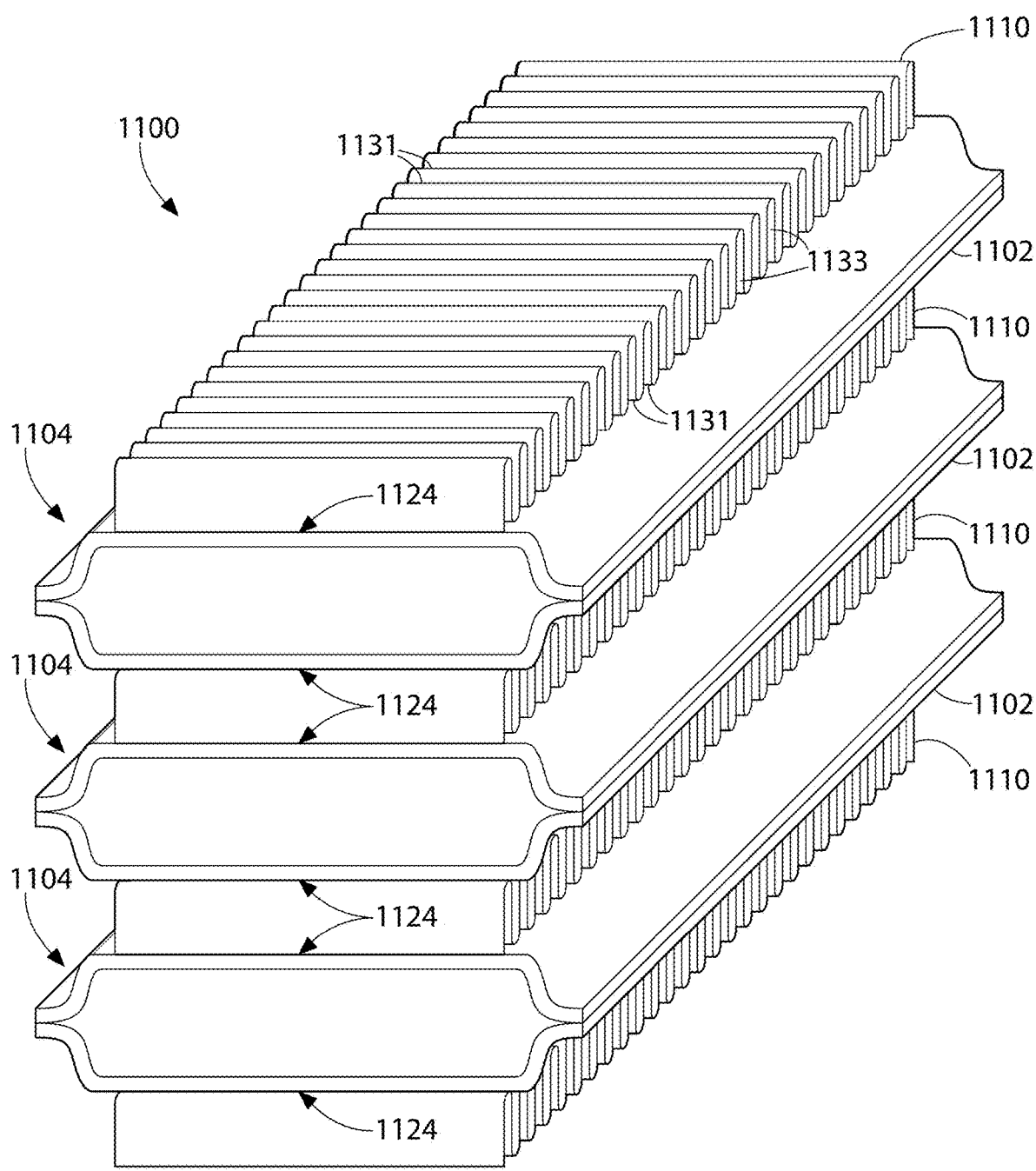
FIG. 17 is a perspective view of a several tube assemblies of FIG. 12A brazed together to form a portion of a tube bundle usable in the air cooled condenser of FIG. 11A.

FIG. 12A depicts an exemplary finned tube assembly 1104 of tube bundle 1100 which includes a longitudinally-extending elongated tube 1102 and two sets of cooling fins 1110 bonded to the tube by a unique brazing method according to the present disclosure, as further described herein. A plurality of these tube assemblies 1104 are essentially stacked and arranged together in adjacent parallel relationship forming the tube bundles 1100 (see, e.g. FIG. 17). In one embodiment, tube bundle 1100 is comprised of a single row of adjacent tube assemblies 1104 each fluidly connected between a distribution header 1038 and an outlet header 1024 (see, e.g. FIG. 11A). In a preferred embodiment, as best shown in FIG. 17, a single set of fins 1110 is disposed between each tube 1102 which are laterally spaced apart by the fins.

Figure 13:
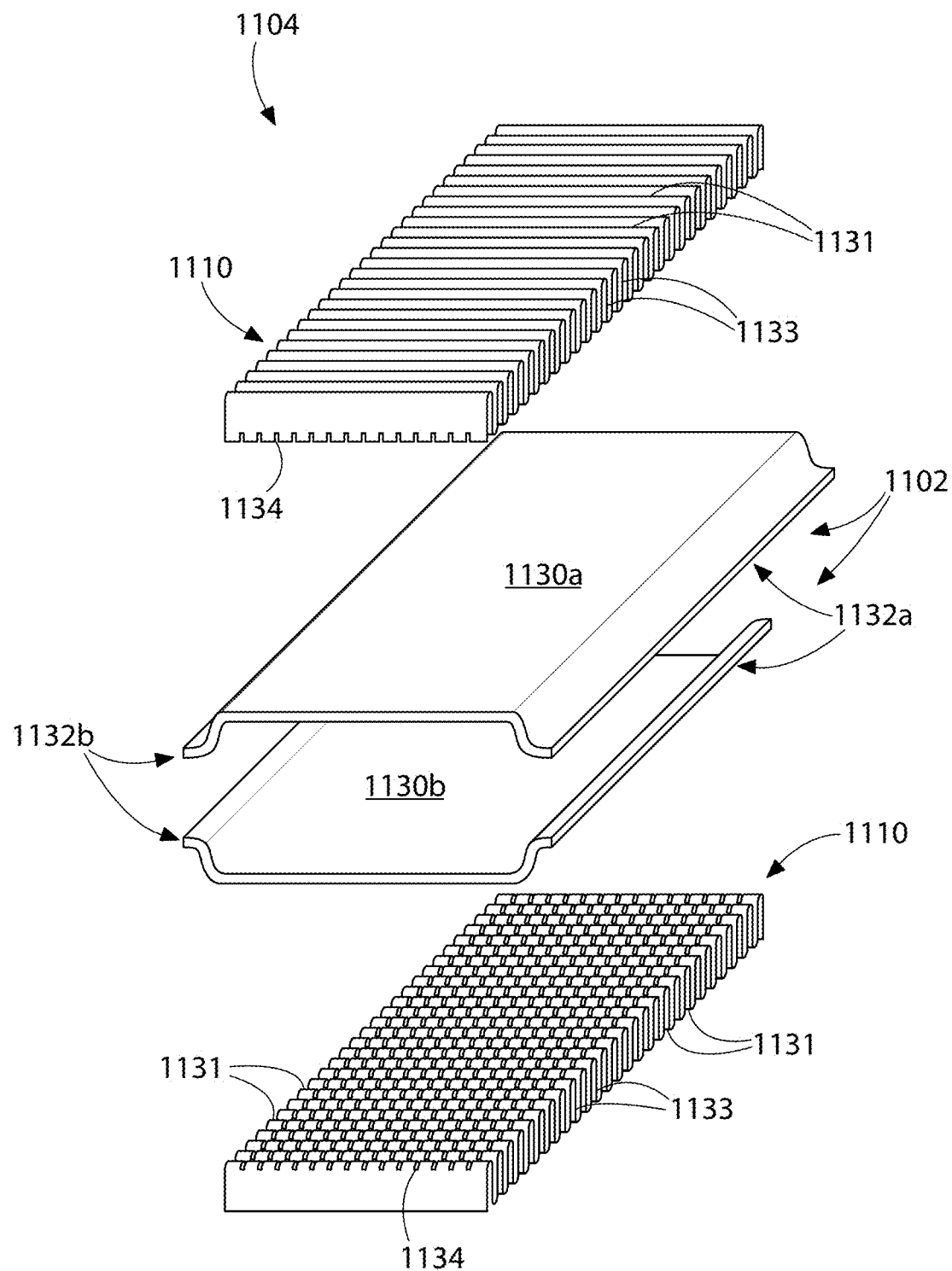
FIG. 13 is an exploded perspective view of the finned tube assembly of FIG. 12A.

FIG. 13 depicts an exploded view of a finned tube assembly 1104 prior to brazing, which may be defined as a finned tube preassembly.

Referring to FIGS. 2, 3 and 7, tube 1102 has an inner surface 1122 that forms a longitudinal internal flow conduit or passageway 1120 and an exposed outer surface 1124 on which the two sets of fins 1110 are bonded, as further described herein. Internal passageway 1120 extends from an inlet end 1126*a* which is fluidly connected to distribution header 1038 to an opposing outlet end 1126*b* which is fluidly connected to outlet header 1024. The internal passageway 1120 is in fluid communication with both the distribution header 1038 and outlet header 1024. Passageway 1120 is configured and dimensioned for transporting a steam-liquid water phase mixture through the tubes 1102 of the air cooled condenser 1022.

Internal passageway 1120 is a sealed flow conduit which in operation with fins 1110 performs the function of removing heat from the turbine exhaust fluid which enters inlet end 1126*a* of tube 1102 in a steam phase from distribution header 1038, condenses in flowing through the tube via heat transfer, and leaves the outlet end 1126*b* in the liquid phase ("condensate") which is collected in the outlet header 1024.

Tube 1102 (and the resulting internal passageway 1120) preferably may have a transverse cross-section that is non-circular and may be generally described as oblong, elliptical, or ovoid in shape. In the illustrated preferred embodiment, tube 1102 generally comprises opposing top and bottom substantially flat walls 1130*a*, 1130*b* that are connected by lateral walls 1132*a*, 1132*b*. In one embodiment, flat walls 1130*a* and 1130*b* are oriented parallel to each other. Flat walls 1130*a*-*b* each have a width W1 that is larger than height H2 of lateral sections 1132*a*-*b* as further shown, for example, in FIG. 12B. Flat walls 1130*a*, 1130*b* correspondingly define respective flat exposed outer surfaces 1124 on which fins 1110 are bonded as further described herein.

FIGS. 12B-F show several examples of possible embodiments of tubes 1102 having a non-circular transverse cross-sections and flat walls 1130*a*, 1130*b* in accordance with the present disclosure, which are suitable for employing the fin-to-tube bonding process described herein. The tubes 1102 may each be formed as a single unitary monolithic structure (e.g. by extruding) in cross-section as shown in FIGS. 12F and 14-16, or be comprised of two or more configured tube wall segments that are joined together at joints by a suitable fabrication means used in the art to form a sealed flow conduit such as seam welding, brazing, crimping, or other techniques suitable to provide a leak-proof tube construction.

It will be appreciated that embodiments of the invention are not limited to any particular type of tube construction and the tube 1102 can take on a wide variety of non-circular transverse cross-sectional shapes. For example, the top and bottom flat walls 1130*a*, 1130*b* may have an outwardly convex transverse cross-section being arcuately curved away from the longitudinal axis LA of the tube to resist deformation in partial or full vacuum conditions inside the tube.

Referring to FIG. 12A, tubes 1102 may be configured and dimensioned for industrial or commercial application in an air cooled condenser system used in a thermal power generation plant to cool and condense exhaust steam from the turbine. In such applications, tubes 1102 extend a longitudinal length L1 which in some embodiments may be between about 110 to 60 feet. The width W1 the tube 1102 may be in a range between about 4 to 18 inches. The thickness of the tube wall is preferably sufficient to promote good heat transfer and support the weight of the tube and fins 1110. In one embodiment, for example, the tube wall thickness T1 (e.g. walls 1130*a*, 1130*b* and 1132*a*, 1132*b* measured in transverse cross-section as shown in FIG. 12A) may be about 0.035 to 0.12 inches. In one embodiment, the wall thickness T1 is about 0.050 inches. Of course, the invention is not so limited and the longitudinal length L1, width W1, and wall thickness can be any desired measurement. Moreover, while the tube 1102 is exemplified as extending along a linear longitudinal axis, the tube 1102, in other embodiments, can include curves, bends and/or angles in one or more orthogonal directions.

The tube 1102 dimensions can be optimized for varying market conditions based on materials used. For example, a tube width W1 of 9.25 inches (235 mm) by a height H2 of 0.79 inches (20 mm) with a 0.039 inch (1 mm) wall thickness T1 have been determined feasible with SS409 material. The accompanying AL3003 fin is 8.5 inches (215 mm) long (measured longitudinally along the longitudinal axis LA), 0.83 inches (21 mm) high H1, and 0.01 inches (0.25 mm) thick (sheet thickness) placed at a fin pitch of 0.09 inches (2.31 mm).

For application in an air cooled condenser suitable for an industrial use such as in a power generation plant, tube 1102 is preferably constructed of steel. Any suitable steel having appropriate heat transfer properties for a given application may be used. In one preferred embodiment, the steel may be stainless steel for corrosion resistance. Non-limiting examples of suitable stainless steels are Grade 409SS or Grade 3Cr12 stainless. Other suitable ferritic or austenitic stainless steels may be used.

In a preferred embodiment, tubes 1102 are constructed of bare steel having an exposed outer surface 1124 on which fins 1110 are directly bonded has a metallurgical composition of steel composition. In one embodiment, tube 1102 therefore has a homogeneous metallurgical composition comprised uniformly of steel from end to end and in transverse cross-section between the inner surface 1122 and exposed outer surface 1124.

Tubes 1102, and in particular exposed outer surface 1124 on top and bottom flat walls 1130a, 1130b to which the fins 1110 are bonded, are preferably free of any coating, cladding, surface chemistry modification, impregnation, or other application which incorporate another material other than steel such as particularly metals, alloys, or compositions containing aluminum. As further described herein, the fin-to-tube bond is advantageously formed on bare steel without the aid and expense of first applying an aluminum coating on or aluminizing the exposed outer surface 1124.

Referring to FIGS. 12A-F and 13, fins 1110 will be described in greater detail. Each set of fins 1110 is preferably formed of a corrugated sheet of material having a high coefficient of thermal conductivity, such as aluminum in a preferred embodiment. The metal sheet is originally flat and then shaped by a suitable fabrication technique to form the corrugations. The corrugated sheets 1020A, 1020B can be of any length. Either a single or a plurality of the corrugated sheets can be used to cover substantially the entire longitudinal length L1 of a flat wall 1130a or 1130b of the finned tube assembly 1104. In other embodiments, corrugated sheets of material may cover less than the entire length L1 or only intermittent portions of the flat walls 1130a, 1130b.

An aluminum sheet usable for forming fins 1110 according to the present disclosure is a flat element which may be made from aluminum alloy in the 1xxx, are 3xxx, are 5xxx or are 6xxx families as designated by the Aluminum Association, which is adapted and suitable for heat absorption and discharge to a cooling medium flowing past the sheet. In one embodiment, without limitation, exemplary corrugated fins 1110 may be formed from of sheets of Al 3003 material having a thickness of about 0.010 inches.

Each of the sets of fins 1110 has a generally serpentine configuration as shown in FIGS. 12-17 (inclusive of FIGS. 12A-12F) comprising a plurality of undulating and alternating peaks 1131 and valleys 1133. Lateral airflow passages are formed in the gaps between the peaks and valleys for airflow generally perpendicular to the length L1 of the tube and longitudinal axis LA (see FIG. 12A). The peaks 1131 define mounting base areas on opposing top and bottom sides of fins 1110 for bonding to tubes 1102. The tips of the peaks 1131 form laterally extending ridges disposed perpendicular to the longitudinal length L1 and longitudinal axis LA of tubes 1102 which are bonded to the tube 1102 during the brazing process. Except for the two outermost tubes 1102 in a tube bundle 1100, the ridges are configured to abuttingly contact the exposed outer surfaces 1124 on top and bottom flat walls 1130a, 1130b of adjacent tubes for bonding to the walls in the manner described herein.

In one embodiment as shown in FIG. 13, the fin 1110 to tube 1102 joint may be made by an interrupted fin edge having a square saw tooth configuration. The contact surfaces between the fin and the bare exposed outer tube surface 1124 on top and bottom flat walls 1130a, 1130b is made of narrow metal strips of fin punctuated by narrow vertically extending slits 1134 formed in the fin. Slits 1134 extend perpendicular to outer surface 1124 and flat walls 1130a, 1130b in the embodiment shown. Slits 1134 preferably may be evenly spaced apart as shown, or alternatively have unequal spacing. Slits 1134 are formed in the peaks 1131 of the fin 1110 and extend partially down/up along the height H1 of the fin (see FIG. 12B defining height dimension). Using this saw tooth configuration, heat produced during the brazing process advantageously does not cause excessive surface deformation in the tube. This unique fin base design creates a controlled yield zone in the base of the fin (i.e. where peaks 1131 abut flat walls 1130a, 1130b) to accommodate the differential thermal expansion rates of the aluminum fin and steel tube. This feature significantly mitigates deformation of the tube during the post braze cool down by allowing the fin to contract more than the parent tube.

In other embodiments, the edges of the fins 1110 at the peaks 1131 may be laterally continuous without interruption, as shown for example in FIG. 12A.

According to an aspect of the present invention, a process or method for bonding an aluminum fin to an uncoated bare steel tube is provided. In a preferred embodiment, the bonding method is brazing. An overview of components, materials, pre-brazing assembly steps, and furnace brazing process will first be described.

Figure 14:
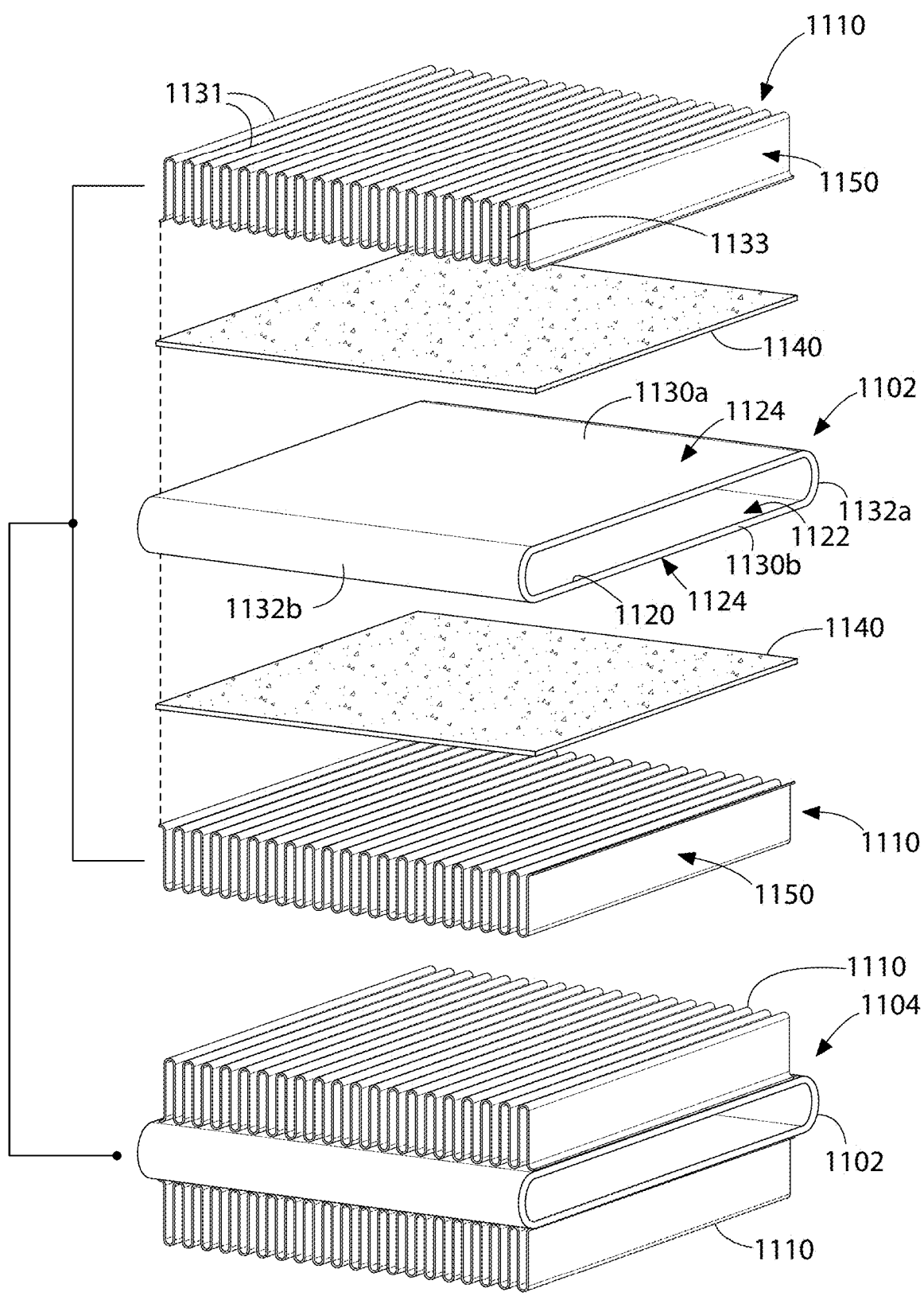
FIG. 14 is an exploded perspective view of a first embodiment of a finned tube preassembly for forming a tube assembly usable in the air cooled condenser of FIG. 11A.
Figure 15:
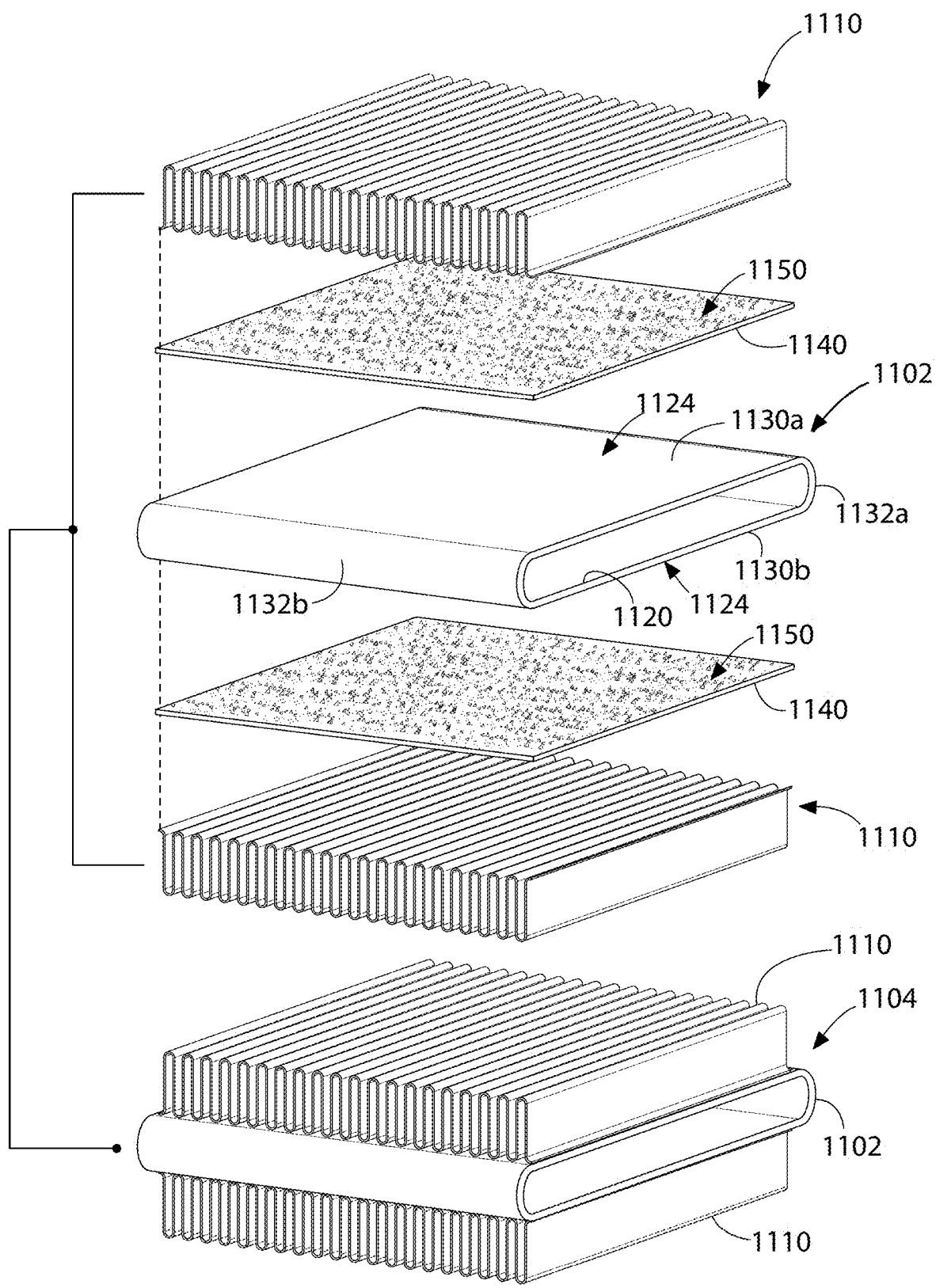
FIG. 15 is an exploded perspective view of a second embodiment of a finned tube preassembly for forming a tube assembly usable in the air cooled condenser of FIG. 11A.
Figure 16:
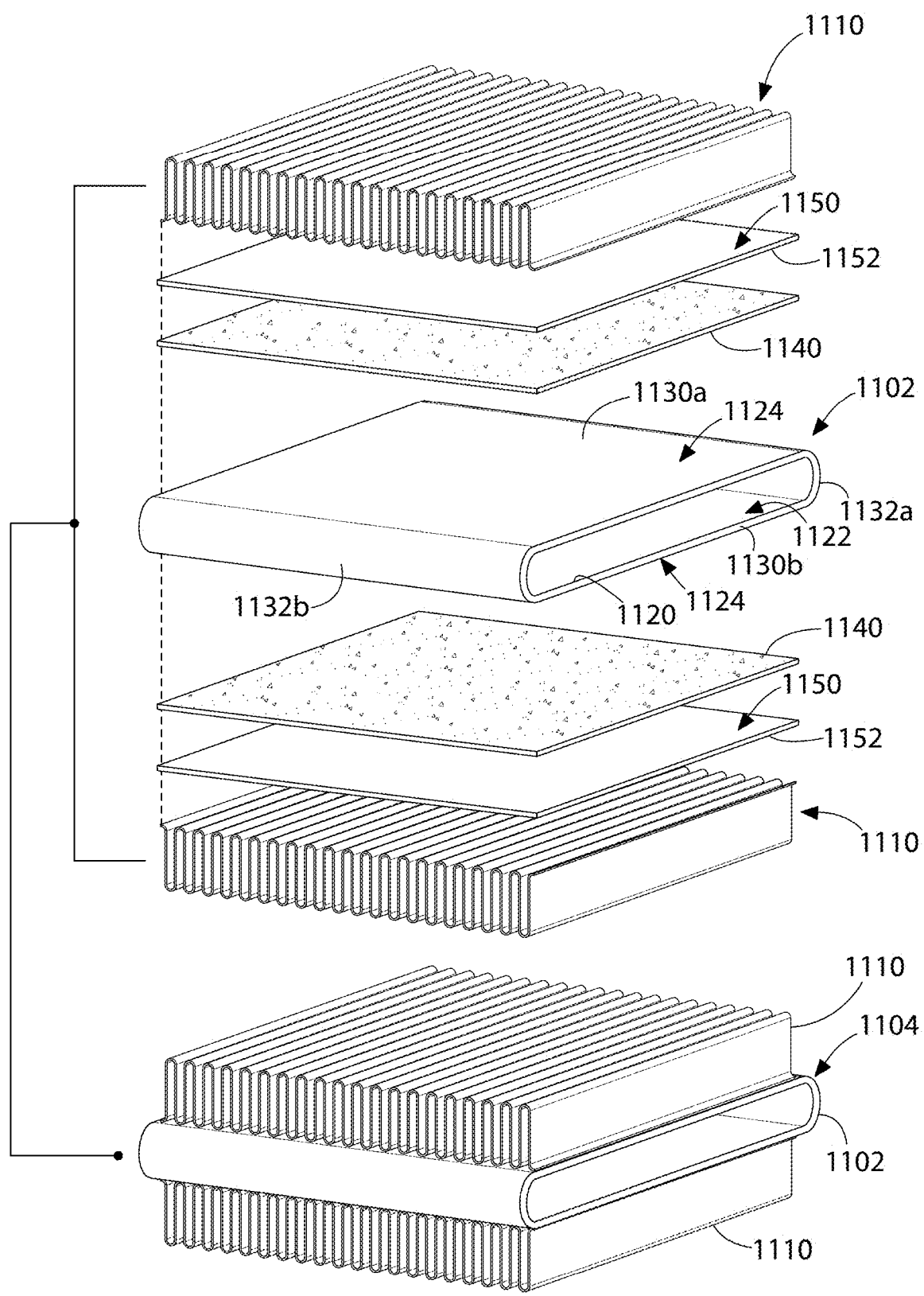
FIG. 16 is an exploded perspective view of a third embodiment of a finned tube preassembly for forming a tube assembly usable in the air cooled condenser of FIG. 11A.

Referring to FIG. 13 for general reference, the method for bonding aluminum fins 1110 to bare steel tubes 1102 comprises essentially at least the following general steps (to be further explained herein): (1) providing at least one first structural component in the form of a bare steel tube 1102 which in this embodiment is stainless steel, oil based carrier brazing flux 1140 gel or paste which preferably contains a vanishing oil, brazing filler metal 1150 in one of three physical delivery formats as shown in FIGS. 14-16 and further described herein, and at least one other second structural component in the form of an aluminum fin 1110; (2) bringing these components into physical contact; (3) heating these components in a brazing furnace to a temperature between about 577 C and 610 C, preferably between the temperatures of about 585 C and 600 C; and (4) subsequently holding this temperature range for about two to six minutes, preferably about three to five minutes, wherein a brazed bond occurs on at least one point of contact between the tubes and fins in which the braze filler metal is used as a bonding agent.

The method according to the invention is based on the finding that the overall time the braze filler metal is at brazing temperature may be significantly reduced, i.e., by at least 110%, if the flat outer surface 1124 of the tube 1102 is not coated or clad with aluminum or another material from a previous operation prior to brazing. This reduction of total time at or above the brazing temperature reduces the formation of intermetallics (FeAl3) formed between the dissimilar materials. The method is also less costly because the finned tube assembly 1104 does not have to be dried (eliminate water) before brazing.

Upon heating of the fins 1110 and tube 1102 brought into abutting contact with each other, the braze filler metal and brazing substrates melt together in a single step, it being provided according to the invention that the oil based carrier braze flux 1140 gel and brazing filler metal 1150 delivered as an addition to the flux brazing gel (FIG. 15) or as a foil sheet (FIG. 16) or as a clad layer rolled onto the aluminum fin (FIG. 14) is then used as a brazing material. This offers the advantage that an aluminum clad material has not been placed through a previous heating cycle before brazing. This reduces cost of manufacture and reduces the negative impact of intermetallic formation because the cladding and brazing process is the same step. There is also power consumption savings on the whole which is accompanied by lower costs.

In the method according to the invention, when the brazing filler metal 1150 is supplied in the form of a foil sheet 1152, as further described herein, the foil sheet is in abutting contact with outer surface 1124 of the tube 1102, thereby when the foil sheet melts during the brazing process, the external surface of the tube is imparted with enhanced corrosion protection from the aluminum-silicon layer. In one representative example, without limitation, an aluminum silicon coating having a thickness of about 25 microns may be deposited on the steel tube 1102 by the brazing process.

In one preferred and present embodiment being discussed, tube 1102 is stainless steel. The brazing method according to the present invention can be applied to both ferritic and austenitic stainless steel tubes.

As noted above, FIGS. 14-16 show three possible approaches for introducing the brazing filler metal 1150 into the brazing process. These three figures each depict an exploded view of a finned tube assembly 1104 prior to brazing with components and products used during the brazing process to bond the fins 1110 to the steel tube 1102. Accordingly, FIGS. 14-16 depict the un-fused components used to braze and form a permanently bonded finned tube assembly, which may be defined herein as a finned tube brazing preassembly. In all three filler metal 1150 delivery mechanisms described herein, the aluminum or aluminum silicon filler metal is provided proximate to the bonding site between the aluminum fins 1110 and the exposed outer surface 1124 of the steel tube 1102 for brazing the fins to the tube.

The brazing filler metal 1150 preferably has a preponderance of aluminum, as much as 85 weight % or more, where the remaining proportion is predominantly silicon. Accordingly, a preferred brazing filler metal is aluminum silicon (AlSi). In some embodiments, the brazing filler metal may contain about 6-12% silicon. Zinc may be added to the brazing filler metal alloy to lower the melting temperature, thereby allowing the brazing to take place at a lower temperature range (540 C to 590 C).

Referring to FIG. 14, the brazing filler metal 1150 may be provided as clad layers hot rolled or otherwise bonded onto an aluminum sheet which forms a cladded fin 1110. The aluminum fin 1110, typically aa3003, is cladded with an AlSi brazing alloy consisting of about 6 to 12% silicon. The addition of silicon promotes brazing by reducing the melting temperature of the alloy, decreasing the surface tension and thereby increasing the wettability of the alloy in addition to minimizing the intermetallic alloy (e.g. FeAl3) layer thickness. The thickness of the AlSi clad layer on the fin sheet metal is between about 110% and 20% of the total thickness of the fin 1110, and preferably about 15%.

In one possible embodiment, fin 1110 may therefore be constructed as a three-layer composite having an aa3003 aluminum core with brazing filler metal 1150 cladded on each side. In one exemplary embodiment, a suitable cladded fin composite construction is aa4343/aa3003/aa4343. The aa4343 cladding is an AlSi composition having a silicon content of about 6.8-8.20%. A representative non-limiting thickness for fin 1110 constructed in this manner is about 0.012 inches. Other suitable thicknesses of the fin and cladding may be provided.

The foregoing resulting tube assembly 1104 prior to brazing and bonding of the fins 1110 onto tube 1102 is shown in FIG. 14. Tube 1102 is bare steel (i.e. uncoated and not aluminized in any manner), and preferably stainless steel in this embodiment. Flux 1140 is applied between the cladded fins 1110 and flat outer surfaces 1124 on top and bottom flat walls 1130a, 1130b. The assembly is clamped together and ready for heating in the brazing furnace to bond the fins to the tube.

Referring to FIG. 15, the brazing filler metal 1150 may alternatively be provided as an additive mixed with the flux 1140. A powder based filler metal such as aluminum powder may be used. In one embodiment, a powdered AlSi brazing alloy is used, such as without limitation aa 4343 (6.8-8.2% Si), aa 4045 (9-11% Si), or aa 4047 (11-13% Si) which are suitable, is added to the flux 1140 and beneficially increases the exterior corrosion protection of the stainless steel. Preferably, the brazing alloy used for the filler metal 1150 is aa 4045 or 4047, and more preferably 4045 in some embodiments dependent upon the brazing oven temperature profile used. This is particularly advantageous for heat exchangers that are located in aggressive environments such as those in salt air or in the vicinity of chemical plants whose emissions attack most corrosion-prone metals. Specimens subjected to a prolonged ASTM b-117 salt spray test (750 hours) are used to confirm corrosion resistance in marine air environment.

The foregoing resulting tube assembly 1104 prior to brazing and bonding of the fins 110 onto tube 1102 is shown in FIG. 15. Tube 1102 is bare steel (i.e. uncoated and not aluminized in any manner), and preferably stainless steel in this embodiment. Fins 1110 are uncladded and formed as a single layer sheet of aluminum (e.g. aa 3003) as described herein. Flux 1140 is applied between the uncladded fins 1110 and flat outer surfaces 1124 on top and bottom flat walls 1130a, 1130b. The assembly is clamped together and ready for heating in the brazing furnace to bond the fins to the tube.

Referring to FIG. 16, the brazing filler metal 1150 may alternatively be provided in the form of a sheet of brazing foil 1152. In one embodiment, the foil may be an AlSi material such as without limitation as an example aa 4045. Foils 1152 having a representative sheet thickness of about 0.010 to 0.15 inches may be used. In one embodiment, the sheet thickness of foil 1152 used may be about 0.015 inches.

The foregoing resulting tube assembly 1104 prior to brazing and bonding of the fins 1110 onto tube 1102 is shown in FIG. 16. Tube 1102 is bare steel (i.e. uncoated and not aluminized in any manner), and preferably stainless steel in this embodiment. Brazing foil 1152 is placed against the peaks 1131 of the fins 1110. Flux 1140 is applied between the foil 1152 and flat outer surfaces 1124 on top and bottom flat walls 1130a, 1130b. The assembly is clamped together and ready for heating in the brazing furnace to bond the fins to the tube.

The fin and the tube assembly 1104 according to FIGS. 14-16 described above are brazed together within a controlled atmosphere brazing furnace at a temperature suitable to form a bond between the fin and tube. Any suitable commercially available brazing furnace may be used to braze the finned tube assemblies 1104 formed according to the present disclosure.

A suitable brazing flux such as a fluoride based flux with a cesium or lithium additive, is preferably utilized to sequester the negative effects of the chromium and nickel compounds within the stainless steel parent material. Cesium and or lithium additives to fluoride based fluxes bind and retard the negative effects of chromium and nickel at brazing temperatures. This practice requires a very specific time vs. temperature brazing cycle that is both shorter in duration and lower in temperature. This approach further enhances the braze joint strength and toughness by reducing the intermetallic layer (e.g. FeAl3) thickness within the braze joint Suitable cesium and lithium fluxes are commercially available under the brand name NOCOLOK® from Solvay Fluor GmbH of Hannover, Germany Advantageously, this eliminates the current general industrial practice of requiring either a roller clad or aluminized layer on the parent tube 102 material to enable using aluminum-to-aluminum braze processes. This will reduce labor and material costs while improving the heat transfer rate.

The inventors have discovered that mixing an oil-based additive to the flux admixture instead of water for a carrier as conventionally used in the art to prepare a spreadable flux paste or gel from a powdered flux product produces improved brazing performance and adhesion between aluminum fins and bare steel tubes in the brazing furnace. In one preferred embodiment, a suitable oil-based carrier is an aliphatic hydrocarbon such as without limitation vanishing oil or lubricant. This oil-based carrier advantageously evaporates during processing and therefore does not interfere with the brazing.

A suitable non-aqueous oil based carrier is Evaplube brand vanishing oil which is commercially available from General Chemical Corporation of Brighton, Michigan. In one embodiment, Evap-Lube 2200 has been used. This product is in a liquid oil form and has a specific gravity of 0.751-0.768 (water=1.0), boiling point of 340-376 degrees F., vapor pressure at 68 degrees F. of 0.5 mmHg, evaporation rate of 0.16, and is 1100% volatile by volume.

To prepare suitable spreadable flux mixtures comprised of flux powder (e.g. NOCOLOK® flux) and an oil based carrier (e.g. Evap-Lube 2200), the relative amounts of each used preferably may be in the ranges of about 40-65% by weight vanishing oil to about 60-35% by weight flux, and more preferably about 48-58% by weight vanishing oil to about 52-42% by weight flux. In one representative embodiment, without limitation, about 53% by weight vanishing oil may be used with the remaining weight percentage (47%) of product in the mixture being flux or flux with additional additives.

The foregoing oil based carrier and powdered flux mixtures produce a very viscous flux mixture (similar to a gel or wall paper paste in consistency and viscosity) that is readily spreadable on the tubes 1102 in preparation for brazing. Advantageously, for the present brazing application, the Evap-Lube 2200 vanishing oil evaporates readily leaving little or no residual oils, and therefore does not interfere with the formation of a brazed bond between the fins 110 and bare steel tube 1102. The oil carrier and fluoride based flux brazing gel or paste is an admixture of halides including, but not limited to, potassium aluminum fluoride, cesium aluminum fluoride, and lithium aluminum fluoride.

A suitable representative application rate of the flux and oil based carrier mixture may be about 25 g/m$^2$ flux to 35 g/m$^2$ of vanishing oil.

In alternative embodiments, a long chain alcohol may be added to further extend and improve the spreadability of the flux-oil based carrier mixture which may be used for longer lengths of bare steel tubes 1102 to be prepared for brazing. In certain embodiments, the long chain alcohol may be glycol including hexylene glycol and propylene glycol. Glycol or another long chain alcohol may be added to the flux and oil based carrier mixture in amount from about and including 25% by weight or less in some embodiments, or alternatively in a range of 1-25% by weight in other embodiments. In one embodiment, if glycol or another long chain alcohol is added to the flux mixture, the weight percentage of the oil based carrier used is preferably reduced proportionately while maintaining the same weight percentage of flux power in the mixture to provide optimum brazing performance and bonding.

In using the vanishing oil and fluoride based flux brazing mixture gel to prepare a braze filler metal delivery system in which the filter metal 1150 is mixed directly into the flux 1140 as shown in FIG. 15 and described above, the flux mixture comprises NOCOLOK® flux, Evaplube vanishing oil (e.g. Evap-Lube 2200), and powdered aluminum. In various embodiments, the aluminum content of the flux 1140 gel/paste may be in the range of about 110-50% Al powder by weight. In one representative example, for illustration, approximately 60 g/m$^2$ of aluminum powder may be added which may be AlSi in some embodiments. To make a an aluminum preparation having a paste-like consistency for mixing with the flux gel, approximately 90 g/m$^2$ of Evaplube may added to that amount of aluminum powder. Approximately 25 g/m2 NOCOLOK® flux and about 35 g/m2 Evap-Lube 2200 are used in the oil based carrier flux gel mixture, as described above. Adding up all of the foregoing constituents, the aluminum powder is therefore about 30% of the total (210 g/m2) filler metal-flux gel mixture by weight in this example when combined to form a flux gel or paste that is applied to the bare tube surfaces.

In one embodiment, the aluminum particle size of the aluminum or AlSi power may be without limitation about 5-10 microns.

An exemplary method for bonding an aluminum fin 1110 to a bare steel tube 1102 will now be described based on the foregoing parameters and materials.

The method generally begins by first providing a preassembly of individual components as shown in either FIG. 14, 15, or 16 which have been describe above. Essentially, a bare steel tube 1102 is provided and sets of aluminum fins 1110 which comprise the main parts that are to be brazed and bonded together. Tube 1102 may be stainless steel in this example such as Type 409SS. Fins 1110 may be aa3003 aluminum.

Tube 1102 is initially cleaned using a suitable cleaner to remove drawing oils and grime in preparing the outer surface 1124 of the tube for receiving flux 1140 which may be provided in a gel or paste form in the present embodiment. Water based cleaners may be used, and alternatively in other possible embodiments acetone may be used. Ideally, the outer surface 1124 of tube 1102 along top and bottom flat walls 1130a, 1130b where fins 1110 will be bonded should be thoroughly clean of contaminants that might adversely affect the formation of a good brazed joint between the tube and fins.

Next, the oil based carrier flux 1140 mixture brazing gel or paste is applied to tubes 1102. The flux 1140 is applied to the outer surface 1124 of tube 1102 along top and bottom flat walls 1130a, 1130b (see, e.g. FIGS. 14-16) before the fins 1110 are placed against in surface contact with the tube surfaces and flux. In the embodiment of FIG. 15, the flux 1140 will contain the AlSi filler metal 1150 as already described herein. In the embodiments of FIGS. 14 and 16, the flux will generally not contain any filler metal 1150 which is provided by other ways described herein such as by being clad onto the fins 1110 (FIG. 14) or provided in the form of separate sheets of foil (FIG. 16).

The method next continues by bringing the tube 1102 with flux 1140 applied and fins 1110 into surface contact with each other and forming the preassembly shown in FIGS. 14 and 15. With respect to FIG. 16, the AlSi filler metal foil 1152 is placed on the flux 1140 preferably after it is applied to tube 1102, and then the fins are brought into surface contact with the foil adhered to the tube by the gel or paste like flux.

The foregoing assembled but unbrazed finned tube assemblies 1104 as shown in FIGS. 14-16 are held together by any suitable means such as clamping in preparation for processing in the brazing furnace.

The tube assembly 1104 is next loaded into a brazing furnace, heated to a suitable brazing temperature and held at that temperature for a sufficient period of time to form a permanent bond between the aluminum fins 1110 and the tube 1102, as already described herein. The bonded tube assembly 1104 is then cooled and removed from the brazing furnace.

In an alternative method for bonding fins 1110 to tube 1102 and forming a completed tube assembly, the brazing process may be applied to half-tube segments comprised of one set of fins 1110 and one of the flat wall 1130a or 1130b (see, e.g. FIG. 13). For example, a first set of fins 1110 may be brazed onto flat wall 1130a, and a second set of fins may be brazed onto flat wall 1130b. Then, the two brazed half tubes may be joined together by a suitable method such as welding to produce the completely tube assembly 1104 shown in FIG. 12A. This fabrication technique allows gravity to assist the flow of the braze material into the braze joint.

According to another embodiment, a tube assembly 1104 comprised of a bare carbon steel tube 1102 and fins 1110 may be fabricated in according with the foregoing method. In one embodiment, low carbon steel having a wall thickness T1 of about 0.060 inches may be used. In another embodiment, a low carbon steel having a chrome (Cr) content of 0.1-0.25% may be used with a wall thickness T1 of 0.060 inches. The construction may use a brazing filler metal 1150 in the form of foil 1152 shown in FIG. 16 made of aa4045 aluminum with a sheet thickness of about 0.015 inches. The flux 1140 may be a NOCOLOK® and Evaplube mixture as described herein, and in some possible embodiments an aluminum or AlSi filler in the form of flakes or powder may be added to the flux mixture. A water based cleaner is preferred to prepare the tube 1102 for brazing that removes rust, oils, and other surface contaminants from outer surface 1124 of the tube; however, other suitable cleaning solutions may be used. Preferably, the flux is applied immediately after cleaning to prevent reoccurrence of oxide formation on the tube. In some embodiments, a binder may be added to the flux mixture to dry the flux for handling.

3. Inventive Concept 3

With reference to FIGS. 18-21, a third inventive concept will be described.

While the invention is exemplified in FIGS. 18-21 as being used to cool spent nuclear fuel that is located within a spent nuclear fuel pool, the invention is not so limited. In other embodiments, the invention can be used to reject waste thermal energy generated by radioactive materials to the ambient air irrespective of the type of radioactive materials being cooled and the type of body of liquid in which the radioactive materials are (or previously were) immersed. In certain embodiments, the pool of liquid can be a reactor pool. In other embodiments, the radioactive materials may be waste, including spent nuclear fuel, high level radioactive waste or low level radioactive waste, and/or non-waste.

Figure 18:
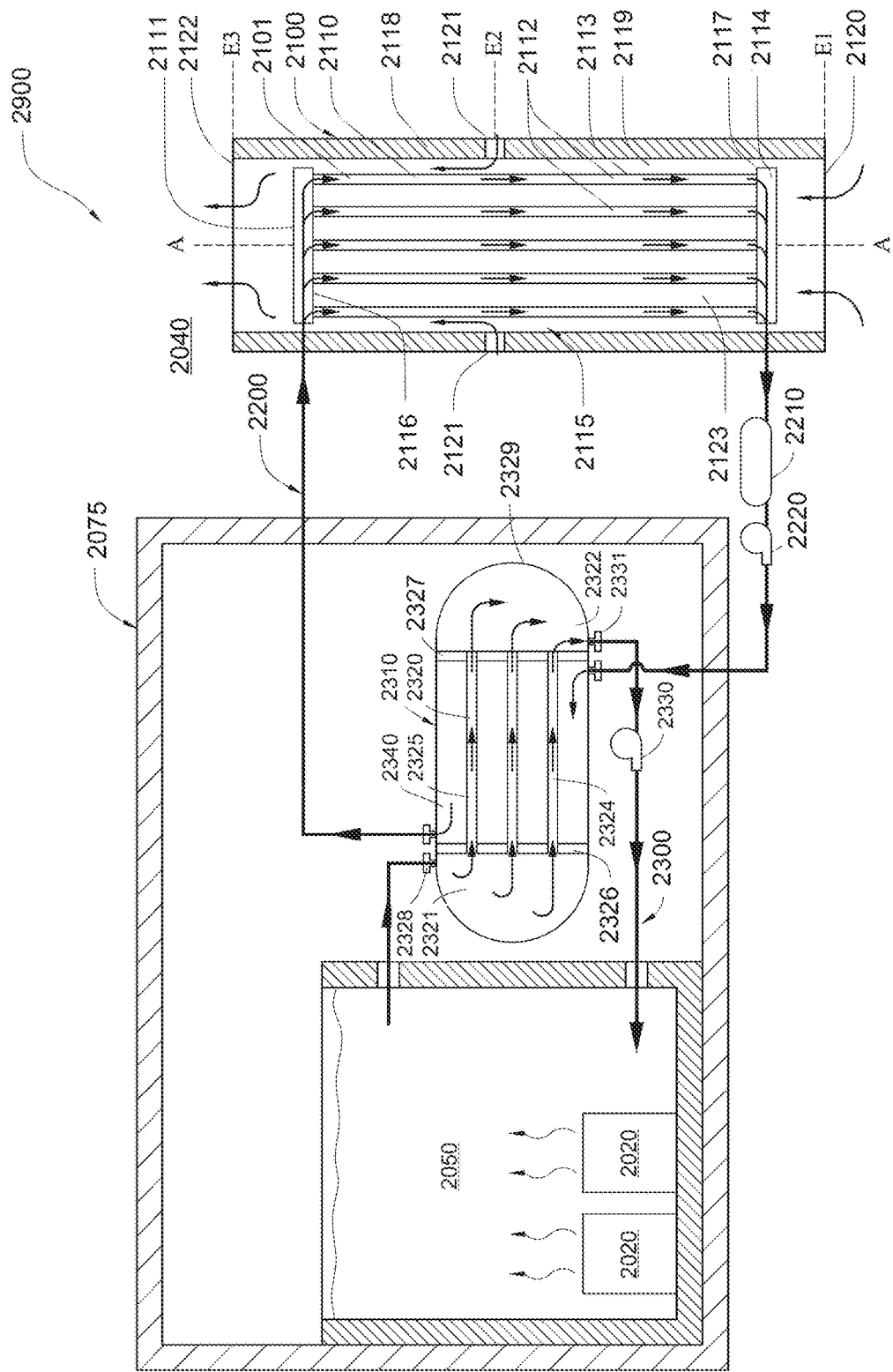
FIG. 18 is a schematic of a system for rejecting thermal energy generated by radioactive waste to the ambient air according to an embodiment of the present invention.

Referring first to FIG. 18, a cooling system 2900 for rejecting thermal energy generated by radioactive waste 2020 to the ambient air 2040 according to an embodiment of the present invention is schematically illustrated. The cooling system 2900 generally comprises an air-cooled heat exchanger 2100 and a heat rejection closed-loop fluid circuit 2200 that thermally couples the air-cooled heat exchanger 2100 to the radioactive materials 2020, which are immersed in a pool of a liquid 2050. As a result of the thermal coupling, thermal energy generated by the radioactive waste 2020 is transferred to the air-cooled heat exchanger 2100 (and subsequently to the ambient air 2040). Thermal coupling of the air-cooled heat exchanger 2100 to the radioactive waste 2020 via the heat rejection closed-loop fluid circuit 2200 can either be direct thermal coupling or indirect thermal coupling. In the exemplified embodiment, the thermal coupling of the air-cooled heat exchanger 2100 to the radioactive waste 2020 via the heat rejection closed-loop fluid circuit 2200 is accomplished via an indirect thermal coupling that includes an intermediate closed-loop fluid circuit 2300. In this embodiment, the intermediate closed-loop fluid circuit 2300 comprises the pool of liquid 2050. In other embodiment, a pool of liquid 2050 may not be required and the radioactive waste may transfer its thermal energy to a gaseous volume to which the air-cooled heat exchanger 2100 is thermally coupled.

It should be noted that in certain alternate embodiments of the invention, more than one intermediate closed-loop fluid circuit 2300 can be included in the cooling system 2900 that consecutively transfer thermal energy from the radioactive materials 2020 to the heat rejection closed-loop fluid circuit 2200. In such an embodiment, only a first one of the intermediate closed-loop fluid circuits 2300 will comprise the pool of the liquid 2050. Moreover, in certain other alternate embodiments, the intermediate closed-loop fluid circuit 2300 can be omitted. In such an embodiment, the heat rejection closed-loop fluid circuit 2200 can include the pool of the liquid 2050.

The cooling system 2900, in the exemplified embodiment, further comprises an intermediate heat exchanger 2310 which, as discussed below, transfers thermal energy from the liquid 2050 to a coolant fluid 2101 that flows through the heat rejection closed-loop fluid circuit 2200. In the exemplified embodiment, the intermediate heat exchanger 2310 is a tube-and-shell heat exchanger. However, in other embodiments, the intermediate heat exchanger 2310 can be a plate heat exchanger, a plate and shell heat exchanger, an adiabatic heat exchanger, a plate fin heat exchanger, and a pillow plate heat exchanger.

The system 2900 further comprises a containment structure 2075, which can be in the form of a building or other enclosure. The containment structure 2075 provides radiation containment as would be appreciated by those skilled in the art. In certain embodiment, the system 2900 is designed so that the liquid 2050, which comes into direct contact with the radioactive waste 2020, never exists the containment structure 2075. Thus, if a leak were to occur in the intermediate closed-loop fluid circuits 2300, the contaminated liquid 2050 would not be discharged into the surrounding environment. Thus, in the exemplified embodiment, the intermediate heat exchanger 2310 and the entirety of the intermediate closed-loop fluid circuits 2300 is located within the containment structure 2075. Whether or not containment of the liquid 2050 within the containment structure is required will depend on whether or not the liquid is contaminated, the type of radioactive waste 2020 being cooled, and applicable regulations.

As mentioned above, radioactive materials 2020 are immersed in the pool of the liquid 2050, which in the exemplified embodiment is a spent fuel pool. Radioactive materials 2020, such as spent nuclear fuel, generate a substantial amount of heat for a considerable amount of time after completion of a useful cycle in a nuclear reactor. Thus, the radioactive materials 2020 are immersed in the pool of the liquid 2050 to cool the radioactive materials 2020 to temperatures suitable for dry storage. In embodiments where the radioactive materials 2020 are spent nuclear fuel rods, said spent nuclear fuel rods will be supported in the pool of the liquid 2050 in fuel racks located at the bottom of the pool of liquid 2050 and resting on the floor. Examples of suitable fuel racks are disclosed in U.S. Patent Application Publication No. 2008/0260088, entitled Apparatus and Method for Supporting Fuel Assemblies in an Underwater Environment Having Lateral Access Loading, published on Oct. 23, 2008, and U.S. Patent Application Publication No. 2009/0175404, entitled Apparatus or Supporting Radioactive Fuel Assemblies and Methods of Manufacturing the Same, published on Jul. 9, 2009, the entireties of which are hereby incorporated by reference.

As a result of being immersed in the pool of the liquid 2050, thermal energy from the radioactive materials 2020 is transferred to the pool of the liquid 2050, thereby heating the pool of liquid 2050 and cooling the radioactive materials. However, as the pool of liquid 2050 heats up over time, thermal energy must be removed from the pool of the liquid 2050 to maintain the temperature of the pool of the liquid 2050 within an acceptable range so that adequate cooling of the radioactive materials 2020 can be continued.

The intermediate closed-loop fluid circuit 2300 comprises, in operable fluid coupling, the pool of the liquid 2050, a tube-side fluid path 2320 of the intermediate heat exchanger 2310, and a hydraulic pump 2330. The aforementioned components/paths of the intermediate closed-loop fluid circuit 2300 are operably and fluidly coupled together using appropriate piping, joints and fittings as is well-known in the art to form a fluid-tight closed-loop through which the liquid 2050 can flow. The hydraulic pump 2330 flows the liquid 2050 through the intermediate closed-loop fluid circuit 2300 as is known in the art. Of course, valves are provided as necessary and/or desirable along the intermediate closed-loop fluid circuit 2300.

In the exemplified embodiment, the tube-side fluid path 2320 of the intermediate heat exchanger 2310 comprises a tube-side inlet header 2321, a tube-side outlet header 2322 and interior cavities 2324 of the heat exchange tubes 2325 of the intermediate heat exchanger 2310. The shell 2329 of the intermediate heat exchanger 2310 comprises a tube-side inlet 2328 for introducing heated liquid 2050 into the tube-side fluid path 2320 of the intermediate heat exchanger 2310 and a tube-side outlet 2331 for allowing cooled liquid 2050 to exit the tube-side fluid path 2320 of the intermediate heat exchanger 2310.

Interior cavities 2324 of the heat exchange tubes 2325 fluidly couple the tube-side inlet header 2321 and the tube-side outlet header 2322, thereby forming the tube-side fluid path 2320 of the intermediate heat exchanger 2310. The heat exchange tubes 2325 of the intermediate heat exchanger 2310 are connected to an inlet tube sheet 2326 and an outlet tube sheet 2327 at opposite ends.

The heat rejection closed-loop fluid circuit 2200 comprises, in operable fluid coupling, a shell-side fluid path 2340 of the intermediate heat exchanger 2310, a tube-side fluid path 2110 of the air-cooled heat exchanger 2100, a fluid coolant reservoir 2210 and a hydraulic pump 2220. The aforementioned components/paths of the heat rejection closed-loop fluid circuit 2200 are operably and fluidly coupled together using appropriate piping, joints and fittings as is well-known in the art to form a fluid-tight closed-loop through which the coolant fluid 2101 can flow. The hydraulic pump 2220 flows the coolant fluid 2101 through the heat rejection closed-loop fluid circuit 2200 as is known in the art. Of course, valves are provided as necessary and/or desirable along the heat rejection closed-loop fluid circuit 2200. The coolant fluid 2101 can take on a wide variety of fluids, including both liquids and gases. In one embodiment, the coolant fluid 2101 is water in liquid phase.

The tube-side fluid path 2110 of the air-cooled heat exchanger 2100 comprises, in operable fluid coupling, a coolant fluid inlet header 2111, interior cavities 2112 of a plurality of heat exchange tubes 2113, and a coolant fluid outlet header 2114. The plurality of heat exchange tubes 2113 collectively form a tube bundle 2115 that extends along a substantially vertical longitudinal axis A-A. Furthermore, each of the heat exchange tubes 2113 of the air-cooled heat exchanger 2100 are arranged in a substantially vertical orientation. The tube bundle 2115 further comprises a top tube sheet 2116 and a bottom tube sheet 2117. The heat exchange tubes 2113 of the air-cooled heat exchanger 2100 are connected to and extend between the top tube sheet 2116 and the bottom tube sheet 2117.

The air cooled heat exchanger 2100 further comprises a shell 2118 that forms a shell cavity 2119. The tube bundle 2115 is positioned within the shell cavity 2119. The air cooled heat exchanger 2100 further comprises a primary air inlet 2120, a secondary air inlet 2121 and an air outlet 2122. Each of the primary air inlet 2120, the secondary air inlet 2121 and the air outlet 2122 form passageway through the shell 2118 from the shell cavity 2119 to the ambient air 2040. As such, ambient air 2040 can flow into and/or out of the shell cavity 2119 via the primary air inlet 2120, the secondary air inlet 2121 and the air outlet 2122 so that thermal energy can be convectively removed from the exterior surfaces of the heat exchange tubes 2113. More specifically, cool ambient air 2040 flows into the shell cavity 2119 via the primary air inlet 2120 and the secondary air inlet 2121 while warmed ambient air 2040 flows out of the shell cavity 2119 via the air outlet 2122. As can be seen, the primary air inlet 2120 is located a first elevation E1, the secondary air outlet 2121 is located at a second elevation E2 and the air outlet 2122 is located at a third elevation E3. The second elevation E2 is greater than the first elevation E1. The third elevation E3 is greater than the second elevation E2. In one embodiment, the primary air inlet 2120 has a greater effective cross-sectional area than the secondary air outlet 2121. The invention, however, is not so limited in all embodiments. While not illustrated in FIG. 18, the air-cooled heat exchanger 2100 can comprise a blower (see FIG. 19) to induce air flow through the shell-side fluid path 2123 of the shell cavity 2119. Conceptually, the shell-side fluid path 2123 of the air-cooled heat exchanger 2100 is the remaining free volume of the shell cavity 2119 through which the ambient air 2040 can flow (after the tube bundle 2115 and other components are positioned therein).

In other embodiments of the present invention, the air cooled heat exchanger 2100 may comprise a plurality of secondary air inlets 2121. In such instances, the plurality of secondary air inlets 2121 may be at varying elevations between the first elevation E1 and the third elevation E3. Stated another way, in such embodiments the plurality of secondary air inlets 2121 may be at a plurality of different elevations between the first elevation E1 of the primary air inlet 2120 and the third elevation E3 of the air outlet 2122. In further embodiments, the secondary air inlet 2121 may be omitted.

In the exemplified embodiment, the air-cooled heat exchanger 2100 is a vertical single tube pass counter-current heat exchanger. However, in certain embodiment, multiple pass heat exchangers can be used for either the air-cooled heat exchanger 2100 and/or the intermediate heat exchanger 2310. The heat exchange tubes 2325 of the intermediate heat exchanger 2310 and the heat exchange tubes 2113 of the air-cooled heat exchanger 2100 are made of made of a highly thermally conductive and corrosion resistant material. Suitable materials include aluminum, copper, and aluminum alloys.

During operation of the system, the hydraulic pumps 2330 and 2210 are activated. Activation of the hydraulic pump 2330 flows liquid 2050 through the intermediate closed-loop fluid circuit 2300 while activation of the hydraulic pump 2220 flows coolant fluid 2101 through the heat rejection closed-loop fluid circuit 2200. As discussed above, the thermal energy generated by the radioactive waste 2020 is initially transferred to the liquid 2050 while in the pool. This heated liquid 2050 flows from the pool and into the tube-side fluid path 2320 of the intermediate heat exchanger 2310. Simultaneously, the coolant fluid 2101 (which at this stage has been cooled by the air-cooled heat exchanger 2100) flows through the shell-side fluid path 2340 of the intermediate heat exchanger 2310. As the heated liquid 2050 flows through the tube-side fluid path 2320 of the intermediate heat exchanger 2310, thermal energy is transferred from the heated liquid 2050 to the cool coolant fluid 2101 that is flowing through the shell-side fluid path 2340 of the intermediate heat exchanger 2310. The cooled liquid 2050 then exits tube-side path 2320 of the intermediate heat exchanger 2310 and is returned back to the pool for further cooling of the radioactive materials 2020 where it is again heated up and the cycle continues.

The heated coolant fluid 2101 (which has absorbed the thermal energy from the heated liquid 2050) exits the shell-side path 2340 of the intermediate heat exchanger 2310 and flows into the top header 2111 of the air-cooled heat exchanger 2100 where it is then distributed to the interior cavities 2112 of the plurality of heat exchange tubes 2113. The heated coolant fluid 2101 flows downward through the plurality of heat exchange tubes 2113. As the heated coolant fluid 2101 flows through the plurality of heat exchange tubes 2113, thermal energy from the heated coolant fluid 2101 is transferred to ambient air 2040 that is flowing through the shell-side fluid path 2123 of the air cooled-heat exchanger 2100. The ambient air 2040 enters the primary air inlet 2120 as cool air. As thermal energy from the coolant fluid 2101 is transferred to this cool ambient air 2040 within the shell-side fluid path 2123, the ambient air 2040 becomes warmed and rises naturally within the shell-side fluid path 2123 and exits the air-cooled heat exchanger 2100 via the air outlet 2122 as heated air. Additionally, as the warmed ambient air 2040 rises within the shell-side fluid path 2123, additional cool ambient air 2040 is drawn into the shell-side fluid path 2123 via the second air inlet 2121. The second air inlet 2121 also serves as a backup to the primary air inlet 2120 in the event that the site is flooded and the primary inlet 2120 becomes submerged in water.

Figure 19:
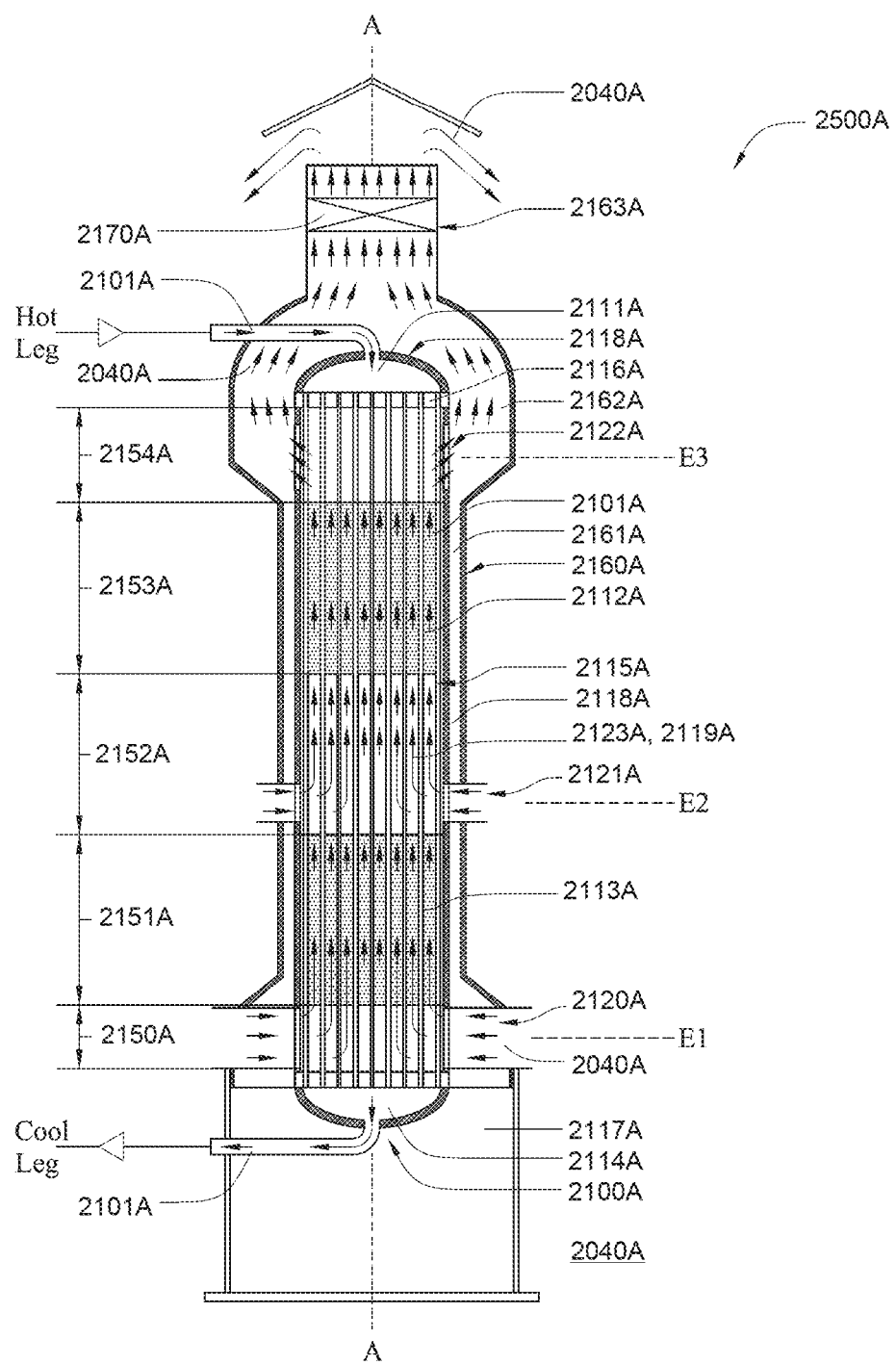
FIG. 19 is a schematic of a shell-and-tube air-cooled heat exchanger that can be used in the system of FIG. 18 according to an embodiment of the present invention.

Referring now to FIG. 19, a tube-and-shell air-cooled heat exchanger apparatus 2500A that is particularly useful as the air-cooled heat exchanger 2100 for the cooling system 2900 is illustrated. The tube-and-shell air-cooled heat exchanger apparatus 2500A will be described with the understanding that those parts of the tube-and-shell air-cooled heat exchanger apparatus 2500A that correspond to the air-cooled hate exchanger 2100 will be given like reference numbers with the addition of an "A" suffix.

The tube-and-shell air-cooled heat exchanger apparatus 2500A generally comprises a tube-and-shell air-cooled heat exchanger 2100A and a shroud 2160A. The tube-and-shell air-cooled heat exchanger 2100A comprises a tube bundle 2115A and a shell 2118A. The shroud 2160A comprises a shroud cavity 2161A. The shell 2118A comprises a shell cavity 2119A. The tube bundle 2115A is positioned within the shell cavity 2119A and supported therein a substantially vertical orientation along substantially vertical axis A-A. The tube-and-shell air-cooled heat exchanger 2100A is positioned within the shroud cavity 2161A and supported therein in a substantially vertical orientation along vertical axis A-A. In certain embodiments, the shroud 2160A may be omitted. In certain other embodiments, the shroud 2160A may be considered the shell of the tube-and-shell air-cooled heat exchanger apparatus 2500A while the shell 2118A is omitted.

The tube-and-shell air-cooled heat exchanger apparatus 2500A comprises a shell-side fluid path 2123A and a tube-side fluid path 2110A. As mentioned above, the shell-side fluid path 2123A can be conceptualized as the free volume of the shell cavity 2119 that remains after the tube bundle 2115A (and other components) is positioned therein. The tube-side fluid path 2110A comprises the interior cavities 2112A of the plurality of heat exchange tubes 2113A along with the coolant fluid inlet header 2111A and the coolant fluid outlet header 2114A. The coolant 2101 flows through the tube-side fluid path 2110A while the ambient air flows through the shell-side fluid path 2123A as discussed above for FIG. 18 to effectuate transfer of thermal energy from the coolant fluid 2101 to the ambient air 2040.

The tube-and-shell air-cooled heat exchanger apparatus 2500A comprises a primary air inlet 2120A, a secondary air inlet 2121A, and an air outlet 2122A. The primary air inlet 2120A and the secondary air inlet 2122A form passageways from the ambient air 2040A outside of the shroud 2160A into the shell-side fluid path 2123A, thereby allowing cool air to enter the shell-side fluid path 2123A from outside of the shroud 2160A. The air outlet 2122A forms a passageway from the shell-side fluid path 2123A to a shroud outlet plenum 2162A that circumferentially surrounds a top portion of the shell 2118A. A chimney 2163A is provided on the shroud 2160A that forms a passageway from the shroud outlet plenum 2162A to the ambient air 2040A outside of the shroud 2160A. Thus, as warmed ambient air 2040A exits the shell-side fluid path 2123A via the air outlet 2122A, the warmed ambient air 2040A will flow into the shroud outlet plenum 2162A, rise therein, and exit the shroud via the passageway of the chimney 2163A. In order to induce greater flow of ambient air through the shell-side fluid path 2123A of the tube-and-shell air-cooled heat exchanger apparatus 2500A, a blower 2170A is provided in the chimney 2163A. In other embodiments, the blower 2170A may be positioned at other suitable locations.

Each of the primary air inlet 2120A, the secondary air inlet 2121A, and the air outlet 2122A extend through the shell 2118A and are substantially horizontal. The primary air inlet 2120A is formed by one or more conduits that extend through the shroud 2160A and to the shell 2118A so that all of the incoming cool air flows into the shell-side fluid path 2123A and not into the shroud cavity 2161A. Similarly, the secondary air inlet 2121A is formed by one or more conduits that extend through the shroud 2160A and to the shell 2118A so that all of the incoming cool air flows into the shell-side fluid path 2123A and not into the shroud cavity 2161A.

The primary air inlet 2120A is located a first elevation E1, the secondary air outlet 2121A is located at a second elevation E2 and the air outlet 2122A is located at a third elevation E3. The second elevation E2 is greater than the first elevation E1. The third elevation E3 is greater than the second elevation E2. In one embodiment, the primary air inlet 2120A has a greater effective cross-sectional area than the secondary air outlet 2121A.

The plurality of heat exchange tubes 2113A are discontinuously finned tubes. In other words, each of the plurality of heat exchange tubes 2113A comprise axial sections that include fins 2180A (FIG. 20) and axial sections that are free of any fins. In certain alternate embodiments of the invention, a first subset of the heat exchange tubes 2113A may be discontinuously finned tubes, a second subset of the heat exchange tubes 2113A may be continuously finned along their length, and a third subset of the heat exchange tubes 2113A may be free of fins along their entire length.

In the exemplified embodiment, the plurality of heat exchange tubes 2113A collectively form the tube bundle 2115A. Due their discontinuously finned nature, the tube bundle 2115a comprises finned tube sections 2151A, 2153A and non-finned tube sections 2150A, 2152A, 2154A. The finned tube sections 2151A, 2153A and the non-finned tube sections 2150A, 2152A, 2154A are in axial alignment and arranged in an alternating manner. In the finned tube sections 2151A, 2153A of the tube bundle 2115A, each of the heat exchange tubes 2113A comprise fins 2180A that increase thermal energy transfer from the coolant fluid 2101A to the ambient air 240A by increasing the outer surface area of the tubes 2113A. In the non-finned tube sections 2150A, 2152A, 2154A, the plurality of heat exchange tubes 2113A are free of any fins.

As can be seen in FIG. 19, in the exemplified embodiment, the non-finned tube sections 2150A, 2152A, 1254A are transversely aligned with the primary air inlet 2120A, the secondary air inlet 2121A, and the air outlet 2122A respectively. By aligning each of the primary air inlet 2120A, the secondary air inlet 2121A, and the air outlet 2122A with one of the non-finned tube sections 2150A, 2152A, 2154A, ambient air 2040A can enter and exit the tube bundle 2115A more effectively. Stated simply, by omitting (or substantially reducing the number of) the fins in these sections 2150A, 2152A, 2154A, the impedance effect that the fins have on the cross-flow of the ambient air is eliminated and/or minimized Thus, air flow through the shell-side path 2123A is increased. Furthermore, the creation and arrangement of the finned tube sections 2151A, 2153A and the non-finned tube sections 2150A, 2152A, 2154A on the tube bundle 2115A (as discussed above) can create a venturi effect at the secondary air inlet 2121A (and potentially at the primary air inlet 2120A).

Figure 21:
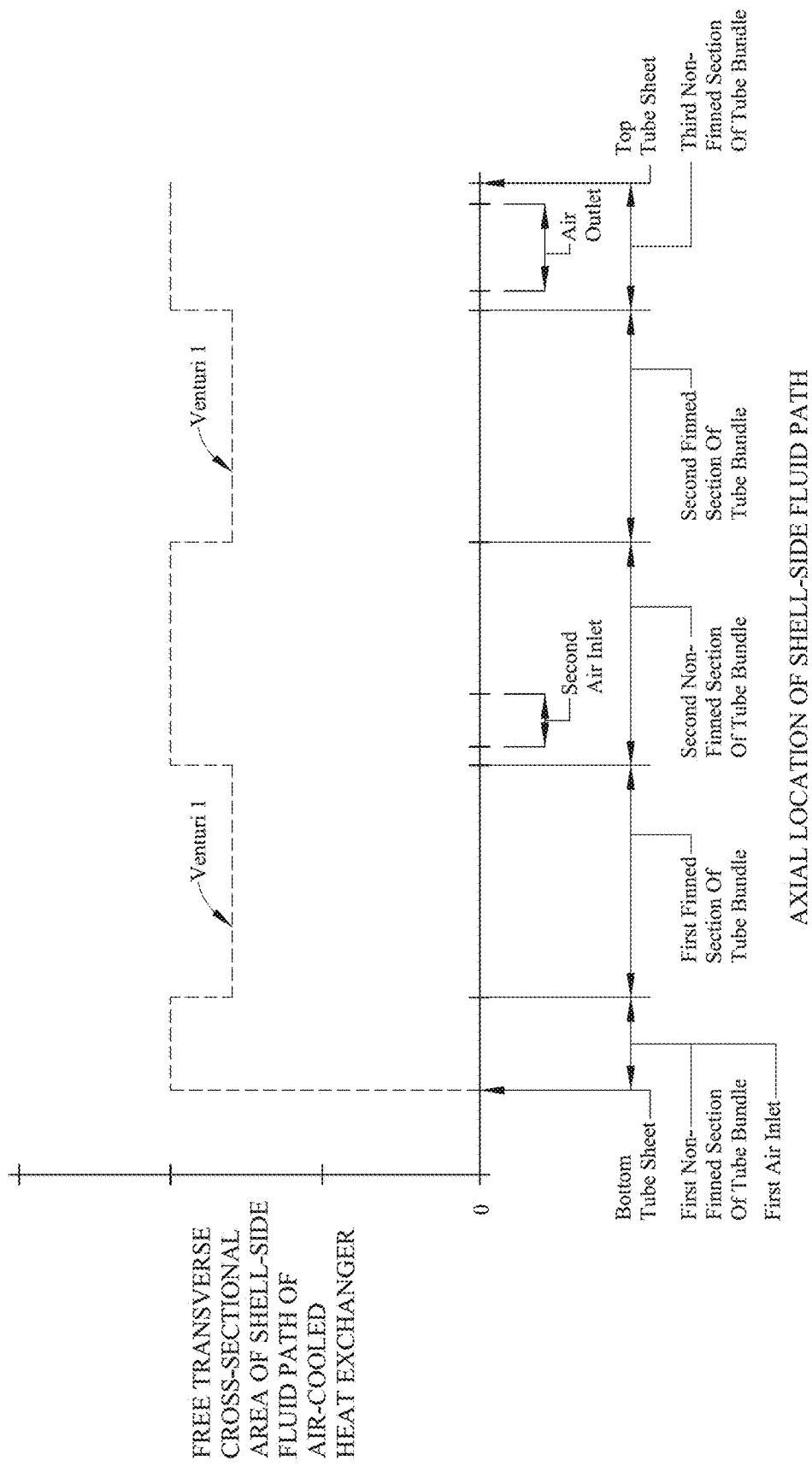
FIG. 21 is a graph of the free cross-sectional area of the shell-side fluid path of the shell-and-tube air-cooled heat exchanger of FIG. 2 along a length of the shell-side fluid path in according to an embodiment of the present invention.

Referring to FIGS. 19 and 21 concurrently, it can be seen that providing fins 2180A on the finned tube sections 2151A, 2153A effectively reduces the free transverse cross-sectional area of the shell-side path 2123A because the fins 2180A occupy additional space of the shell cavity 2119A. Thus, from the perspective of the shell-side fluid path 2123A, the finned tube sections 2151A, 2153A create a reduced cross-sectional area, which can be considered a venturi restriction. As a result of the finned section 2153A, which is located at an elevation between the secondary air inlet 2121A and the air outlet 2122A, a venturi is formed that assists in drawings additional cool ambient air 2040A into the secondary air inlet 2121A. Thus, in the exemplified embodiment, the venturi is created by the fins 2180A of the plurality of heat exchange tubes 2113A. Each of the fins 2180A of the plurality of heat exchange tubes 2113A comprise opposing surfaces that extent substantially parallel to the substantially vertical axis A-A.

The shell-side fluid path 2123A comprises a first venturi located at an elevation between the primary air inlet 2120A and the secondary air inlet 2121A. Furthermore, the shell-side fluid path 2123A comprises a second venturi located at an elevation between the secondary air inlet 2121A and the air outlet 2122A. As graphically illustrated in FIG. 21, the shell-side fluid path 2123A comprises a first free transverse cross-sectional area at the second elevation (i.e. at the secondary air inlet 2121A) and a second free transverse cross-sectional area at an elevation between the secondary air inlet 2121A and the air outlet 2122A, wherein the second free transverse cross-sectional area is less than the first free transverse cross-sectional area. Moreover, the shell-side fluid path 2123A comprises a third free transverse cross-sectional area at the third elevation (i.e., at the air outlet 2122A), wherein the third free transverse cross-sectional area is greater than the second free transverse cross-sectional area.

In embodiments of the invention where the focus is on existence of a venturi being created in the shell-side fluid path 2123A, the venturi can be created in additional ways, such as for example reducing the transverse cross-section of the shell 2119A or adding additional flow barriers. In certain other embodiments, a venturi can be created by simply adding more or thicker fins to the desired area of the tube bundle.

Figure 20:
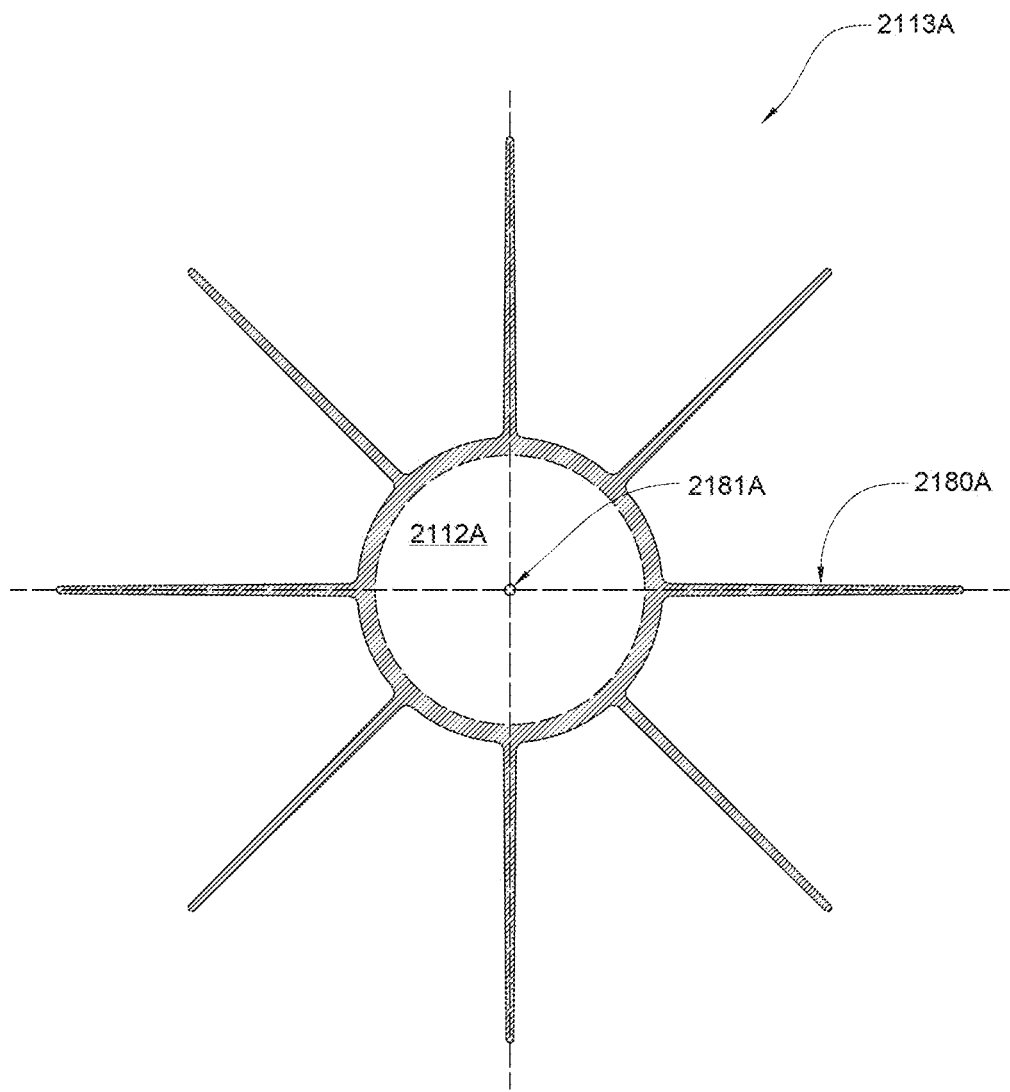
FIG. 20 is a transverse cross-section of a heat exchange tube of the shell-and-tube air-cooled heat exchanger along a finned section according to an embodiment of the present invention.

Referring now to FIG. 20, a transverse cross-section of one of the heat exchange tubes 2113A taken along one of the finned tube sections 2151A, 2153 is exemplified. The heat exchange tubes 2113A comprise a plurality of fins 2180A extending from a tube body 2181A. The fins 2180A can be formed by extruding a set of axial spines that give the tube 2113A a "star burst" cross section. The height of the find 2180A is selected to accord with the layout pitch of the tube bundle 2115A such that the fins2180A provide a complete cross sectional coverage in the tube bundle 2115A so as to promote maximum contact between the turbinated air and the fin surfaces. A candidate shape of the star burst for the square layout pitch is shown in FIG. 20. Of course, any number of fin arrangements and patterns can be used in other embodiments of the invention.

The design of the tube-and-shell air-cooled heat exchanger apparatus 2500A described above has several parameters for modification to maximize its heat rejection capability for a specific application. The available parameters include tube I.D., number of fins per tube and size/shape of each fin, tube layout pitch, height of the tube bundle, in-tube flow velocity (by using the appropriate size pump) and air flow velocity (by selecting the appropriately sized blower). By an adroit selection of the above design parameters, it is possible to achieve the overall heat transfer coefficient for the bundle in excess of 10 Btu/hr-sq ft-deg F. Scoping calculations show that a 12 ft diameter, 20 ft tall heat bundle can remove as much as 5858 kW from contaminated water @140 deg. F. Multiple units can be arrayed in parallel to increase the heat removal capacity to the desired level.

4. Inventive Concept 4

A fourth inventive concept will be described below, and there are no drawings associated with the fourth inventive concept.

As used herein, the term "bonding temperature" refers to the temperature to which a brazing composition must be heated in order to provide suitable adhesion strength between two substrates, e.g., a permanent bond between an aluminum fin and a steel tube.

In some embodiments, the terms "hydrophobic carrier" and "oil based carrier" may be used interchangeably.

In some embodiments, the terms "brazing composition", "brazing flux" and "flux composition" may be used interchangeably.

Some embodiments of the present invention provide a brazing composition comprising: a metal halide; and from about 40 wt. % to about 65 wt. % of a hydrophobic carrier.

In some embodiments, the metal halide is selected from: potassium fluoride; aluminum fluoride; cesium fluoride; rubidium fluoride; lithium fluoride; sodium fluoride; calcium fluoride; potassium aluminum fluoride; cesium aluminum fluoride; lithium aluminum fluoride; and a combination of two or more thereof. In other embodiments, the metal halide is selected from: potassium aluminum fluoride; cesium aluminum fluoride; lithium aluminum fluoride; and a combination of two or more thereof.

Further embodiments provide a brazing composition further comprising a filler metal. In some embodiments, the filler metal is selected from aluminum, silicon, zinc, an alloy of aluminum and zinc; an alloy of zinc, aluminum and silicon, an alloy of aluminum and silicon; and a combination of two or more thereof.

In some embodiments, the filler metal has an average particle size of from about 1 to about 500 microns. In some embodiments, the filler metal has an average particle size of from 2 to about 100 microns. In other embodiments, the filler metal has an average particle size of from about 3 to about 50 microns. Still further embodiments provide compositions wherein the filler metal has an average particle size of from about 4 to about 25 microns. Yet other embodiments provide a composition wherein the filler metal has an average particle size of from about 5 to about 10 microns.

In some embodiments, the filler metal comprises greater than 50 wt. % aluminum. In other embodiments, the filler metal comprises greater than 85 wt. % aluminum.

In some embodiments, the hydrophobic carrier is a liquid at room temperature. In some embodiments, the hydrophobic carrier comprises a vanishing oil.

In some embodiments, the hydrophobic carrier is present in an amount of from about 48 wt. % to about 58 wt. % of the brazing composition. In some embodiments, the hydrophobic carrier is present in an amount of about 53 wt. % of the brazing composition.

In some embodiments, the brazing composition is substantially acrylate-free. In some embodiments, the brazing composition is acrylate-free.

In some embodiments, the brazing composition has a bonding temperature of from about 550° C. to about 650° C. In some embodiments, the brazing composition has a bonding temperature of from about 575° C. to about 625° C. In some embodiments, the brazing composition has a bonding temperature of from about 585° C. to about 600° C. In some embodiments, the brazing composition has a bonding temperature of about 590° C. In some embodiments, the bonding temperature refers to the bonding temperature of the first component and the second component individually. In some embodiments, the bonding temperature refers to the bonding temperature of the multi-component brazing composition when the first and second components are in intimate contact.

In some embodiments, the filler metal is in the form of a flake or a powder.

In some embodiments, the brazing composition further comprises an additive selected from: an anti-oxidant, an anti-corrosive agent, an anti-foaming agent, a viscosity modifying agent, a plasticizer, a tackifier, a binder, a coupling agent, and a combination of two or more thereof.

In some embodiments, the composition is in the form of a paste or a gel.

Further embodiments provide a multi-component brazing composition comprising: a first component comprising: a metal halide; and a hydrophobic carrier; and a second component comprising a filler metal.

In some embodiments, the metal halide and the filler metal have different average particle sizes. In some embodiments, the filler metal has an average particle size that is greater than the average particle size of the metal halide. In some embodiments, the first component and the second component are present in separate phases. In some embodiments, the separate phases are in intimate contact with one another.

In some embodiments, the first component and the second component are separated prior to use. In some embodiments, the second component comprises a substantially planar substrate. In some embodiments, the substantially planar substrate comprises a foil.

In some embodiments, the substantially planar substrate has a thickness of from about 0.010 to about 0.15 inches. In other embodiments, the substantially planar substrate has a thickness of about 0.15 inches.

In some embodiments, the substantially planar substrate has a dimensional stability sufficient to remain substantially planar after contact with a metal substrate (e.g. a cooling fin). In some embodiments, the substantially planar substrate has a filler metal density of about 60 g/m2. The compositions may reduce the time at which brazing temperature must be maintained during the process by at least 10%, which thereby reduces the formation of intermetallics formed between the fins and the steel tube (dissimilar materials).

In some embodiments, the first component has a metal halide density of about 25 g/m2.

In some embodiments, the methods of the present invention employ a flux mixture comprising a powdered flux and a hydrophobic/oil-based carrier. In some embodiments, the brazing composition is substantially anhydrous. In some embodiments, water is not used in the brazing composition/flux mixture. In some embodiments, the methods described herein: (1) eliminate the need to first provide an aluminum clad layer (or otherwise aluminized surface) on the outer surface of the tube for bonding the tube to the fin before beginning the brazing process; (2) eliminate drying of fluxed tubes; and (3) reduce the deleterious intermetallic layer (e.g. FeAl3) between the dissimilar metals which is formed during brazing. The latter is beneficial because FeAl3 is relatively brittle so that it is desirable to minimize the thickness of this layer to avoid joint fracture. The method according to the present disclosure provides long term corrosion protection of the external tube surface after brazing. The methods are applicable to tubes constructed from carbon steels, ferritic stainless steels, austenitic stainless steels, and other steel alloys.

In some embodiments, a brazing composition/flux mixture suitable for brazing aluminum fins onto a bare steel tube is provided. In some embodiments, the flux mixture includes a flux powder comprising a metal halide and a hydrophobic/oil-based carrier. In some embodiments, the oil based carrier comprises an aliphatic hydrocarbon. In some embodiments, the flux powder and oil based carrier form a flux gel or paste suitable for application to an air cooled condenser tube or other structure.

In some embodiments, the tube dimensions can be optimized for varying market conditions based on materials used. For example, a tube width of 9.25 inches (235 mm) by a height of 0.79 inches (20 mm) with a 0.039 inch (1 mm) wall thickness have been determined feasible with SS409 material. The accompanying AL3003 fin is 8.5 inches (215 mm) long, 0.83 inches (21 mm) high, and 0.01 inches (0.25 mm) thick (sheet thickness) placed at a fin pitch of 0.09 inches (2.31 mm).

For application in an air cooled condenser suitable for an industrial use such as in a power generation plant, tube is preferably constructed of steel. Any suitable steel having appropriate heat transfer properties for a given application may be used. In some embodiments, the steel may be stainless steel for corrosion resistance. Non-limiting examples of suitable stainless steels are Grade 409SS or Grade 3Cr12 stainless. Other suitable ferritic or austenitic stainless steels may be used.

An aluminum sheet usable for forming fins according to the present disclosure is a flat element which may be made from aluminum alloy in the 1xxx, 3xxx, 5xxx or 6xxx families as designated by the Aluminum Association, which is adapted and suitable for heat absorption and discharge to a cooling medium flowing past the sheet. In some embodiments, exemplary corrugated fins may be formed from of sheets of Al 3003 material having a thickness of about 0.010 inches.

In some embodiments, the present invention provides a method for bonding a cooling fin to a distributor tube. In some embodiments, the method for bonding a cooling fin to a distributor tube comprises: providing at least one first structural component in the form of a steel tube (e.g., stainless steel), a brazing composition, optionally a filler metal and at least one other second structural component in the form of an aluminum fin; bringing these components into physical contact; heating these components to a temperature between about 577° C. and 610° C., and maintaining this temperature for a time sufficient to form a brazed bond between the steel tube and the cooling fin.

The method according to the invention is based on the finding that the overall time the braze filler metal is at brazing temperature may be significantly reduced, i.e., by at least 10%, if the flat outer surface of the tube is not coated or clad with aluminum or another material from a previous operation prior to brazing. This reduction of total time at or above the brazing temperature reduces the formation of intermetallics (FeAl3) between the dissimilar materials. The method is also less costly because the finned tube assembly does not have to be dried (to eliminate water) before brazing.

In some embodiments, wherein the brazing composition is a multi-component composition, the first component and second component filler melt together in a single step. This offers the advantage that an aluminum clad material has not been placed through a previous heating cycle before brazing. This reduces cost of manufacture and reduces the negative impact of intermetallic formation because the cladding and brazing process is the same step. There is also power consumption savings on the whole which is accompanied by lower costs.

In those embodiments wherein the filler metal is supplied in the form of a foil sheet, the foil sheet melts during the brazing process and imparts the steel tube with enhanced corrosion protection. In some embodiments, an aluminum silicon coating having a thickness of about 25 microns may be deposited on the steel tube by the brazing process.

In some embodiments, the filler metal has a preponderance of aluminum, as much as 85 weight % or more, where the remaining proportion is predominantly silicon. In some embodiments, the filler metal may contain about 6-12% silicon. Zinc may be added to the filler metal to lower the melting temperature, thereby allowing the brazing to take place at a lower temperature range (540° C. to 590° C.).

In some embodiments, the filler metal is provided as a clad layer hot rolled or otherwise bonded onto an aluminum sheet which forms a cladded fin. In some embodiments, the aluminum fin is cladded with an AlSi brazing alloy consisting of about 6 to 12% silicon. In some embodiments, the addition of silicon promotes brazing by reducing the melting temperature of the alloy, decreasing the surface tension and thereby increasing the wettability of the alloy in addition to minimizing the intermetallic alloy (e.g. FeAl3) layer thickness. In some embodiments, the thickness of the AlSi clad layer on the fin sheet metal is between about 10% and 20% of the total thickness of the fin, and preferably about 15%.

In some embodiments, the cladding is an AlSi composition having a silicon content of about 6.8-8.2%. In some embodiments, the fin has a thickness of about 0.012 inches. Other suitable thicknesses of the fin and cladding may be provided.

In some embodiments, the brazing composition is applied between a cladded fin and one or more flat outer surfaces of a steel tube. In some embodiments, this assembly is clamped together and ready for heating in the brazing furnace to bond the fins to the tube.

In some embodiments, the filler metal is added directly to metal halide and hydrophobic carrier. In some embodiments, a powdered AlSi filler is used, e.g. aa 4343 (6.8-8.2% Si), aa 4045 (9-11% Si), or aa 4047 (11-13% Si); and beneficially increases the exterior corrosion protection of the stainless steel. In some embodiments, the filler metal is aa 4045 or 4047. In other embodiments, the filler metal is 4045. The appropriate filler metal is selected based upon a number of factors including the environment in which the heat exchanger will reside and the particular brazing process used. For example, heat exchangers located in aggressive environments such as those in salt air or in the vicinity of chemical plants are more prone to corrosion. Specimens subjected to a prolonged ASTM b-117 salt spray test (750 hours) are used to confirm corrosion resistance in marine air environment.

In some embodiments, the brazing processes described herein can be carried out in a commercially available brazing furnace.

A suitable brazing composition such as a fluoride based brazing composition with a cesium or lithium additive, is utilized to sequester the negative effects of the chromium and nickel compounds within the stainless steel parent material. Cesium and or lithium additives to fluoride based fluxes bind and retard the negative effects of chromium and nickel at brazing temperatures. This practice requires a very specific time vs. temperature brazing cycle that is both shorter in duration and lower in temperature. This approach further enhances the braze joint strength and toughness by reducing the intermetallic layer (e.g. FeAl3) thickness within the braze joint Suitable cesium and lithium fluxes are commercially available under the brand name NOCOLOK® from Solvay Fluor GmbH of Hannover, Germany Advantageously, this eliminates the current general industrial practice of requiring either a roller clad or aluminized layer on the distributor tube.

The inventors have discovered that using a hydrophobic carrier for the metal halide, rather than water, produces improved brazing performance and adhesion between aluminum fins and bare steel tubes in the brazing furnace. In some embodiments, the hydrophobic carrier advantageously evaporates during processing and therefore does not interfere with the brazing.

A suitable non-aqueous hydrophobic carrier is Evap-lube brand vanishing oil which is commercially available from General Chemical Corporation of Brighton, Michigan. This product is in a liquid oil form and has a specific gravity of 0.751-0.768 (water=1.0), boiling point of 340-376 degrees F., vapor pressure at 68 degrees F. of 0.5 mmHg, evaporation rate of 0.16, and is 100% volatile by volume.

To prepare the spreadable brazing compositions described herein, a metal halide powder (e.g. NOCOLOK® flux) and an oil based carrier (e.g. Evap-Lube 2200) are admixed. In some embodiments, the relative amounts of each used preferably may be in the ranges of about 40-65% by weight hydrophobic carrier to about 60-35% by weight metal halide, and more preferably about 48-58% by weight hydrophobic carrier to about 52-42% by weight metal halide. In some embodiments, without limitation, about 53% by weight hydrophobic carrier may be used with the remaining weight percentage (47%) of product in the mixture being metal halide or metal halide with additional additives.

The foregoing oil based carrier and powdered flux mixtures produce a very viscous flux mixture (similar to a gel or wall paper paste in consistency and viscosity) that is readily spreadable on the tubes in preparation for brazing. Advantageously, for the present brazing application, the Evap-Lube 2200 vanishing oil evaporates readily leaving little or no residual oils, and therefore does not interfere with the formation of a brazed bond between the fins and bare steel tube.

A suitable representative application rate of the flux and oil based carrier mixture may be about 25 g/m2 flux to 35 g/m2 of vanishing oil.

In alternative embodiments, a long chain alcohol may be added to further extend and improve the spreadability of the brazing compositions described herein which may be used for longer lengths of bare steel tubes to be prepared for brazing. In certain embodiments, the long chain alcohol may be a polyol (e.g. a glycol including hexylene glycol and propylene glycol). Glycol or another long chain alcohol may be added to the brazing composition/flux and hydrophobic/oil-based carrier mixture in amount from about and including 25% by weight or less in some embodiments, or alternatively in a range of 1-25% by weight in other embodiments. In some embodiments, if a glycol or another long chain alcohol is added to the flux mixture, the weight percentage of the oil based carrier used is preferably reduced proportionately while maintaining the same weight percentage of flux powder in the mixture to provide optimum brazing performance and bonding.

In using the vanishing oil and fluoride based flux brazing mixture gel to prepare a braze filler metal delivery system in which the filter metal is mixed directly into the flux, the flux mixture comprises NOCOLOK® flux, Evaplube vanishing oil (e.g. Evap-Lube 2200), and powdered aluminum. In various embodiments, the aluminum content of the flux gel/paste may be in the range of about 10-50% Al powder by weight. In one representative example, for illustration, approximately 60 g/m2 of aluminum powder may be added which may be AlSi in some embodiments. To make an aluminum preparation having a paste-like consistency for mixing with the flux gel, approximately 90 g/m2 of Evap-lube may added to that amount of aluminum powder. Approximately 25 g/m2 NOCOLOK® flux and about 35 g/m2 Evap-Lube 2200 are used in the oil based carrier flux gel mixture, as described above. Adding up all of the foregoing constituents, the aluminum powder is therefore about 30% of the total (210 g/m2) filler metal-flux gel mixture by weight in this example when combined to form a flux gel or paste that is applied to the bare tube surfaces.

In one embodiment, the aluminum particle size of the aluminum or AlSi power may be without limitation about 5-10 microns.

In some embodiments, the brazing compositions described herein are applied immediately after the tube is cleaned to prevent reoccurrence of oxide formation on the tube. In some embodiments, a binder may be added to the brazing composition/flux mixture to dry it for handling.

The invention will be described in greater detail by way of specific examples. The following examples are offered for illustrative purposes and are not intended to limit the invention in any manner Those skilled in the art will readily recognize a variety of noncritical parameters, which can be changed or modified to yield essentially the same results.

EXAMPLES

Example 1

Provided below in Table 1 are exemplary single-component brazing compositions of the present invention.

TABLE 1

| Ingredient | I | II | III | IV |
|---|---|---|---|---|
|  | Wt. % | | | |
| Potassium aluminum fluoride | 31 | 40 | 37 | 38 |
| Evap-lube 2200 | 65 | 53 | 47 | 40 |
| AlSi | 3 | 5 | 15 | 7 |
| Propylene glycol | 1 | 2 | 1 | 15 |

Example 2

Provided below in Table 2 are exemplary multi-component brazing compositions of the present invention.

TABLE 2

| Ingredient | I | II | III | IV |
|---|---|---|---|---|
|  | Wt. % | | | |
| First Component | | | | |
| Potassium aluminum fluoride | 34 | 40 | 40 | 45 |
| Evap-lube 2200 | 65 | 53 | 49 | 40 |
| Propylene glycol | 1 | 7 | 11 | 15 |

TABLE 2-continued

| Ingredient | I | II | III | IV |
|---|---|---|---|---|
| | | Wt. % | | |
| Second Component | | | | |
| Aluminum | 50 | 75 | 84 | 88 |
| Silicon | 40 | 21 | 11 | 10 |
| Zinc | 10 | 4 | 5 | 2 |

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A system for removing thermal energy generated by radioactive materials comprising:
an air-cooled heat exchanger comprising a vertically-elongated cylindrical shell defining a longitudinal axis;
a heat rejection closed-loop fluid circuit comprising a tube-side fluid path of the air-cooled heat exchanger, a coolant fluid flowing through the heat rejection closed-loop fluid circuit, the heat rejection closed-loop fluid circuit thermally coupled to the radioactive materials so that thermal energy generated by the radioactive materials is transferred to the coolant fluid; and
the air-cooled heat exchanger comprising a shell-side fluid path having a first air inlet, a second air inlet and an air outlet, the first air inlet located at a first elevation, the second air inlet located at a second elevation, and the air outlet located at a third elevation, the second elevation greater than the first elevation and the third elevation greater than the second elevation, the air-cooled heat exchanger transferring thermal energy from the coolant fluid flowing through the tube-side fluid path to air flowing through the shell-side fluid path;
wherein the tube-side fluid path comprises internal cavities of a plurality of heat exchange tubes defining a tube bundle located within the shell-side fluid path.

2. The system of claim 1, wherein the shell-side fluid path comprises a venturi located at an elevation between the second air inlet and the air outlet.

3. The system of claim 2, wherein the venturi is created by fins of the plurality of heat exchange tubes.

4. The system of claim 1, wherein each of the fins of the plurality of heat exchange tubes comprise opposing surfaces that extend substantially parallel to the longitudinal axis.

5. The system of claim 4, wherein the shell-side fluid path comprises a first free transverse cross-sectional area devoid of fins at the second elevation and a second free transverse cross-sectional area devoid of fins at an elevation between the second air inlet and the air outlet, the second free transverse cross-sectional area being less than the first free transverse cross-sectional area.

6. The system of claim 5, wherein the shell-side fluid path comprises a third free transverse cross-sectional area devoid of fins at the third elevation, the third free transverse cross-sectional area being greater than the second free transverse cross-sectional area.

7. The system of claim 1, further comprising:
an intermediate heat exchanger;
an intermediate closed-loop fluid circuit comprising, in operable fluid coupling, a pool of a liquid and a first fluid path of the intermediate heat exchanger, the radioactive materials immersed in the pool of the liquid, the liquid flowing through the intermediate closed-loop fluid circuit; and
the heat rejection closed-loop fluid circuit further comprising a second fluid path of the intermediate heat exchanger, the intermediate heat exchanger transferring thermal energy from the liquid flowing through the first fluid path to the coolant fluid flowing through the second fluid path.

8. The system of claim 7, wherein the pool of the liquid and the intermediate heat exchanger are contained within a containment structure and the air-cooled heat exchanger is located outside the containment structure.

9. The system of claim 1, wherein the plurality of heat exchange tubes are vertically oriented and linearly straight extending parallel to the vertical longitudinal axis.

10. The system of claim 9, wherein the tube bundle comprises finned tube sections and a non-finned tube section arranged in axial alignment, the second air inlet transversely aligned with the non-finned tube section.

11. System of claim 10, wherein the finned tube sections and the non-finned tube section alternate along the longitudinal axis.

12. The system of claim 11, wherein each of the first air inlet, the second air inlet, and the air outlet are transversely aligned with one of the non-finned tube sections.

13. The system of claim 9, further comprising:
the air-cooled heat exchanger comprising a top tube sheet and a bottom tube sheet, the plurality of heat exchange tubes extending vertically from the top tube sheet to the bottom tube sheet, the first air inlet located adjacent the bottom tube sheet and the air outlet located adjacent the top tube sheet; and
the tube-side fluid path of the air-cooled heat exchanger comprising a coolant fluid inlet header and a coolant fluid outlet header, the internal cavities of the plurality of heat exchange tubes forming passageway between the coolant fluid inlet header and the coolant fluid outlet header.

14. The system of claim 1, wherein each of the first air inlet, the second air inlet, and the air outlet are formed through the shell and place ambient air in fluid communication with the shell-side fluid path.

15. The system of claim 14, further comprising:
a vertically-elongated shroud forming a shroud cavity at an upper portion of the shell, a majority of the air-cooled heat exchanger located within the shroud cavity;
the shroud cavity comprising a shroud outlet plenum at top circumferentially surrounding and enclosing a top of air-cooled heat exchanger;
the air outlet of the shell located within the shroud outlet plenum and configured to discharge air exiting the air-cooled heat exchanger laterally into the shroud outlet plenum in a direction transverse to the longitudinal axis.

16. The system of claim 15, wherein the shroud comprises a lower portion adjacent the first air inlet, a diametrically enlarged bulbous upper portion which defines the shroud outlet plenum, and a cylindrical intermediate portion extending between the lower and upper portions.

17. The system of claim 16, wherein the lower portion is diametrically enlarged and outwardly flared in configuration.

18. The system of claim 15, wherein a top portion of the shroud defines a chimney forming a vertical passageway from the shroud outlet plenum to an ambient environment.

19. The system of claim 18, further comprising a blower disposed in chimney and operable to induce air flow through the shell-side fluid path by drawing air into the air-cooled heat exchanger through the first air inlet and the second air inlet.

20. The system of claim 13, further comprising a transversely oriented top end closure enclosing a top of the shell, and a transversely oriented bottom end closure enclosing a bottom of the shell.

* * * * *